US006958718B2

(12) United States Patent
Symes et al.

(10) Patent No.: US 6,958,718 B2
(45) Date of Patent: Oct. 25, 2005

(54) TABLE LOOKUP OPERATION WITHIN A DATA PROCESSING SYSTEM

(75) Inventors: Dominic Hugo Symes, Cambridge (GB); Simon Ford, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 10/889,217

(22) Filed: Jul. 13, 2004

(65) Prior Publication Data

US 2005/0125639 A1 Jun. 9, 2005

(30) Foreign Application Priority Data

Dec. 9, 2003 (GB) .............................................. 0328510

(51) Int. Cl.⁷ .............................. H03M 7/00; G06F 7/00
(52) U.S. Cl. ........................... 341/106; 710/1; 712/208
(58) Field of Search ........................ 341/50, 106; 710/1; 712/208

(56) References Cited

U.S. PATENT DOCUMENTS

| | | | | |
|---|---|---|---|---|
| 4,876,660 A | | 10/1989 | Owen et al. ................. 708/603 |
| 5,301,289 A | | 4/1994 | Suzuki et al. ............... 711/213 |
| 5,408,670 A | | 4/1995 | Davies ........................ 712/16 |
| 5,481,743 A | | 1/1996 | Baxter ......................... 712/23 |
| 5,530,817 A | | 6/1996 | Masubuchi .................. 712/24 |
| 5,761,103 A | | 6/1998 | Oakland et al. ............. 108/497 |
| 5,808,875 A | | 9/1998 | McMahon et al. .......... 361/777 |
| 5,822,619 A | | 10/1998 | Sidwell ....................... 712/300 |
| 5,826,096 A | | 10/1998 | Baxter .......................... 712/5 |
| 5,838,984 A | | 11/1998 | Nguyen et al. ............. 708/603 |
| 5,859,789 A | * | 1/1999 | Sidwell ....................... 708/603 |
| 5,859,790 A | | 1/1999 | Sidwell ....................... 708/607 |
| 5,864,703 A | | 1/1999 | van Hook et al. ............ 712/22 |
| 5,870,618 A | * | 2/1999 | Fujikawa et al. .............. 712/1 |
| 5,875,355 A | | 2/1999 | Sidwell et al. .............. 712/300 |
| 5,881,302 A | | 3/1999 | Omata ........................... 712/2 |
| 5,884,069 A | | 3/1999 | Sidwell ....................... 712/221 |
| 5,893,145 A | | 4/1999 | Thayer et al. .............. 711/125 |
| 5,898,896 A | | 4/1999 | Kaiser et al. ................ 710/65 |
| 5,907,865 A | | 5/1999 | Moyer ........................ 711/201 |
| 5,933,650 A | | 8/1999 | van Hook et al. ............. 712/2 |
| 5,937,178 A | | 8/1999 | Bluhm ........................ 712/218 |
| 5,961,637 A | | 10/1999 | Sturges et al. .............. 712/235 |
| 5,963,744 A | | 10/1999 | Slavenburg et al. ........... 712/9 |
| 5,973,705 A | | 10/1999 | Narayanaswami .......... 345/505 |
| 5,996,066 A | | 11/1999 | Yung .......................... 712/221 |
| 6,009,508 A | * | 12/1999 | May et al. .................... 712/41 |
| 6,038,583 A | | 3/2000 | Oberman et al. ........... 708/628 |
| 6,047,304 A | | 4/2000 | Ladwig et al. .............. 708/530 |
| 6,058,465 A | | 5/2000 | Nguyen .......................... 712/7 |

(Continued)

FOREIGN PATENT DOCUMENTS

| | | | |
|---|---|---|---|
| EP | 0775977 | 3/1999 | ............. G06F/7/00 |
| EP | 1 197 845 | 4/2002 | ............. G06F/7/00 |
| GB | 2 352 065 | 1/2001 | ........... G06F/9/355 |

OTHER PUBLICATIONS

C. Hansen, "Architecture of a Broadband Mediaprocessor" IEEE, Digest of Papers of the Computer Society Computer Conference, Feb. 1996, pp. 334–340.

*Primary Examiner*—Peguy JeanPierre
(74) *Attorney, Agent, or Firm*—Nixon & Vanderhye P.C.

(57) ABSTRACT

A table lookup extension instruction is provided in which index values stored within an index register D2 are used to select data elements stored within one or more table registers D0, D1 for storage into corresponding positions within a result register D3. Out-of-range index values result in the corresponding locations within the result register being left unchanged U. In this way, an offset can be applied to index values held and then those index values reused with the table registers D0, D1 being reloaded with a different portion of a table so as to give the effect of a larger table than can be directly supported by the number of table registers available.

19 Claims, 50 Drawing Sheets

U.S. PATENT DOCUMENTS

| | | | | |
|---|---|---|---|---|
| 6,085,213 | A | | 7/2000 | Oberman et al. ............... 712/7 |
| 6,088,783 | A | * | 7/2000 | Morton ........................ 712/22 |
| 6,100,905 | A | | 8/2000 | Sidwell ........................ 712/22 |
| 6,144,980 | A | | 11/2000 | Oberman .................... 345/559 |
| 6,145,077 | A | * | 11/2000 | Sidwell et al. .............. 712/300 |
| 6,173,366 | B1 | | 1/2001 | Thayer et al. .............. 712/300 |
| 6,209,017 | B1 | | 3/2001 | Lim et al. .................... 711/129 |
| 6,223,198 | B1 | | 4/2001 | Oberman et al. ........... 708/552 |
| 6,223,277 | B1 | | 4/2001 | Karguth ....................... 708/620 |
| 6,223,320 | B1 | | 4/2001 | Dubey et al. ................ 712/224 |
| 6,269,384 | B1 | | 7/2001 | Oberman .................... 714/757 |
| 6,292,888 | B1 | | 9/2001 | Nemirovsky et al. ....... 708/497 |
| 6,295,599 | B1 | | 9/2001 | Hansen et al. .............. 712/225 |
| 6,298,438 | B1 | | 10/2001 | Thayer et al. ................. 712/36 |
| 6,300,952 | B1 | | 10/2001 | Sidwell et al. .............. 712/226 |
| 6,334,176 | B1 | | 12/2001 | Scales, III et al. .......... 345/119 |
| 6,370,558 | B1 | * | 4/2002 | Guttag et al. ............... 708/603 |
| 6,385,713 | B2 | | 5/2002 | Yung ............................. 712/4 |
| 6,408,345 | B1 | | 6/2002 | Fuoco et al. .................. 712/22 |
| 6,546,480 | B1 | | 4/2003 | Mandavilli et al. ........... 710/22 |
| 6,564,314 | B1 | | 5/2003 | May et al. ................... 712/210 |
| 6,662,292 | B1 | | 12/2003 | Wilson ....................... 711/220 |
| 6,748,521 | B1 | | 6/2004 | Hoyle ........................ 712/221 |
| 6,832,117 | B1 | * | 12/2004 | Miyamori ..................... 700/2 |
| 2002/0133682 | A1 | | 9/2002 | Hansen et al. .............. 712/222 |
| 2004/0172547 | A1 | * | 9/2004 | Okamoto et al. ........... 713/190 |

* cited by examiner $D_{op}D \rightarrow D$ $D_{op}D \rightarrow Q$ $D_{op}Q \rightarrow Q$ $Q_{op}Q \rightarrow D$ $D \rightarrow D$ $D \rightarrow Q$ $Q \rightarrow D$ Dd [i] = Dn [i] op Dm [1]

VSHR. 32 Dx , Da , #5
VSHR. 32 Dy , Db , #5
PACK. L0 Dd , Dx , Dy

VSHR. U16. U32 Dd , Qn , #5

X = Big ᛟ (64 bit)
Y = Big ᛟ (64 or 32)
Z = Big ᛟ (64 or 32 or 16)

| Control | Generated constant | | | | | | | |
|---------|---|---|---|---|---|---|---|---|
| 0000 | 00000000 | 00000000 | 00000000 | 00000000 | 00000000 | 00000000 | 00000000 | 00000000 |
| 0001 | 11111111 | 11111111 | 11111111 | 11111111 | 11111111 | 11111111 | 11111111 | 11111111 |
| 0010 | 00000000 | 00000000 | 00000000 | 00000000 | 00000000 | 00000000 | abcdefgh | abcdefgh |
| 0011 | 11111111 | 11111111 | 11111111 | 11111111 | 11111111 | 11111111 | abcdefgh | 00000000 |
| 0100 | 00000000 | abcdefgh | 00000000 | abcdefgh | 00000000 | abcdefgh | 00000000 | 11111111 |
| 0101 | 11111111 | abcdefgh | 11111111 | abcdefgh | 11111111 | abcdefgh | 11111111 | 00000000 |
| 0110 | abcdefgh | 00000000 | 00000000 | 00000000 | abcdefgh | 00000000 | 00000000 | 11111111 |
| 0111 | adcdefgh | 11111111 | 11111111 | 11111111 | abcdefgh | 11111111 | 11111111 | abcdefgh |
| 1000 | 00000000 | abcdefgh | 00000000 | abcdefgh | 00000000 | abcdefgh | abcdefgh | abcdefgh |
| 1001 | 11111111 | abcdefgh | 11111111 | abcdefgh | 11111111 | abcdefgh | 00000000 | 00000000 |
| 1010 | abcdefgh | 00000000 | abcdefgh | 00000000 | abcdefgh | 00000000 | abcdefgh | 11111111 |
| 1011 | abcdefgh | 11111111 | abcdefgh | 11111111 | abcdefgh | 11111111 | abcdefgh | abcdefgh |
| 1100 | abcdefgh | abcdefgh | abcdefgh | abcdefgh | abcdefgh | abcdefgh | abcdefgh | 00000000 |
| 1101 | aaaaaaaa | bbbbbbbb | cccccccc | dddddddd | eeeeeeee | ffffffff | gggggggg | hhhhhhhh |

Where
{a,b,c,d,e,f,g,h,} := Data

FIG. 63

TABLE LOOKUP OPERATION WITHIN A DATA PROCESSING SYSTEM

BACKGROUND OF THE INVENTION

1. Field of the Invention

This invention relates to data processing systems. More particularly, this invention relates to data processing systems using table lookup instructions in which an index register holds a plurality of index values which are used to reference selected data elements within a table of data elements.

2. Description of the Prior Art

It is known to provide data processing systems supporting table lookup instructions. Such table lookup instructions are useful in a variety of different processing operations and are particularly well suited to systems in which a large volume of signal data, such as image or audio data, is to be processed. The table lookup instruction allows multiple data elements to be selected from a table in response to a single instruction. More particularly, an index register holding multiple index values may be referenced to determine which table entries within the table should be selected for further use.

Within a system having a load/store architecture in which data manipulations are only performed upon data value once they are stored within registers, the table of data to be accessed can be held within the data processing registers in order that high speed access may be made to it. However, the number of registers that can be devoted to storing a table is relatively low since the register resources of a system are usually in demand for holding and manipulating other data values and for other purposes. Thus, whilst it may be possible to calculate index values capable of accessing a large table, the table size is constrained by other factors and accordingly the usefulness of the table lookup instructions is reduced.

SUMMARY OF THE INVENTION

Viewed from one aspect the present invention provides apparatus for processing data, said apparatus comprising:

a register data store operable to store data to be processed and accessed via registers corresponding to respective portions of said register data store;

processing logic operable to perform data processing operations upon data stored with said register data store; and an instruction decoder responsive to a program instruction to generate control signals operable to control said processing logic to perform a data processing operation specified by said program instruction; wherein said instruction decoder is responsive to a table lookup extension instruction specifying one or more index registers storing a plurality of index values and one or more table registers storing a plurality of data elements to store into respective locations within one or more result registers a plurality of data elements selected from said one or more table registers in dependence upon respective index values from said one or more index registers, said instruction decoder being responsive to an index value outside of a predetermined range of index values to preserve a current value stored in a corresponding location within said one or more result registers.

The present technique recognises that if the instruction decoder is arranged to be responsive to out-of-range index values to leave the corresponding positions within the result register(s) unaltered, then a set of index values may be calculated and applied multiple times with respective offsets applied in order to effectively give the functionality of accessing a large table of values and only having to assemble one index register of index values. As an example, if only two registers are available to serve as table registers, then a set of index values may be calculated and applied to reference data elements within those two table registers on a first pass. Index values out-of-range for referencing data elements within those two table registers are effectively ignored and the corresponding values at locations within the result registers are left unaltered. The two table registers are then reloaded with a further section of a table of data elements and an offset value subtracted from each of the index values within the index register. A second table instruction is then executed. The index values which were within range during the first execution will now be out-of-range and so ignored. Similarly, the out-of-range index values from the first pass will now be in range and so will be used to lookup data elements now held within the table registers with the data elements looked up in the first pass being left unaltered.

It will be appreciated that whilst the data elements could have a fixed size, in other embodiments they have one of a plurality of different data element sizes specified by the table lookup instructions itself.

It will be appreciated that the present technique has a particular utility within SIMD processing systems in which the processing logic is operable to perform data processing operations in parallel upon a plurality of data elements accessed as a register within the register data store.

It is convenient that the predetermined range of index values should include a respective value corresponding to each location within the one or more table registers. Thus, the number of table registers available and the data element size effectively defines the range of index values which result in a lookup operation during a particular execution of the table lookup table instruction.

Whilst the table lookup instructions could operate upon a fixed number of table registers, in a preferred embodiment the instruction specifies a list of a plurality of table registers as this is a highly flexible way in which a table of different sizes may be specified. The instruction may for example specify the first register and the last register within a contiguous list of registers which are to be treated as containing the table of data elements.

Whilst it is possible to envisage other example embodiments, it is most useful and accordingly more efficient in terms of instruction encoding bit space that the table lookup instruction should be constrained to specify one index register and one result register.

As a complement to the table lookup extension instruction referred to above, preferred embodiments of the invention also provide a table lookup instruction which operates in a similar manner except that out-of-range index values result in a zero value being stored in a corresponding location within the one or more result registers. This type of behaviour is useful in some programming situations and accordingly allows more efficient programming when provided in combination with the table lookup extension instruction.

Whilst it would be appreciated that other arrangements may be possible in preferred embodiments there is a one-to-one mapping between the index values stored in the one or more index registers and the data elements stored in the one or more result registers.

Viewed from another aspect the present invention provides a method of processing data, said method comprising the steps of:

storing within a register data store data to be processed and accessed via registers corresponding to respective portions of said register data store;

performing data processing operations upon data stored with said register data store; and in response to a program instruction generating control signals operable to control processing of data processing operation specified by said program instruction; wherein in response to a table lookup extension instruction specifying one or more index registers storing a plurality of index values and one or more table registers storing a plurality of data elements storing into respective locations within one or more result registers a plurality of data elements selected from said one or more table registers in dependence upon respective index values from said one or more index registers, and in response to an index value outside of a predetermined range of index values preserving a current value stored in a corresponding location within said one or more result registers.

Viewed from a complementary aspect, the present invention also provides a computer program product including a computer program for controlling an apparatus for processing data in accordance with the above described techniques.

BRIEF DESCRIPTION OF THE DRAWINGS

The present invention will be described further, by way of example only, with reference to preferred embodiments thereof as illustrated in the accompanying drawings, in which:

FIG. 63 shows a table of possible constants generated from an instruction having a data portion, abcdefgh and a control portion associated with it;

DESCRIPTION OF THE PREFERRED EMBODIMENTS

Figure 1:
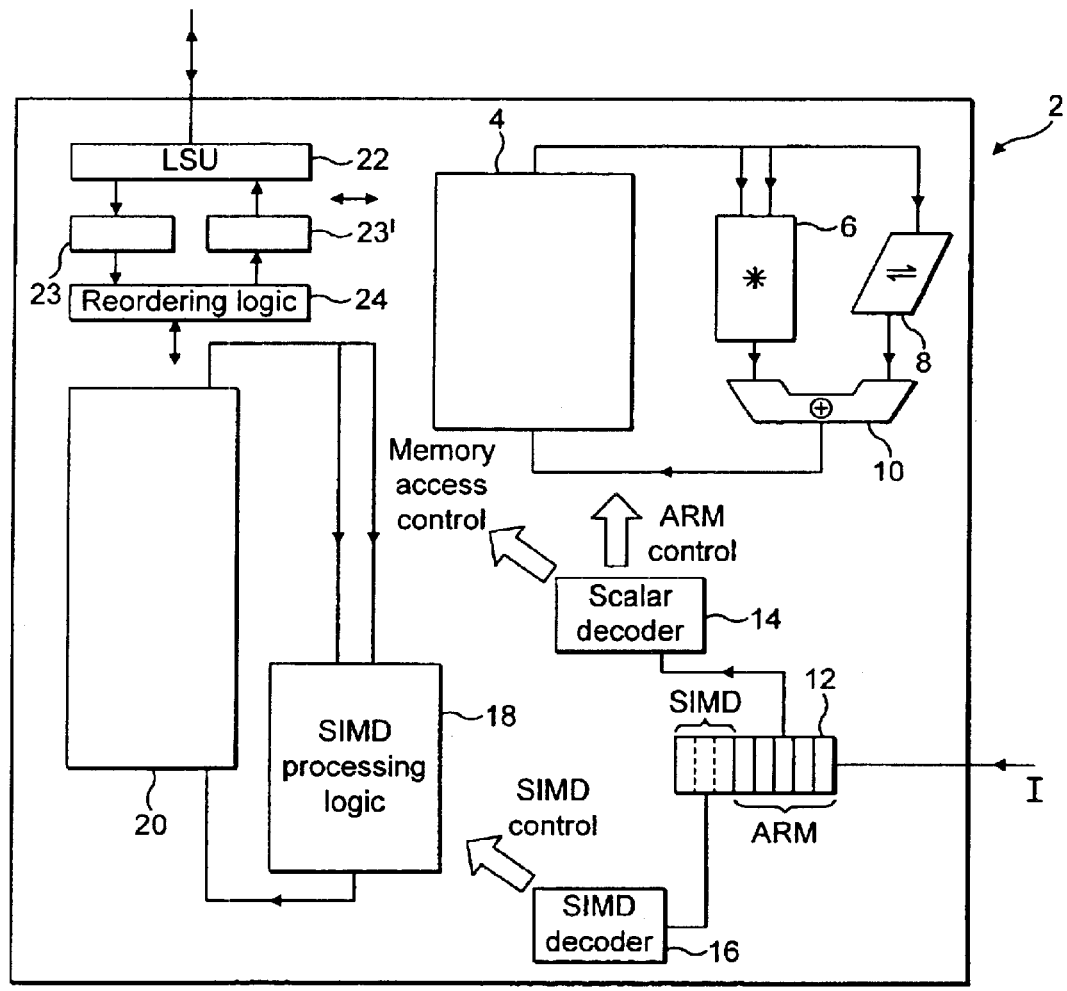
FIG. 1 schematically illustrates an integrated circuit supporting both conventional scalar data processing and SIMD data processing.

FIG. 1 schematically illustrates a data processing system (integrated circuit) 2 incorporating both a scalar data processing functionality and a SIMD data processing functionality. The scalar data processing portion can be considered to be a standard ARM processor core incorporating a scalar register data store 4, a multiplier 6, a shifter 8, an adder 10, an instruction pipeline 12 and a scalar decoder 14 as well as many other circuit elements which have not, for the sake of clarity, been illustrated. In operation, such a scalar processor core stores fixed length 32-bit data values within the scalar register data store 4 and manipulates these using the multiplier 6, shifter 8 and adder 10 under control of data processing instructions passed along the instruction pipeline 12 and supplied to the scalar decoder 14. The scalar decoder 14 produces control signals which control the operation of the scalar processing elements in a conventional way.

As illustrated in FIG. 1 the integrated circuit 2 includes various dedicated SIMD processing elements including a SIMD register data store 20, dedicated SIMD processing logic 18 and reordering logic 24. A load store unit 22 is shared with the scalar portion and could be the same or a modified version of the load store unit conventionally found within a scalar processor.

The instruction pipeline 12 is extended with additional pipeline stages which serve to control SIMD processing operation via a dedicated SIMD decoder 16. (It will be appreciated that in other embodiments the SIMD pipeline may be provided in parallel with the scalar pipeline.) The SIMD decoder 16 generates SIMD control signals which control the operation of the SIMD processing elements, such as reading of SIMD registers, writing of SIMD registers and the configuration of the SIMD processing logic so as to perform the desired data processing operations. The SIMD pipeline stages follow the scalar stages resulting in the SIMD portion of the processor effectively seeing a different execution point to the scalar portion. This can result in the need for some interlocking as will be discussed below.

The reordering logic 24 serves the purpose of reordering data elements retrieved from a memory (not illustrated) coupled to the integrated circuit 2 in to an order more suited to the desired SIMD processing operation. This reordering logic 24, its operations and advantages will be discussed further below. There are also provided load and store FIFOs 23 and 23' between the load store unit 22 and the reordering logic 24.

The scalar register data store 4 can in this example be considered as being divided into a fixed number of fixed length registers, such as the conventional 16 32-bit ARM registers. In contrast, the SIMD register data store 20 provides a block of storage which may be addressed/accessed in a flexible way depending upon the parameters associated with the SIMD data processing instruction concerned. More particularly, the SIMD data processing instruction specifies source and destination register numbers, data element sizes and register sizes associated with the data processing instruction. These parameters are together combined by the SIMD decoder 16 and read/write ports of the register data store 20 to control the mapping of the different portions and accordingly data elements stored within the SIMD register data store 20 to the register being accessed. Thus, SIMD registers of differing sizes, differing data element sizes and the like can effectively be aliased together (i.e. these registers can be considered as overlapping and accessible via different register specifiers, register size and data element size combinations as may be desired. The SIMD decoder 16 and the read/write ports can be considered to provide register accessing logic in this example embodiment).

Figure 2:
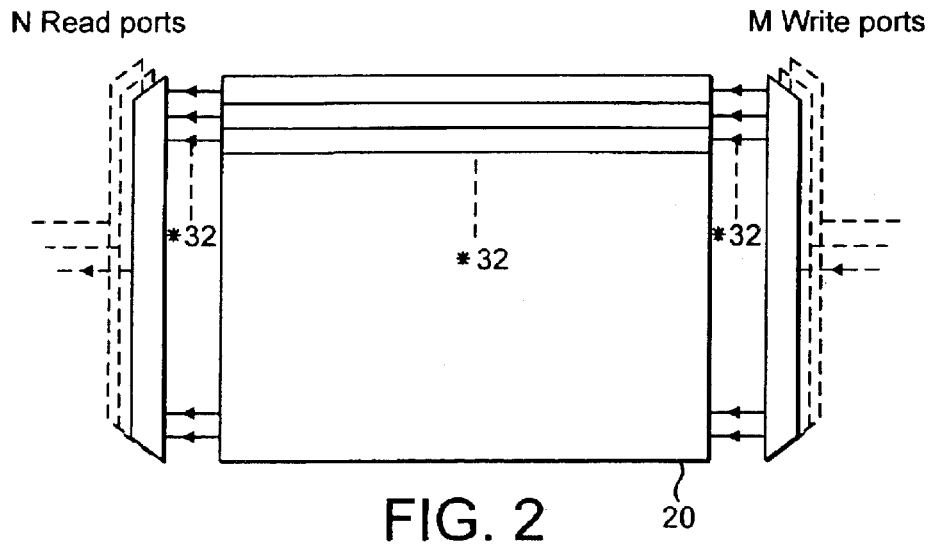
FIG. 2 schematically illustrates a read and write port arrangement for a SIMD register data store.

FIG. 2 schematically illustrates the read and write port arrangement which may be provided for the SIMD register data store 20. In this example thirty two SIMD registers are capable of being specified by the register specifying field (5 bits) within the SIMD data processing instructions. N read ports are associated with the SIMD register data store 20. The minimum granularity supported is a 64-bit register value. In this example, the register sizes directly supported are 64-bits and 128-bits. It will be readily apparent to those in this field that this arrangement could be scaled to support 256-bit and higher register sizes directly, or indirectly by synthesis using supported instructions with smaller sizes of register. FIG. 2 schematically illustrates M de-multiplexers serving as write ports to the SIMD register data store 20. It will be appreciated that in practice such de-multiplexers are provided in the form of appropriately directed enable signals to rows of storage elements within the SIMD register data store together with the action of multiplexers routing the desired inputs to their destination.

Figure 3:
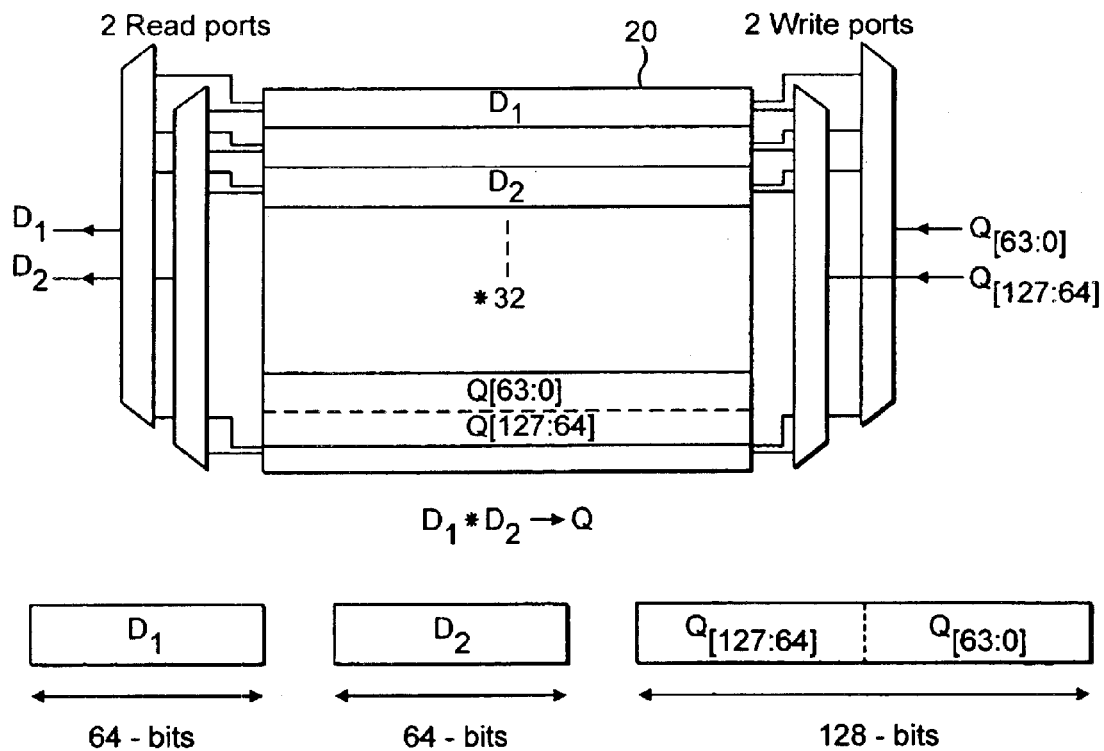
FIG. 3 schematically illustrates an example SIMD read and write operation in which the destination register is twice the width of the source registers.

FIG. 3 illustrates a particular example in which two 64-bit SIMD register values (denoted as a D double words) each containing multiple data elements are multiplied together to generate multiple output data elements that are stored together in a 128-bit register (denoted as a Q quad word). Separate read ports are arranged to read the source SIMD register values $D_1$ and $D_2$ from the SIMD register data store 20. Two write ports act together to respectively allow the first Q [63:0] portion and second Q [127:64] portion of the 128-bit result to be written back to the SIMD register store 20. It will be appreciated that the data element size within the D registers and the Q registers can vary. As an example, four 16-bit data elements may be contained within each of the source D registers with the destination Q register containing a set of corresponding four 32-bit data elements being the result of the multiplication. In this example it will be seen how the number of lanes of parallel processing (four) remains constant whilst the data element size is increased from 16-bits to 32-bits as required by the multiplication operation being performed.

Figures 4, 5, 6:
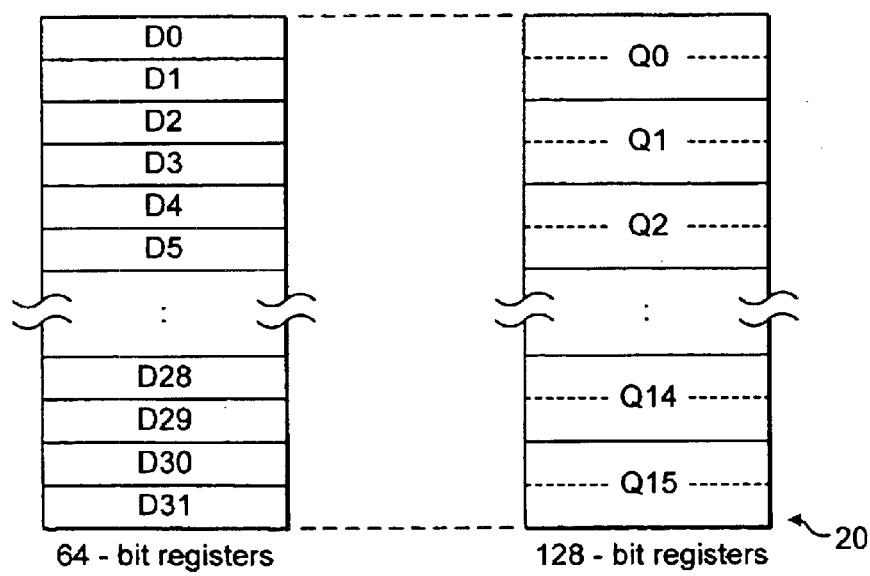
FIG. 4 shows different types of relationship between source register size and destination register size for different data processing operations.
FIG. 5 schematically illustrates a syntax which may be used to define a data processing instruction in accordance with the present techniques.
FIG. 6 schematically illustrates the SIMD register data store viewed as 64-bit registers and 128-bit registers.

FIG. 4 illustrates various different types of relationship between source register size and destination register size which may be supported. In the uppermost example given the number of lanes of parallel processing remains constant and the data element size remains constant. In the second and fourth examples the number of lanes of parallel processing remains constant but the data element size changes between the source and the destination. In the third example the two source elements have different data element sizes. The SIMD processing structure and techniques of the present system support these different types of data processing instruction as will be described further below. The final three examples are unary operations with a single input variable. The fifth example keeps the same data element size. The sixth example doubles the data element size and the seventh example halves the data element size.

FIG. 5 schematically illustrates the syntax of a SIMD data processing instruction. The first portion of the syntax specifies the SIMD operator concerned, in this case a multiplication operation. This is followed by a field indicating the output data element size and other characteristics of the output data elements. In this example the output data elements are 16-bits in length and are signed integers. The next field indicates the input data element size and characteristics, in this case signed 8-bit integers. The next field indicates the destination register size and register specifier. In this example the 128-bit quad word SIMD register with the register specifier 12 is to be used as the destination SIMD register. The two source SIMD registers are each double word 64-bit registers with the register specifiers respectively being "1" and "4". Further information on the syntax is described below.

A set of data types to represent the different data formats are defined. These are described in Table 0. Most instructions use at least one data type qualifier to determine the exact operation. However, operations do not necessarily support all data types. The data type is applied as a suffix to the fields indicating the data element size and characteristics.

TABLE 0

| Data type Qualifier | Interpretation |
| --- | --- |
| .<size> | Any element of <size> bits |
| .I<size> | Signed or unsigned modulo integer of <size> bits |
| .F<size> | Floating-point number of <size> bits |
| .P<size> | Polynomial over {0, 1} of degree less than <size> |
| .S<size> | Signed Integer of <size> bits |
| .U<size> | Unsigned Integer of <size> bits |

FIG. 6 illustrates how the SIMD register data store 20 may be viewed as being divided into thirty two 64-bit registers or sixteen 128-bit registers. These registers map to the same physical SIMD register data store 20 and accordingly alias together. As an example, a data element within register D0 may also be accessed as a data element within register Q0.

Figure 7:
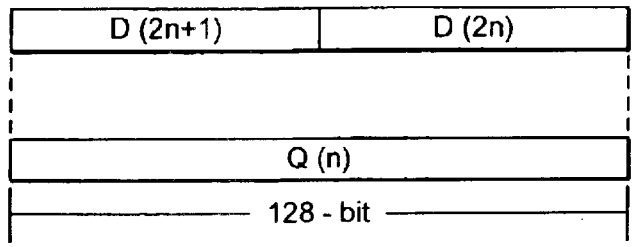
FIG. 7 schematically illustrates the overlap ("aliasing") between 64-bit and 128-bit registers.

FIG. 7 schematically further illustrates the overlap between the 64-bit and 128-bit registers. As illustrated, a 128-bit register Q(n) corresponds to two 64-bit registers D(2n+1) and D(2n).

Figure 8:
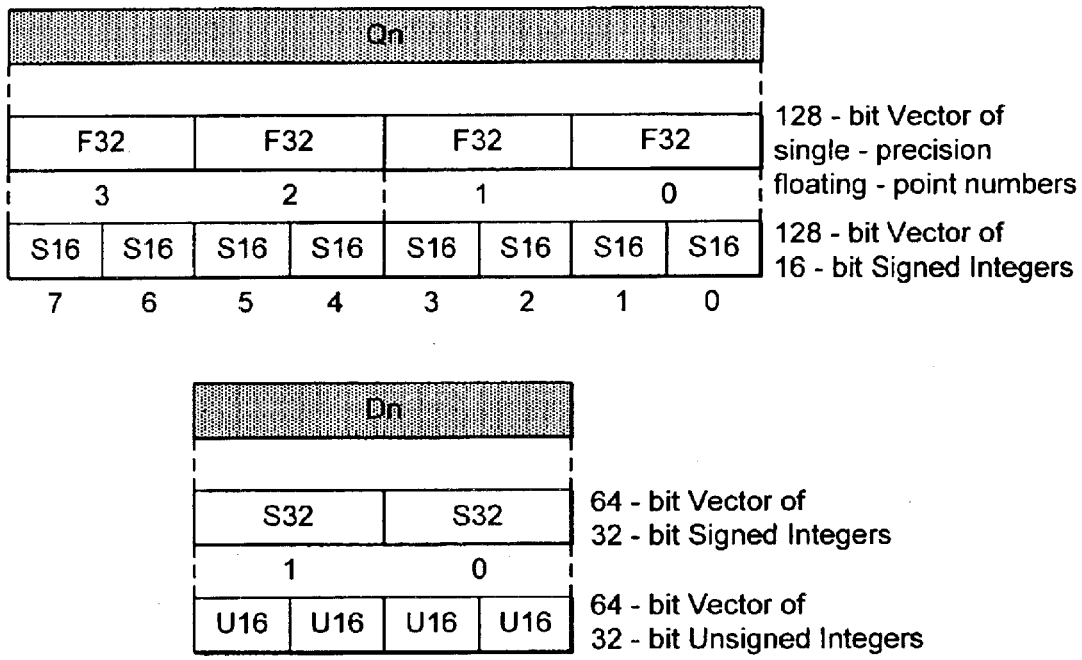
FIG. 8 schematically illustrates a plurality of data elements stored within SIMD registers of different sizes.

FIG. 8 schematically illustrates example data elements which may be stored within SIMD registers of differing sizes. In the upper portion of FIG. 8, a 128-bit SIMD register is illustrated as either containing four 32-bit data elements or eight 16-bit data elements. The data elements may be signed or unsigned integers, floating point numbers or other formats of number as desired and suited to the parallel processing to be performed.

The lower portion of FIG. 8 illustrates a 64-bit SIMD register which may contain either two signed 32-bit integers or four unsigned 16-bit integers. Many other possibilities are available and will be apparent to those in the technical field.

Figure 9:
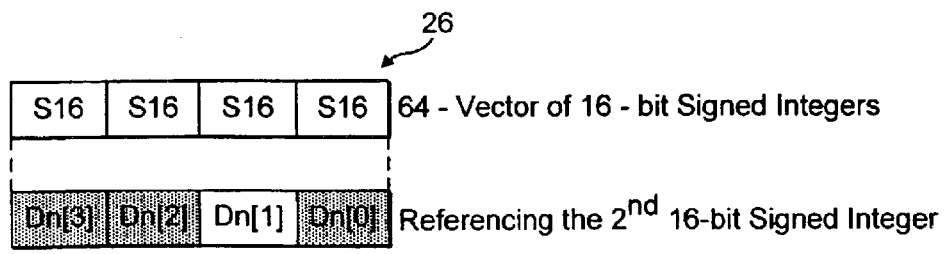
FIG. 9 schematically illustrates the referencing of a scalar value within a SIMD vector register.

FIG. 9 schematically illustrates how an individual scalar value within a SIMD register may be referenced. The illustrated SIMD register 26 contains four signed integer values. If this SIMD register is considered as register $D_n$, then the different individual signed integer values can be denoted as $D_n[3]$ to $D_n[0]$. Such referencing of individual data elements within a SIMD register is used, for example, when performing register transfer instructions which select one of the data elements within a SIMD register and move it to or from one of the registers within the scalar register data store 4.

Figure 10:
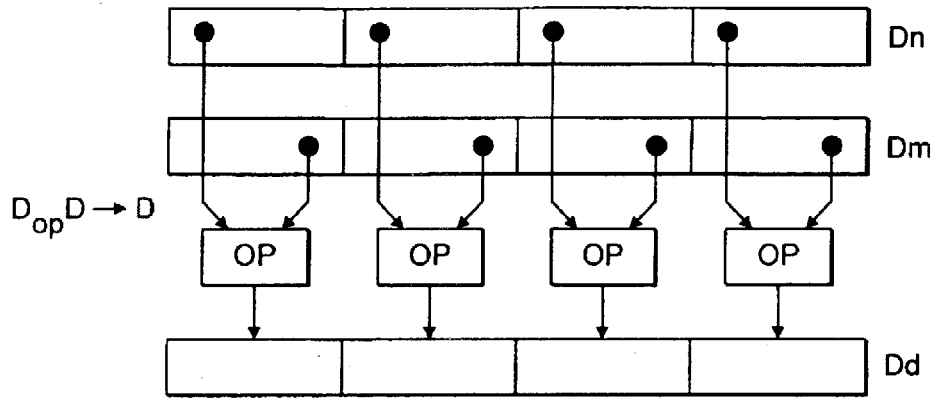
FIG. 10 schematically illustrates a data processing instruction in which the number of processing lanes and the data element size remain constant.

FIG. 10 illustrates how a SIMD data processing instruction may be performed with the number of processing lanes remaining constant and the data element size remaining constant between the two source registers and the destination register. In this example the source SIMD registers are D registers (64-bits and containing four 16-bit data elements) having four parallel processing lanes. The destination SIMD register is also a 64-bit D register containing four result 16-bit data element values.

Figure 11A:
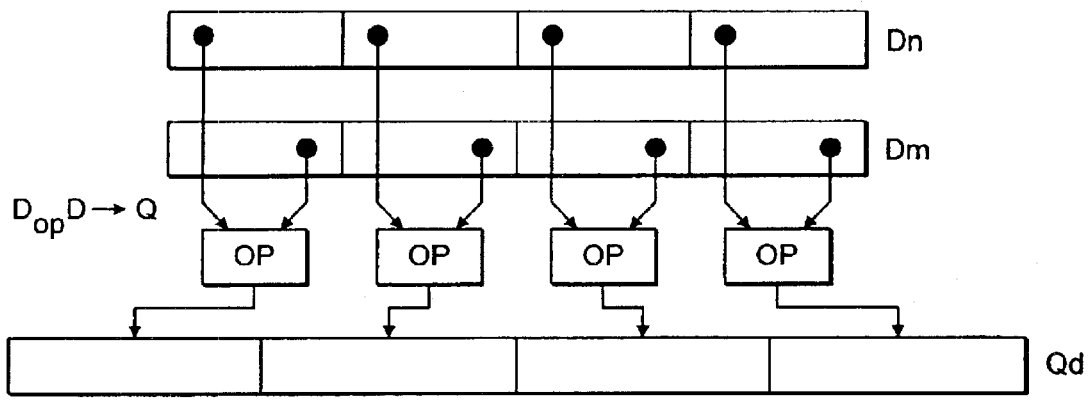
FIGS. 11A and 11B schematically illustrate a data processing instruction in which the number of processing lanes remains constant and the data element size changes.
Figure 11B:
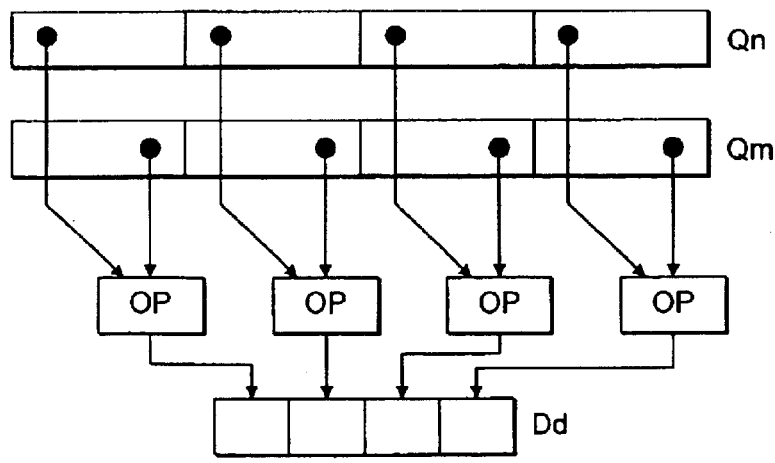

In contrast to FIG. 10, FIG. 11A illustrates an example in which the destination SIMD register is twice the width of the source SIMD registers. The number of lanes of processing remains constant but the data element size doubles. This type of behaviour is suited for use with SIMD operations such as multiply, add, subtract and shift (particularly left shift). FIG. 11B illustrates an example in which the destination SIMD register is half the width of the source SIMD registers. This type of instruction is useful for add and shifts (particularly right shifts).

The ability to alter data element size between source and destination whilst maintaining the number of processing lanes allows sequences of SIMD data processing instructions to be built up without the requirement for data element reordering or doubling up of instructions as a consequence of changes in data element size produced by the data processing operations performed. This is a significant advantage in terms of processing speed, code density, power consumption and the like.

Figure 12:
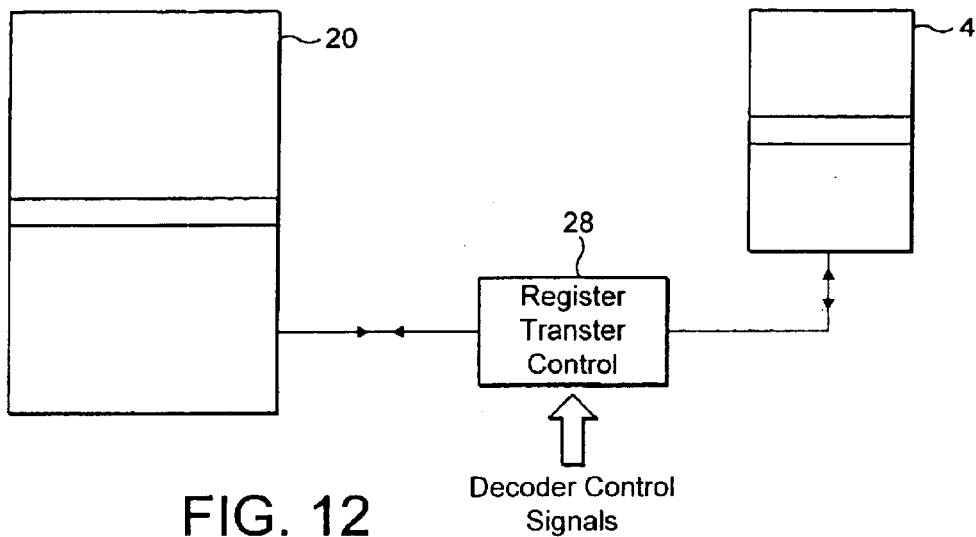
FIG. 12 illustrates the transfer of data between a SIMD register data store and a scalar register data store.
Figure 13:
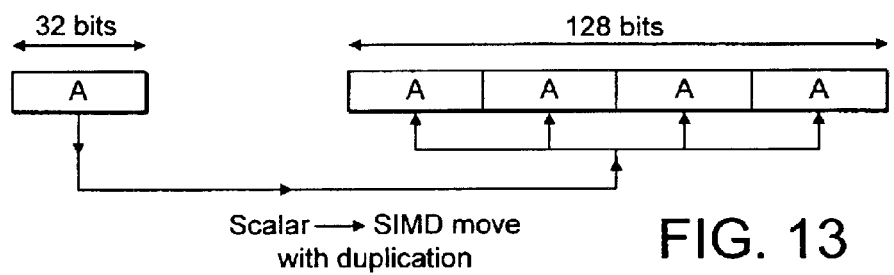
FIGS. 13, 14 and 15 schematically illustrate the operation of various register transfer instructions.

FIG. 12 schematically illustrates the scalar register data store 4 and the SIMD register data store 20 coupled together by register transfer logic 28. Control signals received from either or both the scalar decoder 14 or the SIMD decoder 16 control the register transfer logic 28 in response to register transfer instructions within the instruction pipeline 12 to move data between a specified register within the scalar register data store 4 and a specified position within a specified register of the SIMD register data store 20. A data value moving from the scalar register to the SIMD register may also be copied to all positions within the SIMD register as is illustrated in FIG. 13. This type of register transfer instruction with duplication is well suited to rapidly populating all processing lanes within a SIMD register with values, such as scaling values, which need to be applied to different other operands within SIMD registers by the SIMD processing logic 18.

Figure 14:
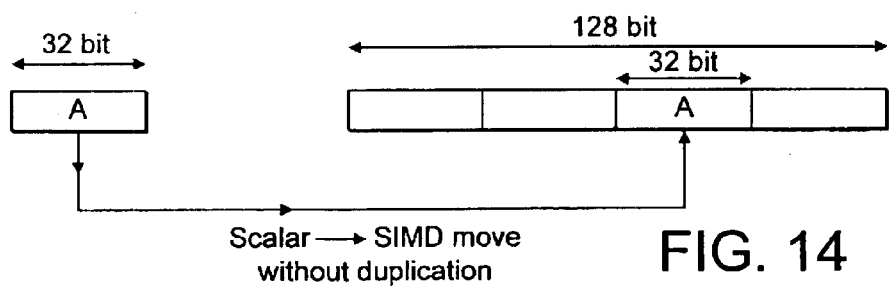

FIG. 14 illustrates a different type of register transfer instruction. In this example a 32-bit scalar value A is moved to a specified position (lane) within the SIMD register. The other lanes maintain their original values. The scalar value is not duplicated across the entire scalar register. The position within the destination scalar register can be changed by an appropriate field value within the register transfer instruction. This type of operation allows an individual data element within a SIMD register to be populated with a data value taken from the scalar register data store.

Figure 15:
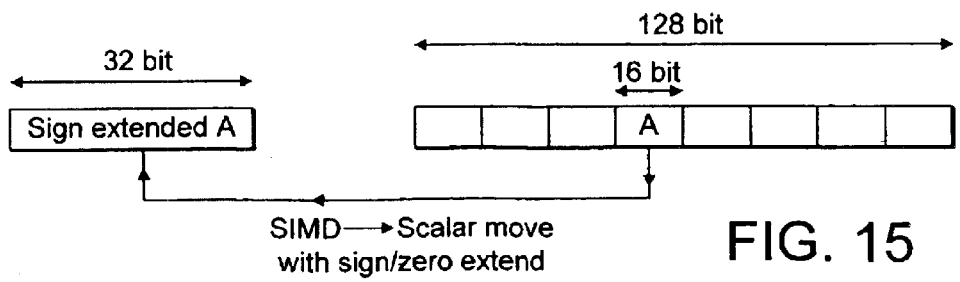

FIG. 15 illustrates a further type of register transfer instruction. In this example a 16-bit data element from within the SIMD register is taken from a specified variable position within that SIMD register and copied to one of the scalar registers. Since the scalar register is a 32-bit register, then the data element is in this example sign extended. The data element could instead be zero extended depending upon the requirements of the particular algorithm or system.

Figure 16:
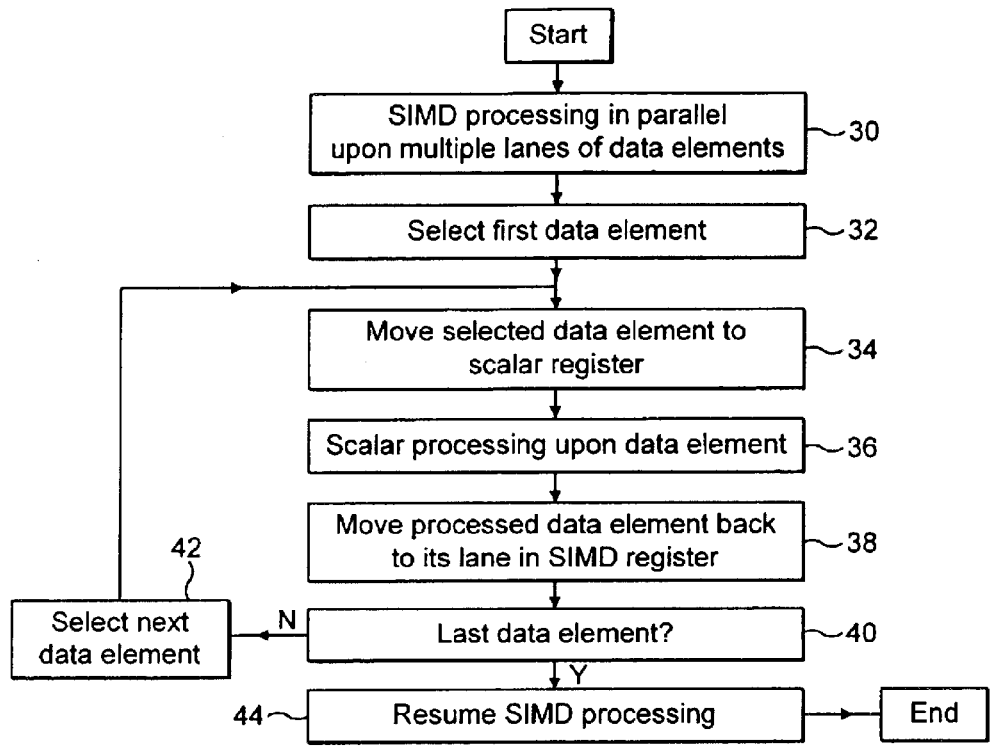
FIG. 16 is a flow diagram illustrating an example of a situation in which register transfer instructions of the types illustrated in FIGS. 14 and 15 maybe usefully employed.

FIG. 16 is a flow diagram schematically illustrating an example type of processing in which the register transfer instructions of FIG. 14 and FIG. 15 may be advantageously employed. At step 30 some SIMD processing is performed in parallel upon multiple lanes each containing their own data elements. At some point this processing requires a data manipulation to be performed which is either not supported by the SIMD processing logic 18 or can only be inefficiently so supported. In this circumstance it is desired to separately move the individual data elements across to the scalar processing system to allow this complex data operation to be performed. Step 32 selects the first data element to be so moved. Step 34 then executes a register transfer instruction such as that illustrated in FIG. 15. Step 36 executes the desired complex processing upon the individual data element now in the scalar portion of the system. When this complex processing has been completed, step 38 executes a register transfer instruction such as that illustrated in FIG. 14 to return the now modified data element back to its original position. Step 40 determines whether the last data element has been reached, and if this is not the case the step 42 selects the next data element before returning processing to step 34. If all of the data elements which required the complex operation to be performed upon them have been moved across to the scalar system, subject to the desired processing and moved back to the SIMD system, then processing proceeds from step 40 to step 44 at which the parallel SIMD processing is resumed.

Data processing instructions specifying SIMD registers for accessing the register data store include one or more register fields encoding a register number of a register to be accessed. The 5-bit register specifiers used are designed to be the same as those used by the ARM Vector Floating Point (VFP) unit—that is, the instruction bits that specify a register are:
For destination registers:
D=bit[22]
Rd=bits[15:12]
For first source register specifiers:
N=bit[7]
Rn=bits[19:16]
For second source register specifiers:
m=bit[5]
Rm=bits[3:0]
Furthermore, the use of these bits is chosen so that Di registers and word scalars are encoded consistently with the way that VFP specifies double- and single-precision registers respectively, and the encodings for Qi registers and halfword scalars follow the same principles. The following describes how (D,Rd) are used; (N,Rn) and (M,Rm) are used analogously:
Qd: Qi register number is (D,Rd[3],Rd[2],Rd[1])
Corresponding Di register numbers are (D,Rd[3],Rd[2],Rd[1],0) and (D,Rd[3],Rd[2],Rd[1],1)
Rd[0] Should Be Zero
Dd: Di register number is (D,Rd[3],Rd[2],Rd[1],Rd[0])
Word scalar:
Di register number is (D,Rd[3],Rd[2],Rd[1],Rd[0])
word[D] is selected from register on little-endian basis
Halfword scalar:
Di register number is (0,0,Rd[2],Rd[1],Rd[0])
halfword[(D,Rd[3])] is selected from register on little-endian basis.
Byte scalar:
Di register number is (0,0,0,Rd[1],Rd[0])
byte[(D,Rd[3],Rd[2])] is selected from register on little-endian basis.

Thus, the bits D, Rd[3], Rd[2], Rd[1] and Rd[0] may be considered as mappable to a 5-bit contiguous field which is rotatable by a number of bit positions dependent upon the register size for the register number. In practice the register encoding bits are not mapped or rotated as separate operations but are supplied to the reiger accessing logic to form a row address and a column address for accessing the register data store with a movable mask being applied depending upon register size to select the correct portions of the bit to serve as row and portion column addresses.

In accordance with embodiments, load and store instructions are provided for moving data between the SIMD register file 20 (see FIG. 1) and memory. The load instructions can be used to load data elements from memory into specified registers, whilst the store instructions are used to store data elements from specified registers to memory. These load and store instructions are designed to support the movement of data required by algorithms using the SIMD processing logic 18. The load and store instructions of embodiments specify the size of data elements that they are loading and storing, and this information is used to provide a consistent ordering within a register regardless of the endianness of the memory system.

The load and store instructions of embodiments allow a number of data elements from a continuous block of memory to be loaded into or stored from the SIMD register file 20. In accordance with one embodiment, accesses can be performed at any byte alignment, and load or store up to 32 bytes.

The load and store instructions of embodiments are considered to access the data from memory in which the data elements are arranged into structures, with each structure having a number of components. In accordance with one embodiment, the structures in memory can contain between one and four components where a component can have any data type size that is recognised by the SIMD processing logic 18, in preferred embodiments these data type sizes being 8, 16, 32 or 64-bits. Some common examples of structure formats used in embodiments are shown in the following table:

TABLE 1

| Format | Description |
| --- | --- |
| (a) | Single component |
| (x, y) | 2-D Position Coordinate |
| (real, imm) | Complex Number |
| (x, y, z) | 3-D Vector |
| (r, g, b) | Pixel |
| (x, y, z, w) | 4-D Vector |

Figure 17:
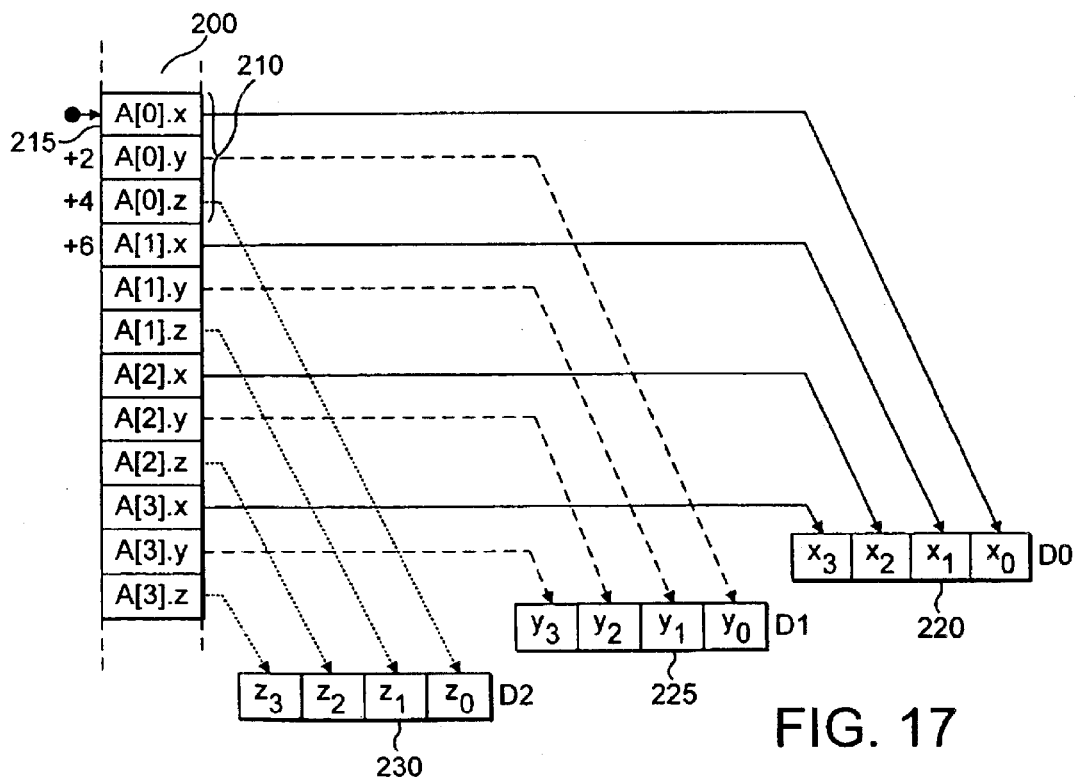
FIG. 17 is a diagram schematically illustrating how data elements are loaded from a continuous block of memory into some specified registers in accordance with one embodiment.

For any particular load or store instruction, each structure in memory the subject of the access will have the same structure format, and accordingly will include the same number of components. The load and store instructions are arranged to identify the number of components in the structure format, and this information is used by the reordering logic 24 to provide de-interleaving of data elements when performing load operations, and interleaving of data elements when performing store operations, allowing data to be arranged in registers such that the different data elements of the structure appear in different registers. This concept is illustrated schematically in FIG. 17 for the situation of a load instruction used to load a number of data elements from a continuous block of memory into three specified registers. In this example, the specified registers are the three 64-bit registers D0 220, D1-225 and D2 230. In this example, the structure format is a 3D vector format, and accordingly each structure 210 in the memory 200 has three components 215.

As shown in FIG. 1, the load instruction is routed from the instruction pipeline 12 to the scaler decoder 14, resulting in appropriate memory access control signals being sent to the load store unit (LSU) 22. The LSU then accesses the required four structures A[0], A[1], A[2], and A[3] from a continuous block of memory. Accordingly, the LSU 22 can operate in its normal manner. Thereafter, the data is routed via the reordering logic 24 which is arranged to de-interleave the three components in each structure, such that data elements pertaining to the X component are routed to register D0 220, data elements of the Y component are routed to register D1 225, and elements of the Z component are routed to register D2 230.

The ability to load from an array of structures and separate the information into separate registers as part of the load operation can be used to allow data to be immediately ready for efficient SIMD processing.

The reordering logic 24 is also arranged to perform an analogous process when storing data from specified registers back to the continuous block of memory, in this instance the reordering logic 24 performing an interleaving operation in order to reproduce the structure format prior to the data being stored in memory.

As can be seen from FIG. 1, the load instructions are routed from the instruction pipeline to the scalar decoder 14 prior to those instructions reaching the SIMD stages of the instruction pipeline 12. This enables the process of loading the data into the SIMD register files 20 to occur earlier than would otherwise be possible, and has the benefit that a subsequent SIMD processing instruction will not typically have to wait for the data to be loaded before it can begin execution, thereby significantly reducing the latency of load operations. Store instructions however will need to be passed through the instruction pipeline until they can be routed to the SIMD decoder 16, from where appropriate control signals can be used to control the accessing of the data from the SIMD register files 20, and the appropriate reordering within the reordering logic 24 prior to the data being stored via the LSU 22 back to the memory. However, certain parts of the store instruction can be performed whilst in the ARM portion of the instruction pipeline 12, for example checking the address, memory access permissions, etc., to ensure that the instruction will not cause a data abort.

The load and store instructions of embodiments can be viewed as following a single syntax. The syntax can be expressed as follows:

---

V(LD|ST)<st>.<dt>{@<a>} <reglist>, { <n>,} <addr>
where
    <st>      The Structure Format
Data elements in memory are considered as an array of structures having <st> components. This information is used to interleave and de-interleave data elements as they move between memory and the SIMD register store to enable efficient SIMD processing.
    <dt>      The Data Type
This determines the size of the data elements being loaded
    <a>       An Alignment Specifier (optional)
    <reglist>    The SIMD Register List
This determines the SIMD register state that will be written to or read from. For loads, -continued this is precisely the parts of the SIMD register file that will be affected by the instruction. The register list is considered a collection of data elements of size <dt>, split in to <st> vectors of equal length.
Note that the number of bytes within the register list is not necessarily the same as the number of bytes of memory accessed. See the <n> options and FIGS. 20A to 20C.
<n>    Number of Structures (optional)
This defines the number of structures to load or store. This allows a register list to only partially be loaded with memory data, and the remaining parts be zeroed. When it is not supplied, it takes the default value which means the register list and memory access size are the same.
default <n> := elements<dt>(<reglist>) / <st>
<addr>    The Addressing Mode used for the access
    In accordance with embodiments, the addressing mode can take a variety of forms, and in particular the three forms illustrated below:
;//         <addr>
[Rn]      ;// address := Rn
[Rn]!     ;// address := Rn, Rn := Rn + transfer_size (where "transfer_size" is the amount of memory accessed)
[Rn], Rm  ;// address := Rn, Rn := Rn + Rm The semantics discussed above allow single structures or multiple structures to be loaded or stored, logical zeros to be written to remaining parts of registers that are not filled with data from memory, and insertion into registers by using a register list containing scaler qualifiers (e.g. D0[1]). It will be appreciated that in embodiments the actual load and store instructions that are provided will typically be a subset of all possible combinations of the above syntax.

Figure 18:
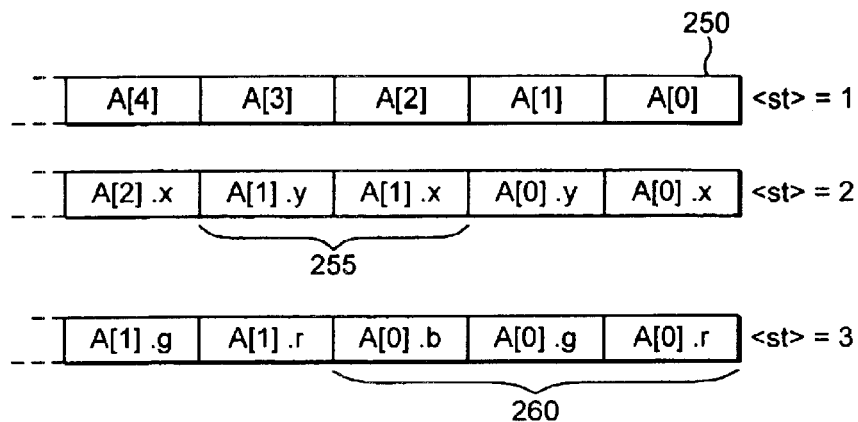
FIG. 18 schematically illustrates some examples of different structures that may exist within memory in accordance with embodiments.

With regard to the structure format, FIG. 18 illustrates three possible examples of structure format, and their corresponding "st" value. As can be seen from FIG. 18, the first structure 250 has only a single component, and accordingly the st value is one. In the second example, the structure 255 has two components, for example representing real part x and imaginary part y of a complex number, and accordingly the st value is two. Finally, in the third example, the structure 260 has three components, representing R, G and B data elements, and accordingly the st value is three.

To help illustrate some of the functionality available when using the load and store instructions of embodiments, FIGS. 19 to 22 illustrate specific examples of load and store instructions. Considering first FIGS. 19A to 19C, FIG. 19A illustrates the reglist states specified by a store instruction VST 2.16 {D0, D1, D2, D3}, [r1]

This instruction is used to store multiple structures from the specified register files to a continuous block of memory. As can be seen, FIG. 19A identifies that the reglist contains four specified registers D0 270, D1 280, D2 290 and D3 300. As shown in FIG. 19B, these registers can be considered as being split into "st" vectors (i.e. 2) of "dt" sized (i.e. 16-bit) data elements. In register D0, these data elements are referenced by the numeral 275, in D1 by the numeral 285, in D2 by the numeral 295 and in D3 by the numeral 305. As can be seen from FIG. 19C, the reordering logic 24 is arranged to interleave data elements from these two vectors so that each data element 314 is stored to the memory 310 in the required structure format for the structure 312.

Figure 20A:
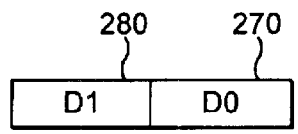
FIGS. 20A to 20C illustrate the operation of a particular example of a single load instruction in accordance with one embodiment.
Figure 20B:
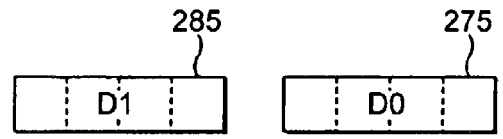
Figure 20C:
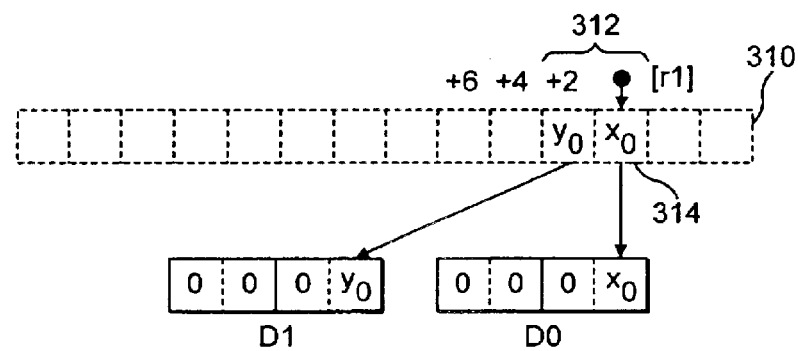

FIGS. 20A to 20C are a similar set of diagrams illustrating the operation performed by the instruction VLD2.16 {D0, D1}, #1, [r1]

FIG. 20A illustrates the collection of the reglist state, identifying the registers D0 270 and D1 280. FIG. 20B then illustrates how these registers are split into st vectors (i.e. 2) of dt sized (i.e. 16-bit) data elements.

Figure 19A:
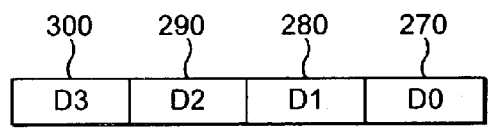
FIGS. 19A to 19C illustrate the operation of a particular example of a single store instruction in accordance with one embodiment.
Figure 19B:
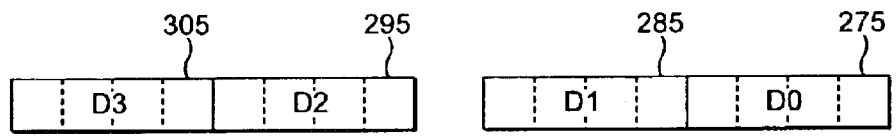
Figure 19C:
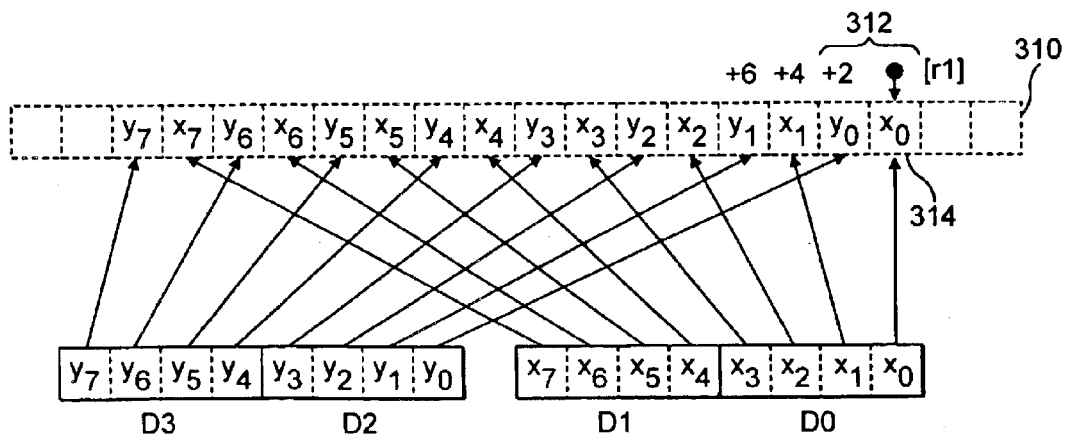

In contrast to the example of FIGS. 19A to 19C, this instruction specifies an "n" parameter identifying the number of structures to be accessed, in this example n being 1. Accordingly, for this load instruction, n×st (i.e. 1×2) data elements need to be read from memory beginning at the effective address and to then be distributed into the vectors in a round-robin allocation beginning at the lowest indexed element of the first vector. This process is illustrated in FIG. 20C, and results in the data element $x_o$ of the first component 314 being written into the lowest 16 bits of the register D0, whilst the data element $y_o$ of the second component is written to the lowest 16 bits of the register D1. In accordance with this embodiment, any parts of the register state not written to once all of the data elements have been loaded are set to zero. It should be noted that for the equivalent store instruction, n×st data elements are stored in the reverse manner to the loads.

Figure 21A:
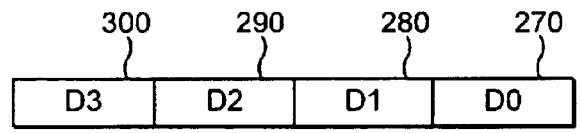
FIGS. 21A to 21C illustrate the operation of a further particular example of a single load instruction in accordance with one embodiment.
Figure 21B:
Figure 21C:
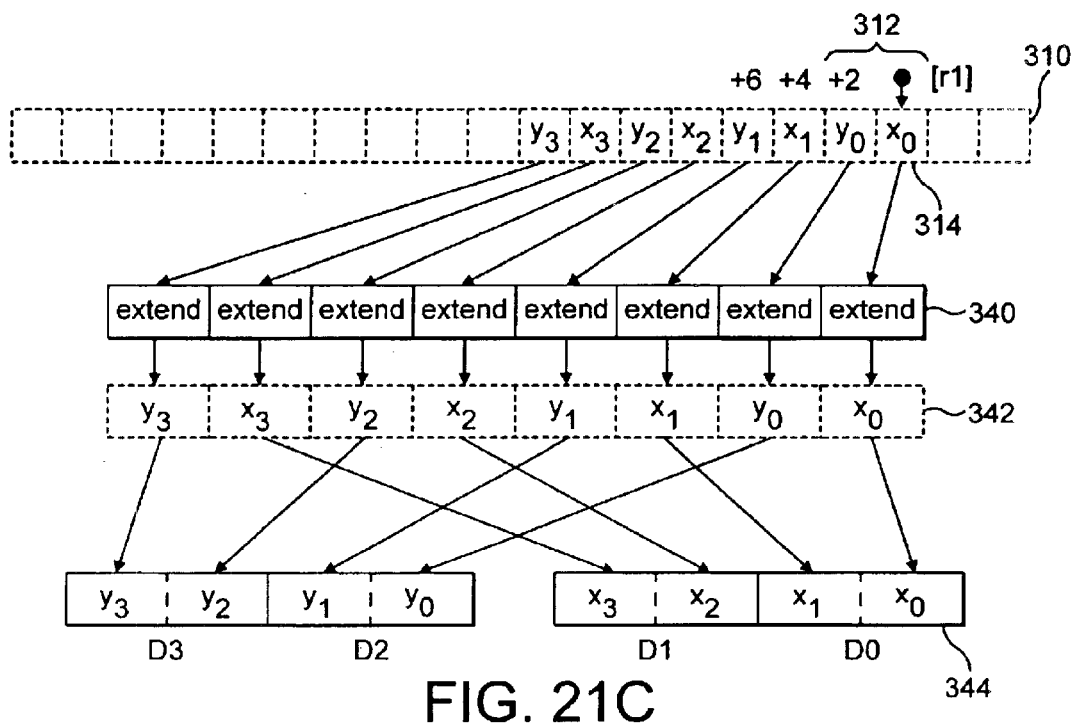

FIGS. 21A to 21C illustrate another particular example in which the syntax for the instructions is extended to allow two data types to be specified, namely the data type for the data elements being accessed and the data type for the resultant data elements to be loaded into the registers, or stored to memory. Accordingly, FIGS. 21A to 21C illustrate the operation performed by the instruction VLD 2.32.S16{D0, D1, D2, D3}, [r1]

As shown in FIG. 21A, the reglist state is collected, identifying registers D0 270, D1 280, D2 290 and D3 300. Then, as shown by FIG. 21B, this register state is split into st vectors (i.e. 2) of dt sized (i.e. 32-bit) data elements, since this instruction specifies that by the time the data elements are stored within the registers, they will be 32 bits in length.

As also specified by the instruction, the data elements in memory are 16-bits in length, and accordingly once the data elements have been accessed from the memory 310, they will be passed through some transformation logic 340 (which optionally can be incorporated as part of the reordering logic 24) which is used to then extend each of the 16-bit data elements to form new 32-bit data elements 342. These data elements are de-interleaved so that data elements of the first component are stored within registers D0 and D1, whilst data elements of the second component are stored within registers D2 and D3.

Figure 22A:
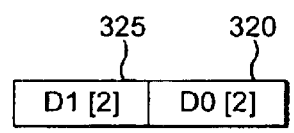
FIGS. 22A to 22C illustrate the operation of another particular example of a single load instruction in accordance with one embodiment.
Figure 22B:
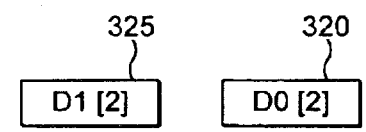
Figure 22C:
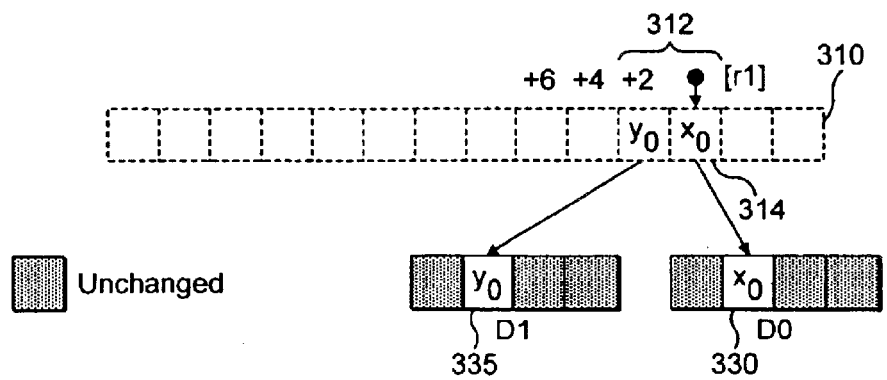

FIGS. 22A to 22C illustrate a further example, and in particular illustrate the operation of the instruction.

VLD2.16 {D0[2], D1[2]}, [r1]

Whilst this instruction can share the same syntax as the previous instructions, this instruction is conceptually a different type of instruction, in that rather than loading data elements from a continuous block of memory in which the data elements are stored as an array of structures, this load instruction only loads a single structure. Further, the data elements of the single structure that are loaded can be placed into any chosen lane of processing within the specified registers. Hence, when considering 64-bit wide registers, and 16-bit data elements, there are four possible lanes of processing within which the data elements can be placed. In preferred embodiments, the chosen lane for the particular instruction is indicated within the reglist data by identifying the particular lane.

Considering FIG. 22A, it can be seen that when the reglist state is collected, this identifies lane 2 320 of register D0, and lane 2 325 of register D1. As shown in FIG. 22B, these are then split into st vectors (i.e. 2) of dt sized (i.e. 16-bit) data elements. Thereafter, as shown in FIG. 22C, once the structure 312 has been accessed from the memory 310, the reordering logic 24 is arranged to direct the data element $x_0$ to lane 2 of the D0 register 330, whilst directing the data element $y_o$ to lane 2 of the D1 register 335. In this example, it will be appreciated that the lanes can be identified in the range from 0 to 3.

For the interested reader, the following tables identify various types of load and store instructions that may be provided in one particular embodiment:

TABLE 2

| Mnemonic | Data Type | Operand Format | Description |
|---|---|---|---|
| VLD1 | .8<br>.16<br>.32<br>.64 | <list>, <addr><br><list> :=<br>{$D_n$}<br>\| {$D_n$, $D_{n+1}$}<br>\| {$D_n$, $D_{n+1}$, $D_{n+2}$}<br>\| {$D_n$, $D_{n+1}$, $D_{n+2}$, $D_{n+3}$} | Load multiple elements |

TABLE 2-continued

| Mnemonic | Data Type | Operand Format | Description |
|---|---|---|---|
| VLD1 | .8<br>.16<br>.32 | <list>, #UIMM, <addr><br><list> :=<br>{$D_n$}<br>\| {$D_n$, $D_{n+1}$} | Load multiple elements and Zero<br>UIMM_1reg = (1) ... (a-1)<br>UIMM_2reg = (a+1) ... (b-1)<br>where<br>a = (64/size<dt>)<br>b = (128/size<dt>) |
| VLD1 | .8<br>.16<br>.32 | Dd[x], <addr> | Load single element |
| VST1 | .8<br>.16<br>.32<br>.64 | <list>, <addr><br><list> :=<br>{$D_n$}<br>\| {$D_n$, $D_{n+1}$}<br>\| {$D_n$, $D_{n+1}$, $D_{n+2}$}<br>\| {$D_n$, $D_{n+1}$, $D_{n+2}$, $D_{n+3}$} | Store multiple elements |
| VST1 | .8<br>.16<br>.32 | <list>, #UIMM, <addr><br><list> :=<br>{$D_n$}<br>\| {$D_n$, $D_{n+1}$} | Store multiple elements<br>UIMM_1reg = (2) ... (a-1)<br>UIMM_2reg = (a+1) ... (b-1) where<br>a = (64/size<dt>)<br>b = (128/size<dt>) |
| VST1 | .8<br>.16<br>.32 | Dd[x], <addr> | Store single element |
| VST1 | | | |

Examples

VLD1.16   D0, [R1]
VLD1.8    {D0, D1}, [R2]!
VLD1.8    Q2, #10, [R2], R7
VLD1.16   D20[3], [R8], R1
VST1.32   {D8, D9, D10, D11}, [R0]!
VST1.32   Q7, #3, [R10]
VST1.8    D30[0], [R0], R14

TABLE 3

| Mnemonic | Data Type | Operand Format | Description |
|---|---|---|---|
| VLD2 | .8<br>.16<br>.32 | <list>, <addr><br><list> :=<br>{$D_n$, $D_{n+1}$}<br>\| {$D_n$, $D_{n+2}$}<br>\| {$D_n$, $D_{n+1}$, $D_{n+2}$, $D_{n+3}$} | Load multiple 2-element structures |
| VLD2 | .8<br>.16<br>.32 | <list>, #1, <addr><br><list> :=<br>{$D_n$, $D_{n+1}$}<br>\| {$D_n$, $D_{n+2}$} | Load single 2-element structure and Zero |
| VLD2 | .8<br>.16<br>.32 | <list>, <addr><br><list> :=<br>{$D_n$[x], $D_{n+1}$[x]}<br>\| {$D_n$[x], $D_{n+2}$[x]} | Load single 2-element structure where list {$D_n$[x], $D_{n+2}$[x]} not available when dt = 8 |
| VST2 | .8<br>.16<br>.32 | <list>, <addr><br><list> :=<br>{$D_n$, $D_{n+1}$}<br>\| {$D_n$, $D_{n+2}$}<br>\| {$D_n$, $D_{n+1}$, $D_{n+2}$, $D_{n+3}$} | Store multiple 2-element structures |
| VST2 | .8<br>.16<br>.32 | <list>, <addr><br><list> :=<br>{$D_n$[x], $D_{n+1}$[x]}<br>\| {$D_n$[x], $D_{n+2}$[x]} | Store single 2-element structure where list {$D_n$[x], $D_{n+2}$[x]} not available when dt = 8 |

TABLE 3-continued

| Mnemonic | Data Type | Operand Format | Description |
|---|---|---|---|

Examples

| | | |
|---|---|---|
| VLD2.16 | {D0, D1}, [R1] | |
| VLD2.32 | {D2, D3, D4, D5}, [R3]! | |
| VLD2.8 | {D0, D1}, #1, [R1], R7 | |
| VLD2.16 | {D2[1], D4[1]}, [R6] | |
| VST2.8 | {D20, D21}, [R0] | |
| VST2.32 | {D20[0], D21[0]}, [R5], R6 | |

TABLE 4

| Mnemonic | Data Type | Operand Format | Description |
|---|---|---|---|
| VLD3 | .8<br>.16<br>.32 | <list>, <addr><br><br><list> :=<br>{$D_n$, $D_{n+1}$, $D_{n+2}$}<br>\| {$D_n$, $D_{n+2}$, $D_{n+4}$} | Load multiple 3-element structures |
| VLD3 | .8<br>.16<br>.32 | <list>, #1, <addr><br><br><list> :=<br>{$D_n$, $D_{n+1}$, $D_{n+2}$}<br>\| {$D_n$, $D_{n+2}$, $D_{n+4}$} | Load single 3-element structure and Zero |
| VLD3 | .8<br>.16<br>.32 | <list>, <addr><br><br><list> :=<br>{$D_n[x]$, $D_{n+1}[x]$, $D_{n+2}[x]$}<br>\| {$D_n[x]$, $D_{n+2}[x]$, $D_{n+4}[x]$} | Load single 3-element structure where list {$D_n[x]$, $D_{n+2}[x]$, $D_{n+4}[x]$} not available when dt = 8 |
| VST3 | .8<br>.16<br>.32 | <list>, <addr><br><br><list> :=<br>{$D_n$, $D_{n+1}$, $D_{n+2}$}<br>{$D_n$, $D_{n+2}$, $D_{n+4}$} | Store multiple 3-element structures |
| VST3 | .8<br>.16<br>.32 | <list>, <addr><br><br><list> :=<br>{$D_n[x]$, $D_{n+1}[x]$, $D_{n+2}[x]$}<br>\| {$D_n[x]$, $D_{n+2}[x]$, $D_{n+4}[x]$} | Store single 3-element structure where list {$D_n[x]$, $D_{n+2}[x]$, $D_{n+4}[x]$} not available when dt = 8 |

Examples

| | |
|---|---|
| VLD3.8 | {D0, D1, D2}, [R1]! |
| VLD3.16 | {D2, D3, D4}, #1, [R3], R4 |
| VLD3.16 | {D2[1], D3[1], D4[1]}, [R3], R4 |
| VST3.32 | {D20, D22, D24}, [R7] |
| VST3.8 | {D0[0], D1[0], D2[0]}, [R10], R14 |

TABLE 5

| Mnemonic | Data Type | Operand Format | Description |
|---|---|---|---|
| VLD4 | .8<br>.16<br>.32 | <list>, <addr><br><br><list> :=<br>{$D_n$, $D_{n+1}$, $D_{n+2}$, $D_{n+3}$}<br>\| {$D_n$, $D_{n+2}$, $D_{n+4}$, $D_{n+6}$} | Load multiple 4-element structures |
| VLD4 | .8<br>.16<br>.32 | <list>, #1, <addr><br><br><list> :=<br>{$D_n$, $D_{n+1}$, $D_{n+2}$, $D_{n+3}$}<br>\| {$D_n$, $D_{n+2}$, $D_{n+4}$, $D_{n+6}$} | Load single 4-element structure and Zero |
| VLD4 | .8<br>.16<br>.32 | <list>, <addr><br><br><list> :=<br>{$D_n[x]$, $D_{n+1}[x]$, $D_{n+2}[x]$, $D_{n+3}[x]$}<br>\| {$D_n[x]$, $D_{n+2}[x]$, $D_{n+4}[x]$, $D_{n+6}[x]$} | Load single 4-element structure where list {$D_n[x]$, $D_{n+2}[x]$, $D_{n+4}[x]$, $D_{n+6}[x]$} not available when dt = 8 |

TABLE 5-continued

| Mnemonic | Data Type | Operand Format | Description |
|---|---|---|---|
| VST4 | .8<br>.16<br>.32 | <list>, <addr><br><br><list> :=<br>{$D_n$, $D_{n+1}$, $D_{n+2}$, $D_{n+3}$}<br>\| {$D_n$, $D_{n+2}$, $D_{n+4}$, $D_{n+6}$} | Store multiple 4-element structures |
| VST4 | .8<br>.16<br>.32 | <list>, <addr><br><br><list> :=<br>{$D_n[x]$, $D_{n+1}[x]$,<br>$D_{n+2}[x]$, $D_{n+3}[x]$}<br>\| {$D_n[x]$, $D_{n+2}[x]$,<br>$D_{n+4}[x]$, $D_{n+6}[x]$} | Store single 4-element structure<br>where<br>list {$D_n[x],D_{n+2}[x],D_{n+4}[x],D_{n+6}[x]$}<br>not available when dt = 8 |

Examples

```
VLD4.8    {D0, D1, D2, D3}, [R1]!
VLD4.16   {D2, D3, D4, D5}, #1, [R3]
VLD4.16   {D2[1], D4[1], D6[1], D8[1]}, [R3], R4
VST4.32   {D20, D22, D24, D26}, [R7]
VST4.8    {D20[5], D21[5], D22[5], D23[5]}, [R1], R4
```

Figure 23:
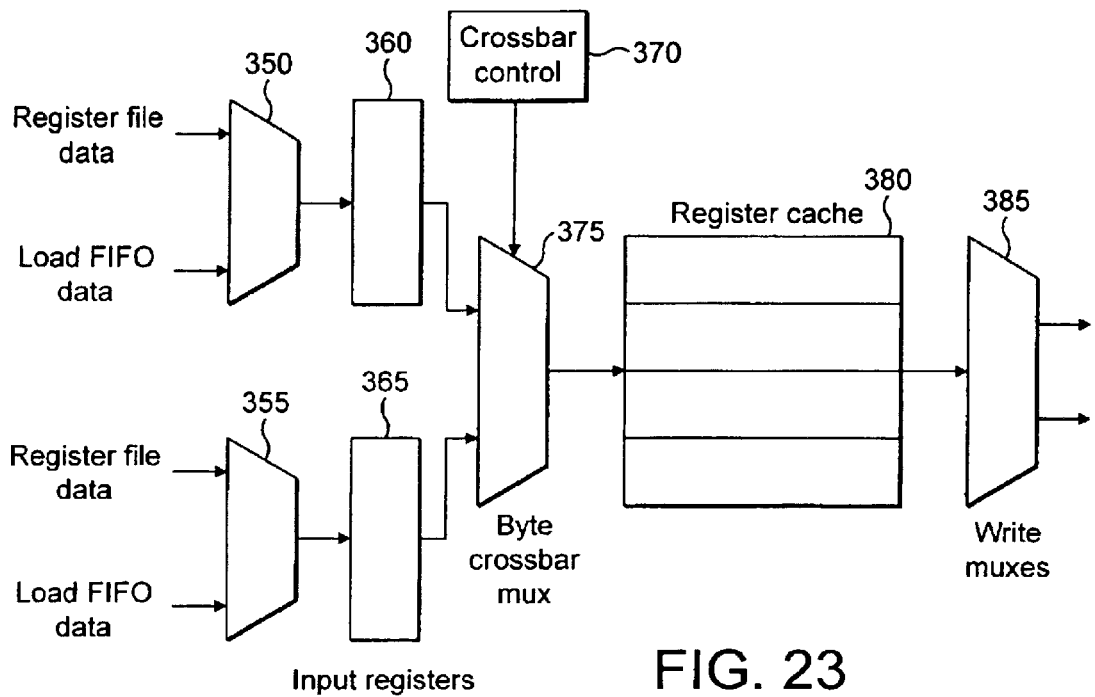
FIG. 23 is a block diagram illustrating in more detail the logic provided within the reordering logic of FIG. 1.

In one embodiment, the reordering logic 24 of FIG. 1 takes the form illustrated in FIG. 23. The logic of FIG. 23 includes two multiplexers 350, 355 at its inputs, which in the event of a load instruction are arranged to receive data from a load FIFO 23 associated with the LSU 22 illustrated in FIG. 1, or in the event of a store instruction are arranged to receive data from the SIMD register store 20. Further, in some situations, a load instruction may also cause the logic of FIG. 23 to receive data from the SIMD register store 20. The multiplexers 350, 355 are controlled to choose between the different inputs, and to route the chosen inputs to the associated input registers 360, 365. In one embodiment, each input register is able to store 64 bits of data. The data stored in the input registers is then read through the crossbar multiplexer 375 into the register cache 380, crossbar control register 370 providing drive signals to the crossbar multiplexer to direct individual bytes of data received from the input registers to desired byte locations within the register cache. The values in control register 370 are derived by the instruction decoder.

As shown in FIG. 23, the register cache 380 can be considered as consisting of four registers, and in one embodiment each register is 64 bits in length.

After data has been stored in the register cache 380, it can then be read via output multiplexers 385 to either the store data FIFO 23' associated with the LSU 22 (in the event of a store instruction), or the SIMD register file 20 (in the event of a load instruction).

Whilst the byte crossbar multiplexer 375 can read the input registers at byte granularity and write into the register cache at byte granularity, the write multiplexers 385 read from the register cache at 64-bit granularity.

The reordering logic 24 is largely autonomous from the rest of the SIMD processing logic 18, but is given instructions in program order in the same fashion as other functional units within the integrated circuit. In one embodiment, it has two register file read ports and two write ports which it controls itself. In order that hazards are detected and avoided the reordering logic 24 may be arranged to communicate with some interlock logic (not shown) using scoreboards.

Store instructions from the SIMD register file 20 are performed out-of-order with respect to other SIMD instructions, but remain in-order with respect to other store instructions from the SIMD register file. Pending stores are kept in a queue, and when the store data is ready it is read and passed into the store FIFO 23' associated with the LSU 22 via the reordering logic 24.

In one embodiment, all data passing between memory and the SIMD register file 20 is routed via the reordering logic 24. However, in an alternative embodiment, a bypass path around the reordering logic 24 may be provided for situations where it is determined that no reordering is required.

The register cache 380 is referred to as a "cache" since under certain conditions it caches register values before they are written to the SIMD register file 20. The register cache holds data in the format that data is to be output from the reordering logic 24.

Figure 24A:
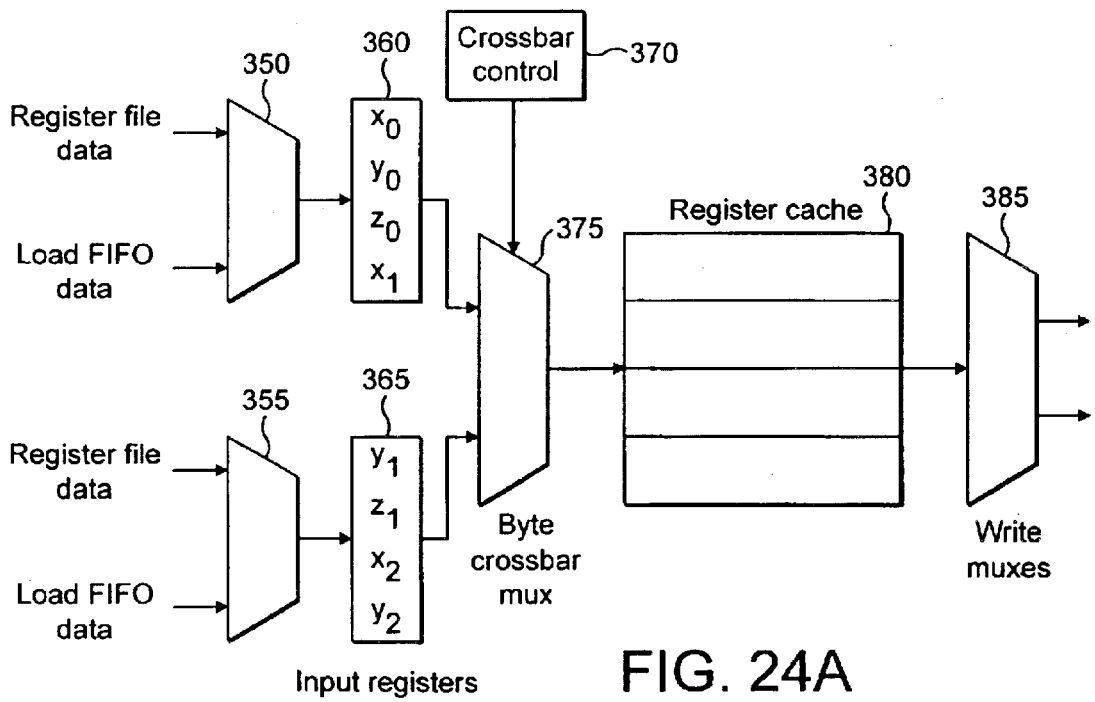
FIGS. 24–26 illustrate the flow of data through the reordering logic for four different sequences of single access instructions in accordance with embodiments.
Figure 24B:
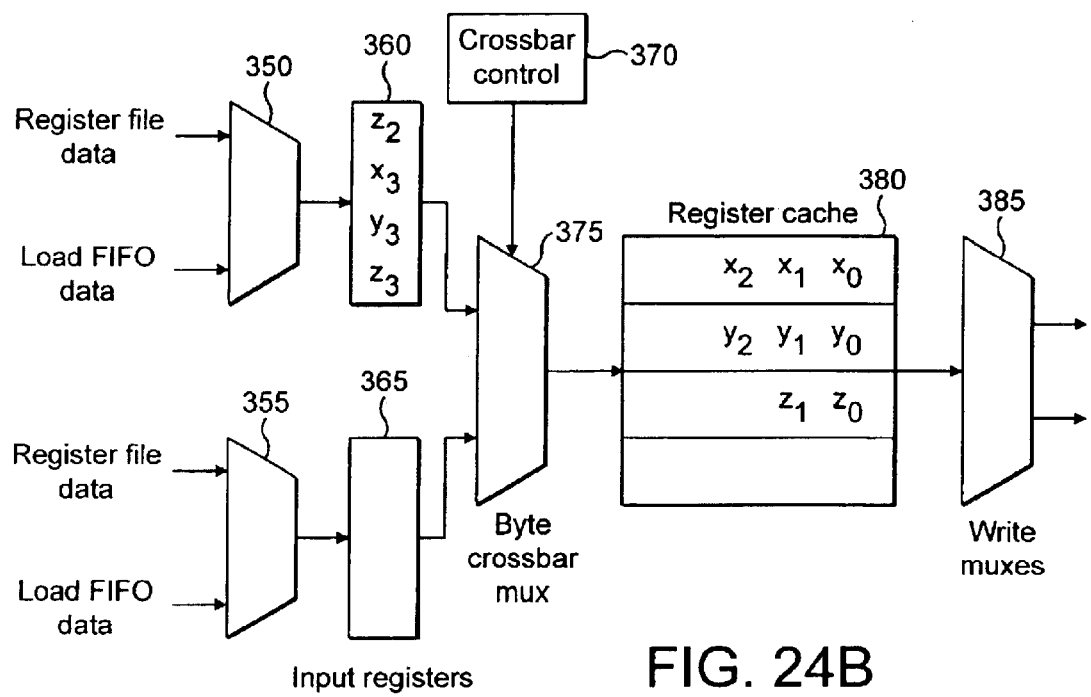
Figure 24C:
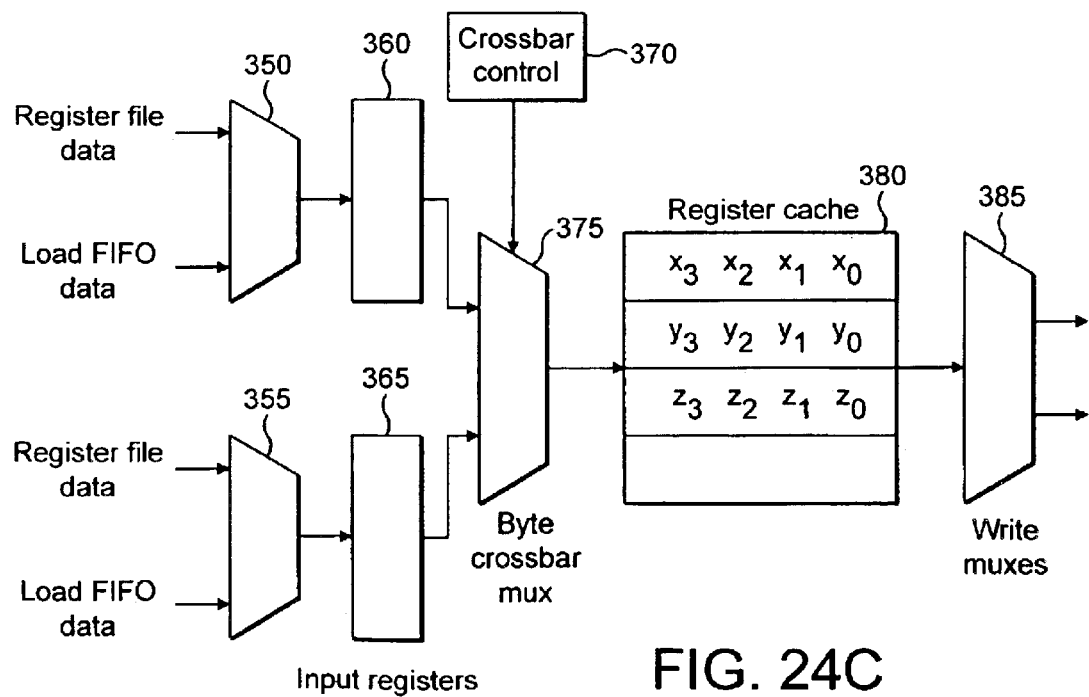

FIGS. 24A to 24C illustrate the operation of the reordering logic 24 to implement the necessary reordering required when performing an instruction of the type VLD 3.16 {D0, D1, D2}, [r1].

Once the data has been loaded by the LSU 22, then in a first cycle (as shown in FIG. 24A) 64 bits of the retrieved data is loaded via multiplexer 350 into the input register 360, whilst the next 64 bits are loaded via the multiplexer 355 into the input registers 365. In the example illustrated in FIGS. 24A through 24C, it is assumed that the structure format represents a 3D vector having components x, y, z. In the next cycle, as shown in FIG. 24B, the 16-bit data elements within the input registers are read into the register cache 380 via the byte crossbar multiplexer 375 which reorders the data so that any data elements relating to x components are placed in a first register, any data elements relating to y components are placed in a second register, and any data elements relating to z components are placed in a third register of the register cache. Also during this cycle, the next 64 bits of data from the load FIFO 23 are loaded via multiplexer 350 into the input register 360.

In the next cycle, as shown in FIG. 24C, the data elements from the input register 360 are routed through the byte crossbar multiplexer into the register cache, with the x, y and z components being de-interleaved as discussed earlier. As shown in FIG. 24C, this results in the register cache containing four x components in a first register, four y components in a second register, and four z components in a third register. The contents of the register cache can then be output via the write multiplexers 385, two registers at a time, to the registers specified by the load instruction.

Figure 25A:
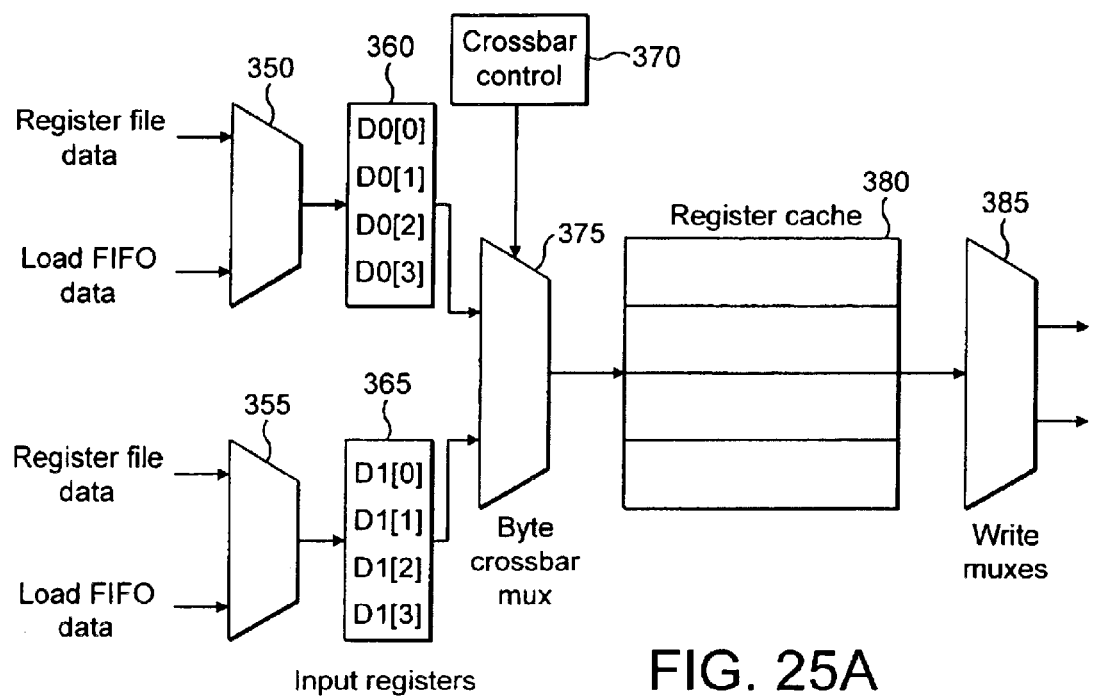
Figure 25B:
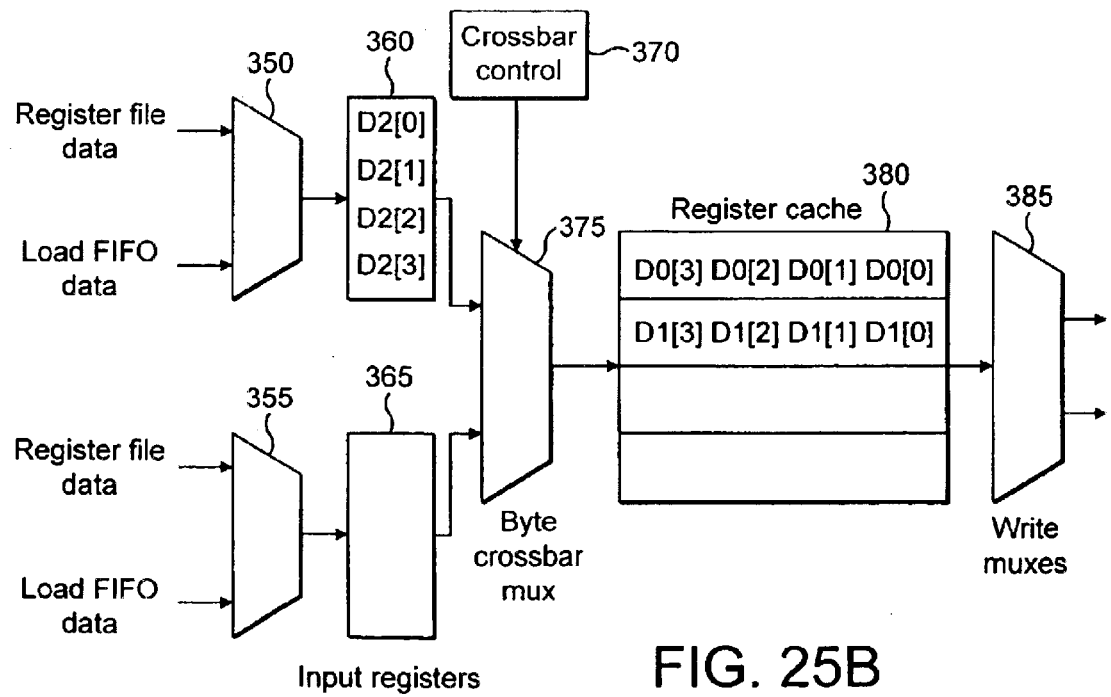

FIGS. 25A–25D illustrate a second example of the flow of data through the reordering logic in order to perform the necessary reordering required when executing the instruction VLD 3.16 {D0[1], D1[1], D2[1]}, [r1]. In accordance with this instruction, data is going to be loaded into a particular lane of the registers D0, D1 and D2, namely the second 16-bit wide lane of four 16-bit wide lanes within those registers. Before a data element can be stored in a particular lane of a register, the current contents of the register need to be retrieved, so that when the register is subsequently written to, the contents of the register are written as a whole. This feature avoids the need to provide for any writing to only a portion of a register in the SIMD register file 20. Accordingly, during a first cycle, as shown in FIG. 25A, the current contents of the registers D0 and D1 are read from the SIMD register file via the multiplexers 350, 355 into the input registers 360, 365. In the next cycle, as shown in FIG. 25B, these contents are read into the register cache 380 through the crossbar multiplexer 375 with the contents of D0 being placed in a first register and the contents of D1 being placed in a second register of the register cache. During the same cycle, the contents of the register D2 are retrieved from the SIMD register file via the multiplexer 350 and stored in the input register 360.

Figure 25C:
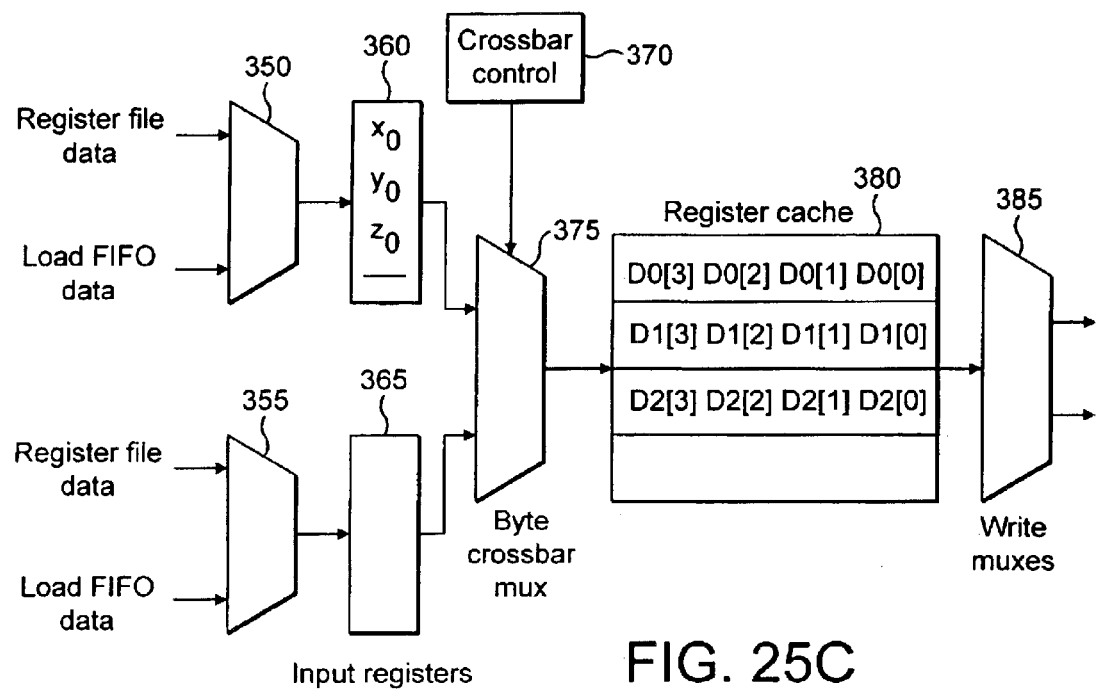
Figure 25D:
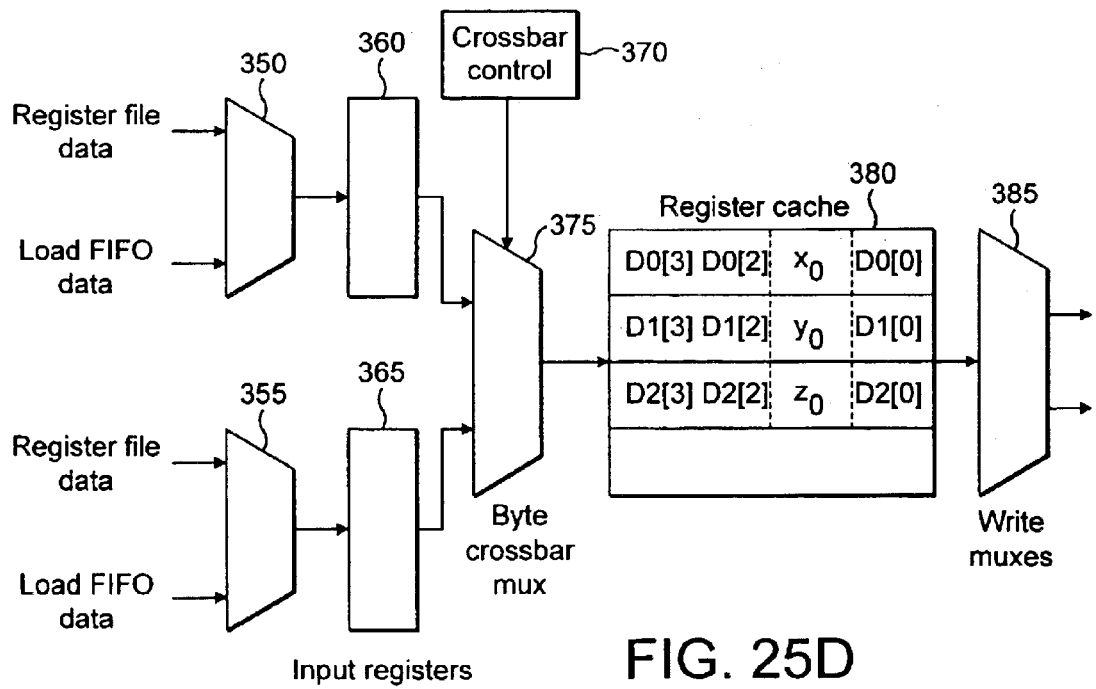

In the next cycle, as shown in FIG. 25C, the contents of the register D2 are read into the register cache 380 via the crossbar multiplexer 375, such that they are stored in a third register of the register cache. During the same cycle, the data structure the subject of the load, which typically will have already have been retrieved by the LSU, is read from the load FIFO 23 via the multiplexer 350 into the input registers 360. In the example illustrated in FIG. 25C, it is again considered that the structure in memory represents 3D vector data with components x, y and z. In the next cycle, as shown in FIG. 25D, the x, y and z components are read into the second lane of data elements via the crossbar multiplexer 375, so that the data element $x_0$ overwrites within the register cache the previous contents of the second lane of register D0, the component $y_0$ overwrites within the register cache the data element previously in the second lane of the register D1, and the component $z_0$ overwrites within the register cache the data element previously stored in the second lane of the register D2.

It will be appreciated that at this point the actual contents of the registers D0, D1 and D2 in the SIMD register file have not yet changed. However, the data stored in the register cache can now be output via the write multiplexers 385 back to the registers D0, D1, D2 to overwrite the previous contents. As a result, it can be seen that a single load instruction can be used to load the components of a particular structure from memory, and to then insert the individual components of that structure into different registers at a chosen lane location.

Figure 25E:
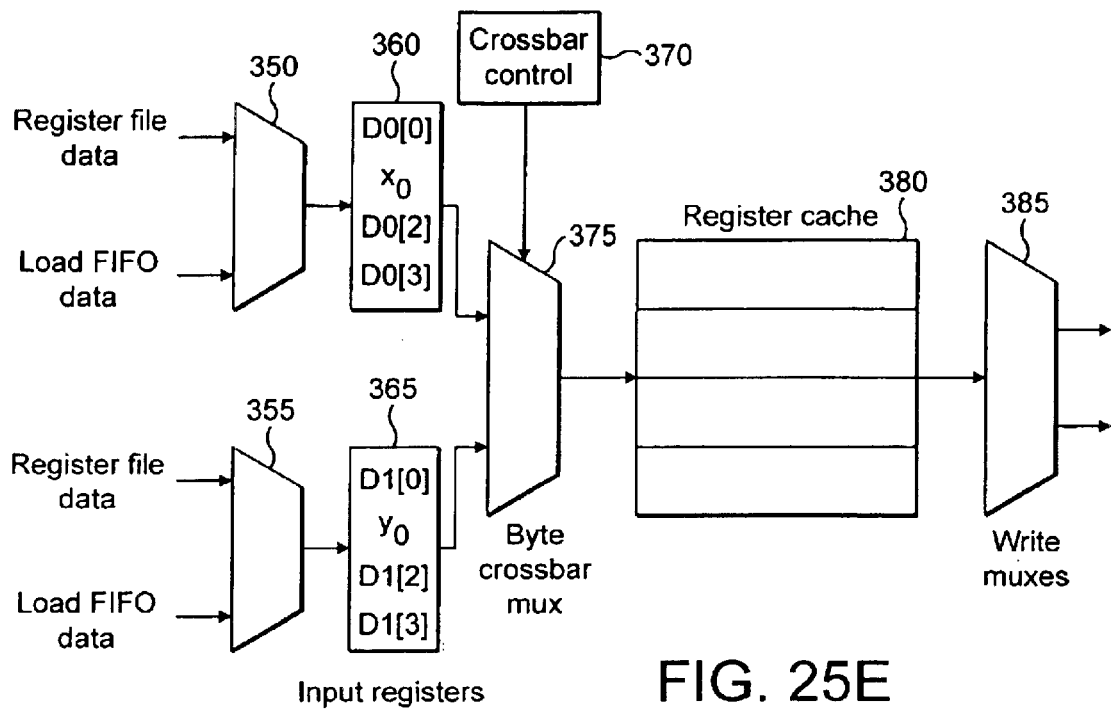
Figure 25F:
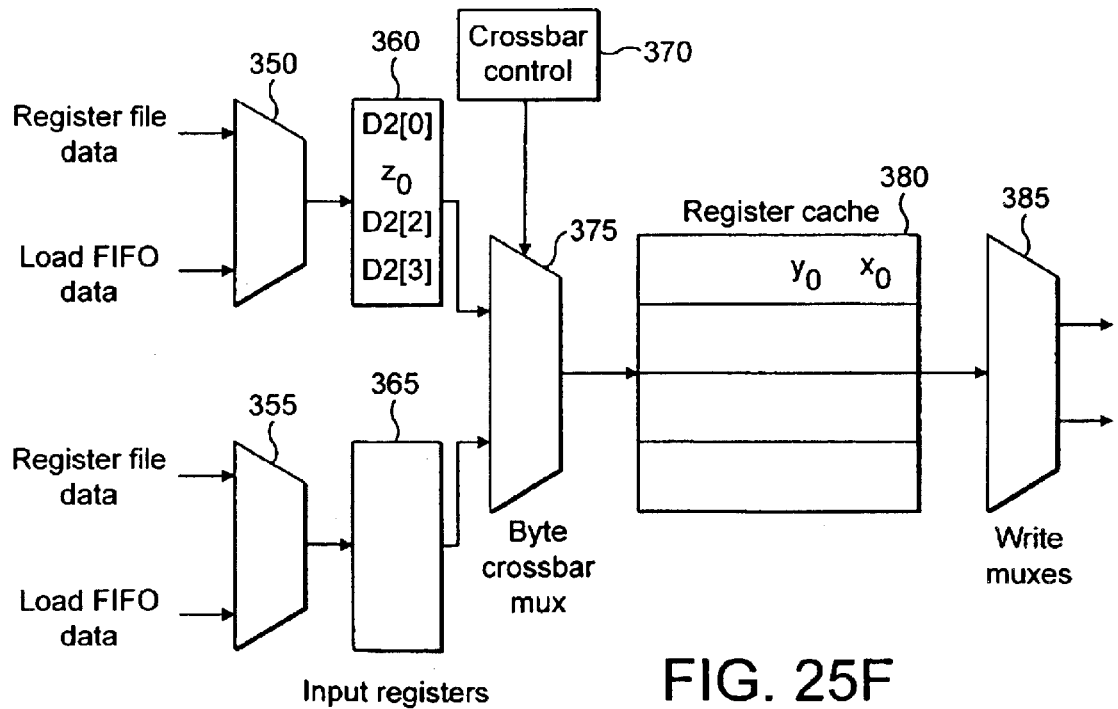

FIGS. 25E to 25H illustrate a third example of a flow of the data through the reordering logic in order to perform the necessary reordering required when executing the complementary store instruction to the load instruction that was discussed earlier with reference to FIGS. 25A to 25D. Accordingly, FIGS. 25E to 25H illustrate the steps required to perform the necessary reordering when executing the instruction VST 3.16 {D0[1], D1[1], D2[1]}, [r1]. Hence, in accordance with this instruction, data is going to be stored from the second 16-bit wide lane of the registers D0, D1 and D2 back to memory. As shown in FIG. 25E, during a first cycle, the current contents of the registers D0 and D1 are read from the SIMD register file via the multiplexers 350, 355 into the input registers 360, 365. In the next cycle, as shown in FIG. 25F, the data elements in the second lane, i.e. the values $x_0$ and $y_0$, are read into a first register of the register cache 380 through the crossbar multiplexer 375.

During the same cycle, the contents of the register D2 are retrieved from the SIMD register file via the multiplexer 350 and stored in the input register 360.

Figure 25G:
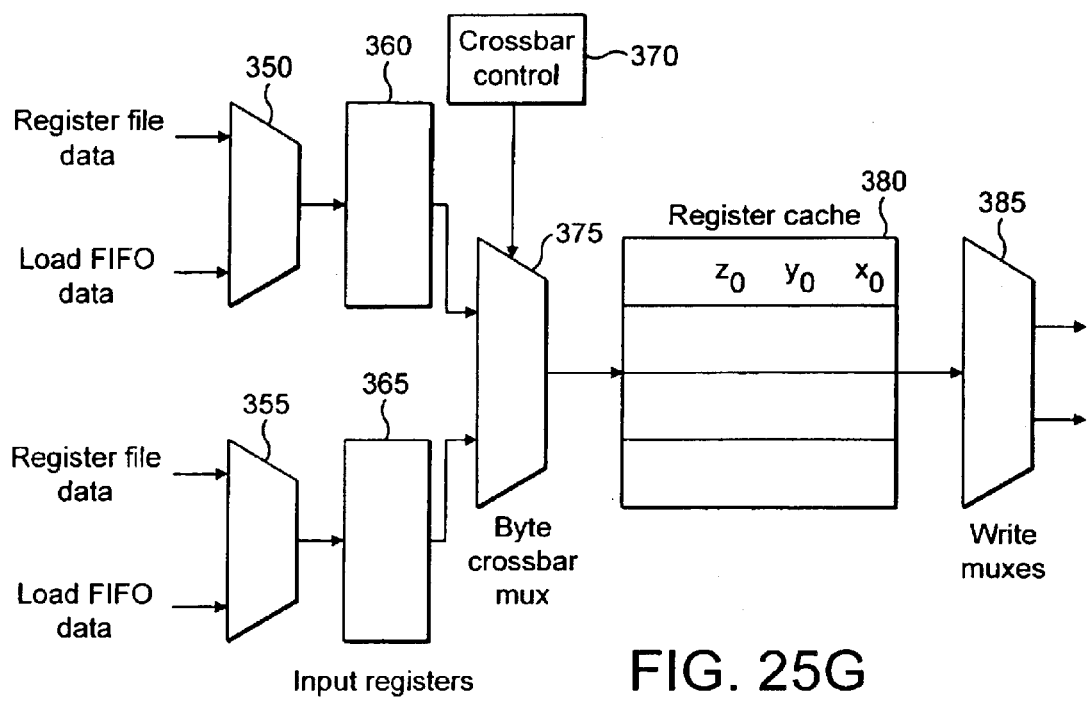
Figure 25H:
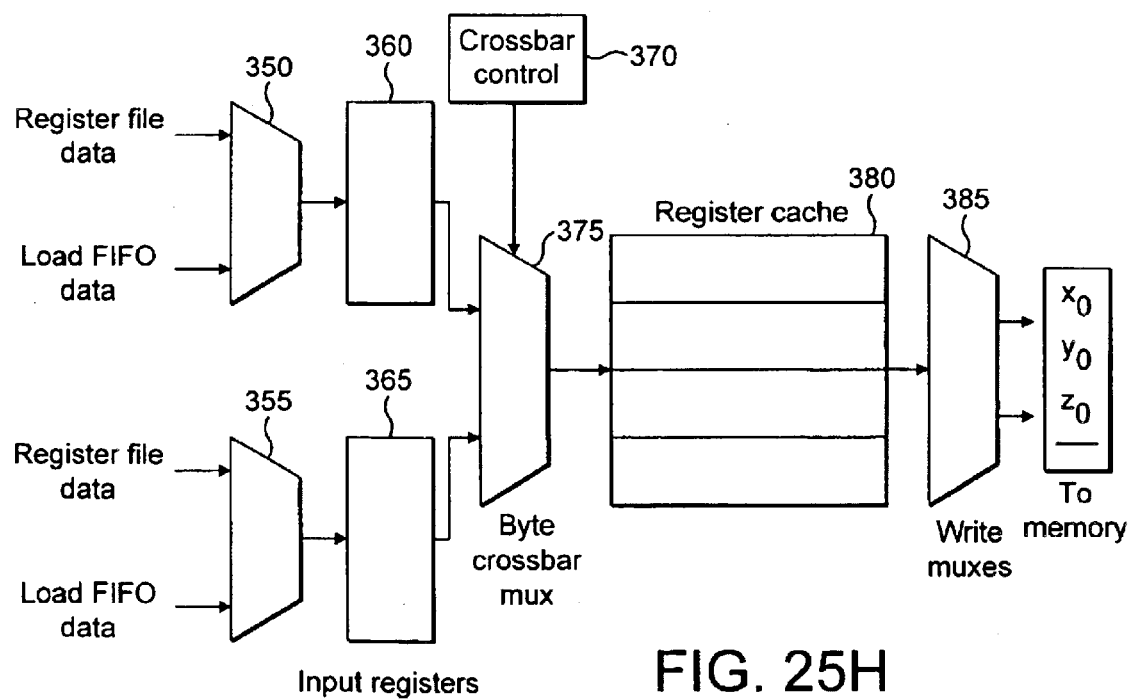

In the next cycle, as shown in FIG. 25G, the data element in the second lane of register D2 is read into the first register of the register cache 380 via the crossbar multiplexer 375. Then, in the next cycle, as shown in FIG. 25H, the x, y and z components can now be output by the write multiplexers 385 to the LSU for storing back to memory. It will be appreciated that at this stage the data elements have now been reordered into the structure format required for storage in memory.

FIGS. 26A to 26E illustrate the reordering that takes place within the reordering logic during execution of the following sequence of four instructions:

VLD 3.16 {D0, D1, D2}, #1, [r1]
VLD 3.16 {D0[1], D1[1], D2[1]}, [r2]
VLD 3.16 {D0[2], D1[2], D2[2]}, [r3]
VLD 3.16 {D0[3], D1[3], D2[3]}, [r4]

Figure 26A:
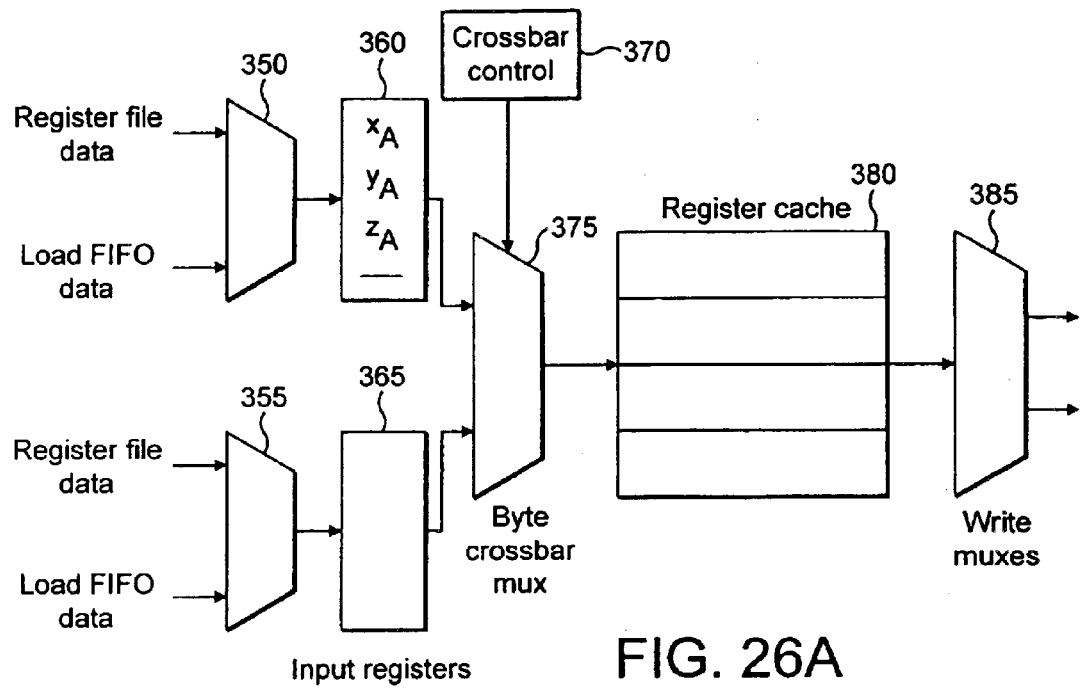
Figure 26B:
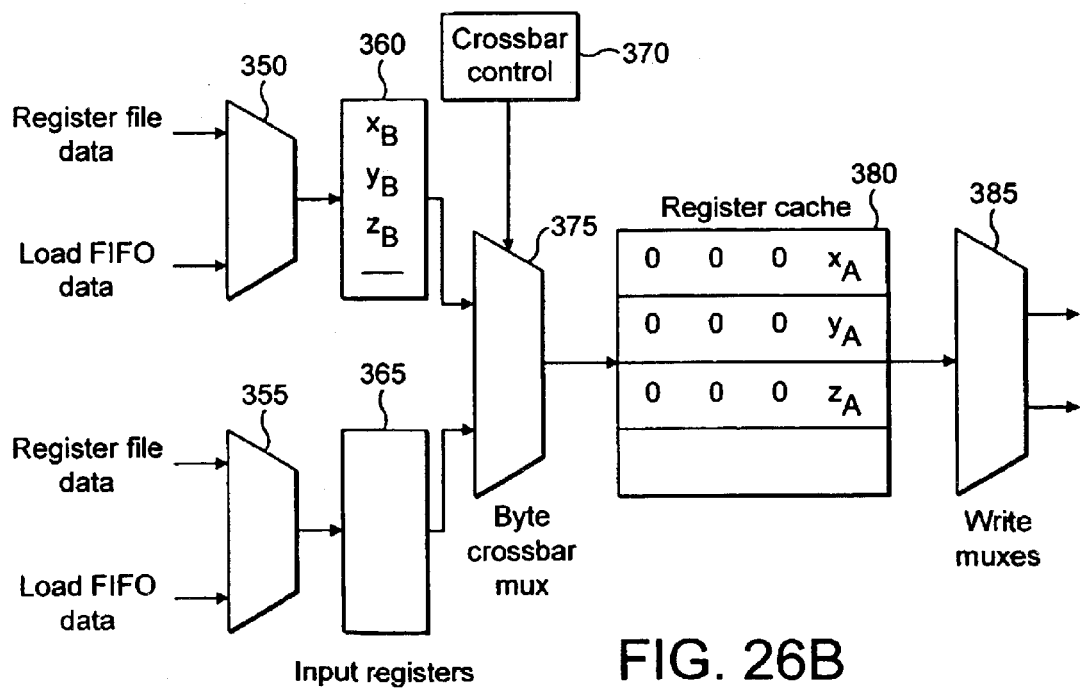
Figure 26C:
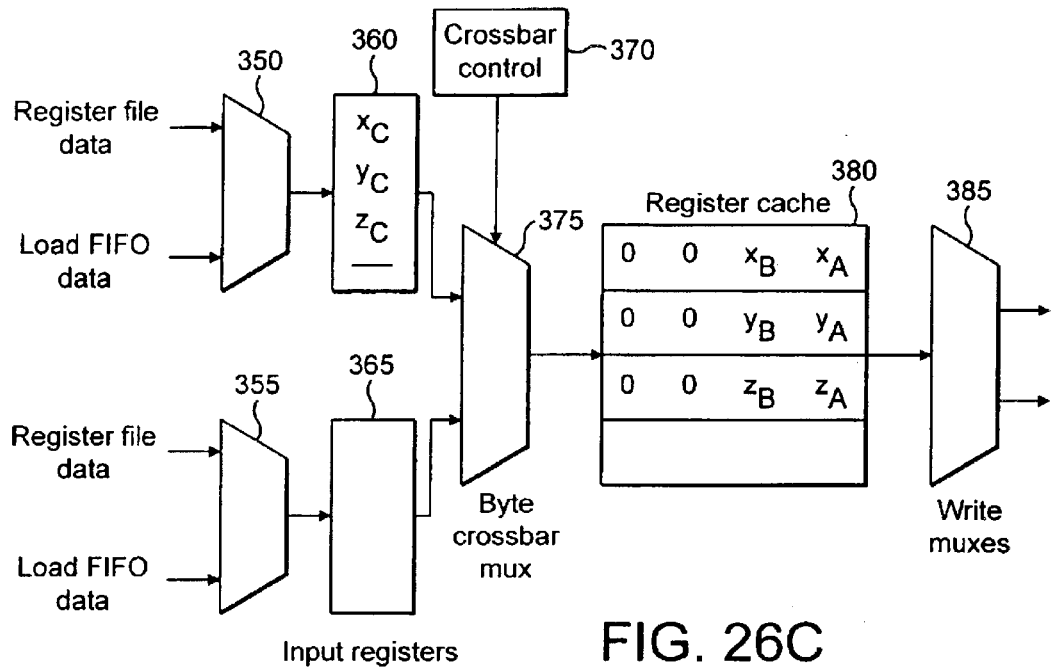

Once the data identified by the first load instruction has been retrieved by the LSU, it is read via the multiplexer 350 into the input register 360 during a first cycle (see FIG. 26A). In the next cycle, it is read into the register cache 380 via the crossbar multiplexer 375, such that the x, y and z components are placed in different registers of the register cache. The "#1" within the first instruction signifies that each data element should be placed in the least significant data lanes of each register, and that the remaining lanes should be filled with logic 0 values, this being shown in FIG. 26B. Also during this cycle, the data elements identified by the second load instruction are retrieved into the input register 360. During the next cycle (see FIG. 26C), the data elements stored in the input register 360 are moved into the register cache 380 via the cross bar multiplexer 375, where they are stored in the second lane. Also during this cycle, the data elements of the third load instruction are placed within the input register 360.

Figure 26D:
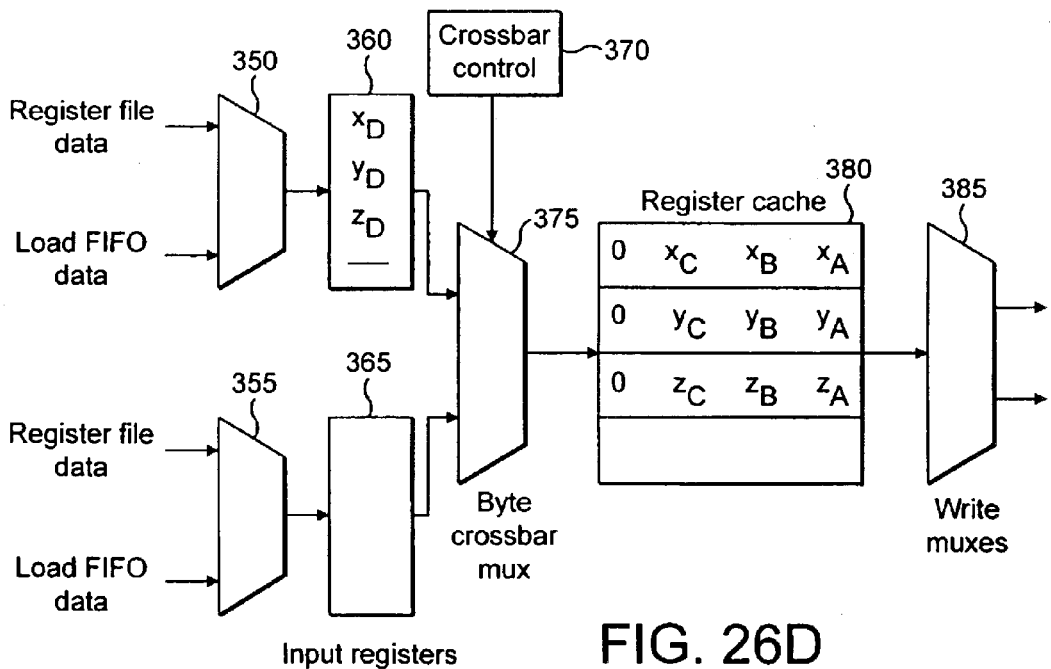

In the next cycle, the contents of the input register 360 are routed via the crossbar multiplexer 375 into the third lane of the register cache, whilst the data elements of the subject of the fourth load instruction are retrieved into the input register 360. This is shown in FIG. 26D.

Figure 26E:
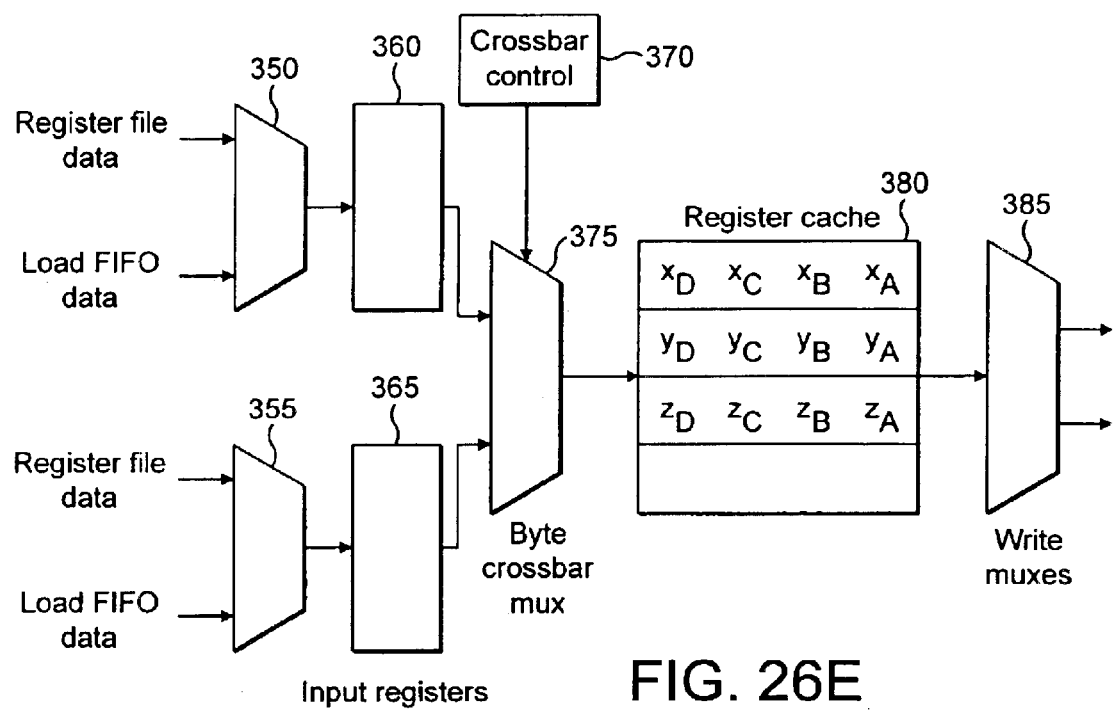

Finally, as shown in FIG. 26E, in the next cycle these data elements are routed via the crossbar multiplexer 375 into the register cache 380, where they are stored in the fourth lane. Thereafter, the 64-bit wide chunks of data in each register of the register cache can be output to the specified registers of the SIMD register file.

It should be noted that in contrast to the approach taken in FIGS. 25A to 25D, the use of the first VLD instruction illustrated with reference to FIGS. 26A to 26E, whereby once the data elements have been placed in a particular lane, the remaining lanes are filled with 0 values, avoids the need to retrieve from the SIMD register file the current contents of any of the registers D0 to D2 before any updates are made. From a review of FIGS. 26A to 26E, it can be seen that the register cache 380 in this instance acts as a "write through cache", since it caches the data elements for a sequence of load instructions, and when each instruction is completed, writes the data to the relevant registers of the SIMD register file. However, the register file does not typically need to be read from whilst each subsequent instruction in the sequence is being performed.

It is often required in data processing to reduce a so-called vector of elements to a single element by applying a commutative and associative operator 'op' between all the elements. This will be described as a folding operation. Typical examples of folding operations are to sum the elements of a vector, or find the maximum value of the elements in a vector.

Figure 27:
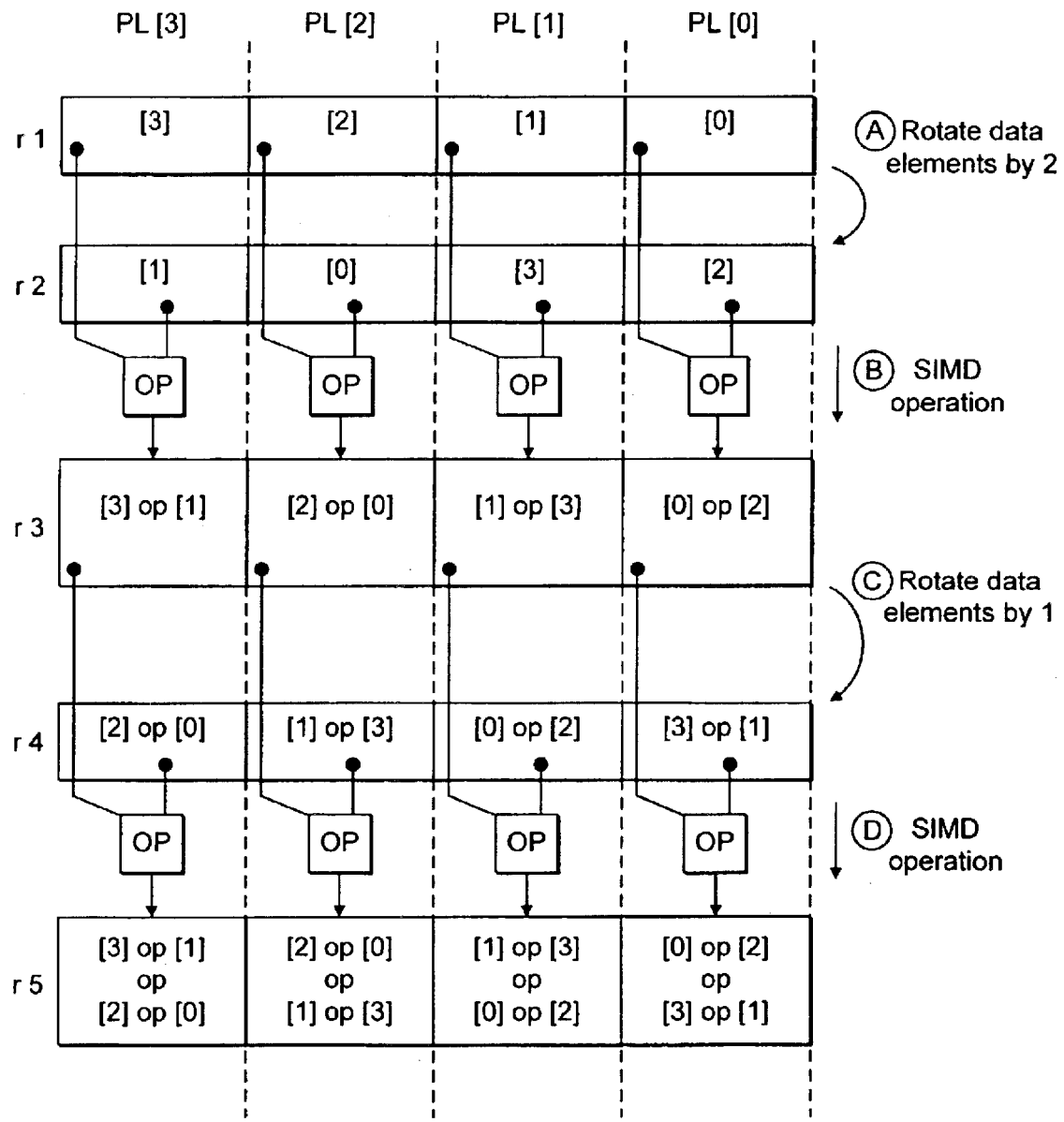
FIG. 27 illustrates a known folding operation.

In a parallel processing architecture, one known approach used to perform such a folding operation is described with reference to FIG. 27. The data elements [0] to [3] to be folded are contained a register r1. It will be appreciated that a benefit of parallel processing architectures is that it can enable the same operation to be performed concurrently on multiple data elements. This is concept can be more clearly understood with reference to so-called parallel processing lanes. In this example, each parallel processing lane contains one of the data element [0] to [3].

Firstly, at step A, a first instruction is issued which causes rotation of the data elements by two places to form rotated data elements in register r2. This places different data elements in each processing lane so that Single Instruction Multiple Data (SIMD) operation can be applied at step B.

Thereafter, at step B, a second instruction is issued which causes a SIMD operation to be performed on the data elements in each lane. In this example, the resultant data elements of these multiple parallel operations are stored in register r3. Accordingly, it can be seen that entries in r3 now contain the results of the combination of half of data elements of the register r1 (i.e. r3 contains: [0] op [2]; [1] op [3]; [2] op [0]; and [3] op [1]).

Next, a third instruction is issued which causes the results stored in the register r3 to be rotated by one parallel processing lane at step C and stored in the register r4. Once again, the rotation of the data elements of stored in r3 with respect to those of r4 enables different data elements to occupy the same parallel processing lane.

Finally, at step D, a fourth instruction is issued which causes a further single instruction multiple data operation to be performed on data elements stored in each lane and the results are stored in register r5.

Accordingly, it can be seen that by using just four instructions all the data elements across the register can be combined and the results stored in each entry in the register r5 (i.e. each entry in r5 contains: [0] op [1] op [2] op [3]). The resultant data element can be read as required from any of the four entries in the register r5.

Figure 28:
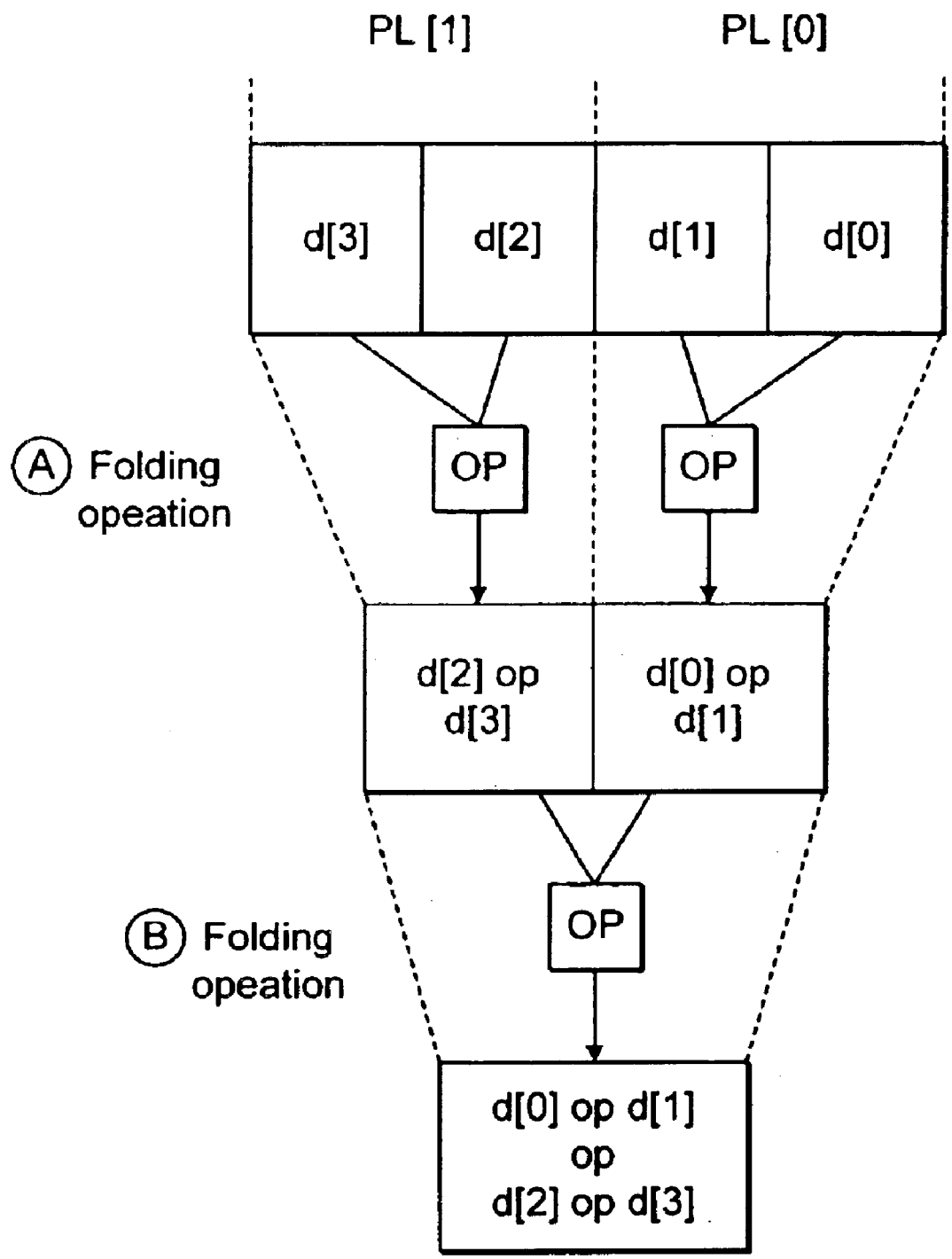
FIG. 28 illustrates a folding operation of one embodiment.

FIG. 28 illustrates the principle of a folding instruction of one embodiment. Unlike the conventional arrangement of parallel processing lanes (which is described with reference to FIG. 27) in which each parallel processing lane has a fixed width throughout the lane which is equal to the width of one data element, in this embodiment the arrangement of the parallel processing lanes differs. In this new arrangement, the width of each parallel processing lane at its input is equal to the width of at least two source data elements and at its output is generally equal to the width of one resultant data element. It has been found that arranging the parallel processing lanes in this way provides significant advantages over prior art arrangements since groups of data elements (for example pairs of data elements) within a single register can be the subject of parallel processing operations. As will be clear from the discussion below, this obviates the need to perform the data manipulation operations of the prior art arrangements (i.e. the rotation operations) since there is no need to arrange data elements in the correct entry locations in further registers in order to enable multiple operations to occur in parallel.

Accordingly, source data elements d[0] to d[3] are provided in respective entries in a register. The adjacent source data elements d[0] and d[1] can be considered as a pair of source data elements. The source data elements d[2] and d[3] can also be considered as a pair of source data elements. Hence, in this example, there are two pairs of source data elements.

At step (A) an operation is performed on each pair of source data elements within the register in order to generate a resultant data element, the same operation occurring on each adjacent pair of source data elements.

Hence, it will be appreciated that the pair of source data elements and the corresponding resultant data element all occupy the same lane of parallel processing. It can be seen that after step (A) the number of resultant data elements is half that of the number of source data elements. The data elements d[2] op d[3] and d[0] op d[1] can also be considered as a pair of source data elements.

At step (B) a further identical operation is performed on a pair of source data elements in order to generate a resultant data element d[0] op d[1] op d[2] op d[3]. It can be seen that after step (B) the number of resultant data elements is also half that of the number of source data elements. As mentioned previously, the operations are commutative and associative operations and so the same resultant data elements are generated irrespective of the exact order of combination of the source data elements.

Hence, it can be seen that the number of source data elements can be halved as a result of each operation and that the same operation can be performed on those source data elements in order to produce the required result. Accordingly, it can be seen that the required resultant data element can be generated in just two operations whereas the prior art arrangement of FIG. 27 needed to perform at least four operations. It will be appreciated that this improvement in efficiency is achieved through performing parallel processing operations on groups of data elements within a source register. Although just two pairs of source data elements have been illustrated for reasons of clarity, it will be appreciated that any number of pairs of source data elements could have been the subject of the operation. Also, whilst operations on pairs of source data elements have been illustrated for reasons of clarity, it will be appreciated that any number of source data elements (e.g. three, four or more) could have been the subject of the operation.

Figure 29:
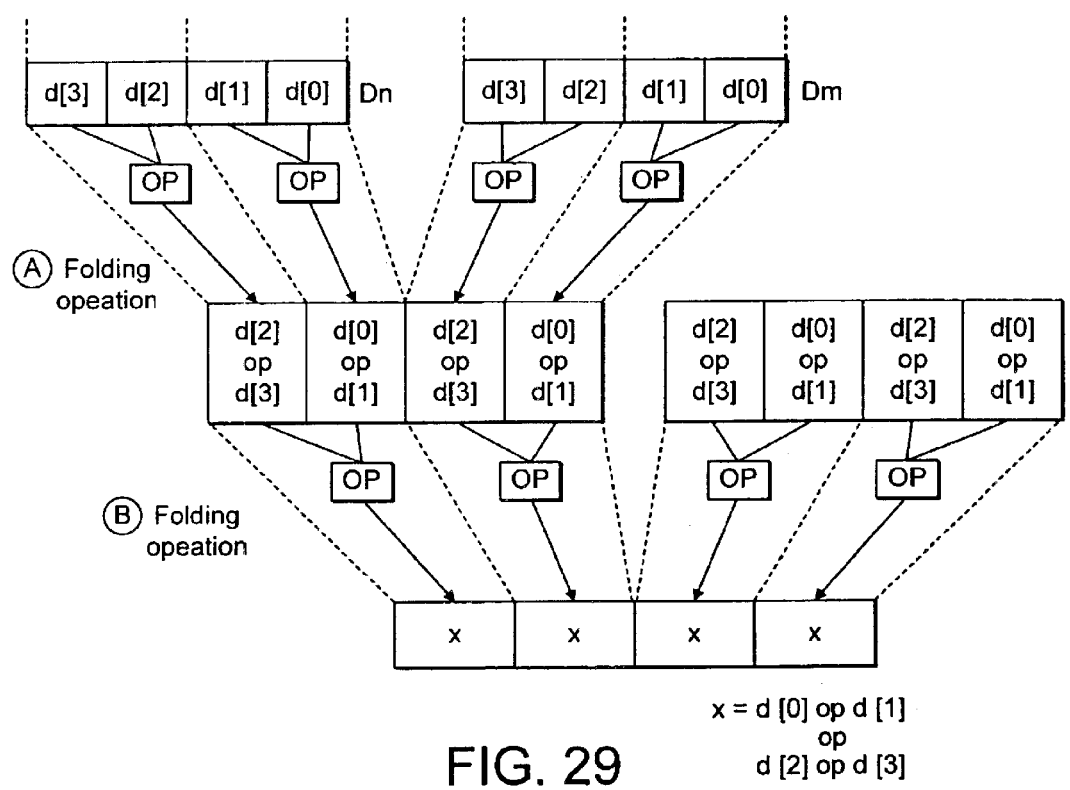
FIG. 29 illustrates a folding operation of another embodiment.

In practice, for efficiency reasons, the folding instruction is arranged to perform parallel operations on a minimum number of data elements, determined by the smallest supported register size in the register data file 20. FIG. 29 illustrates an implementation which generates the same number of resultant data elements as the number of source data elements.

Source data elements d[0] to d[3] are provided in a register $D_n$. In order to generate the same number of resultant data elements, the source data elements d[0] to d[3] are also provided in a register $D_m$. It will be appreciated that the registers $D_n$ and $D_m$ are likely to be the same register with the SIMD processing logic 18 reading each source data element from the register $D_n$ twice in order to generate duplicated resultant data elements.

At step (A), a single SIMD instruction is issued, each pair of source data elements have an operation performed thereon and a corresponding resultant data element is generated.

At step (B), another single SIMD instruction is issued to cause each pair of source data elements to have an operation performed thereon in order to generate a corresponding resultant data element.

Accordingly, it can be seen that all the source data elements have been combined to produce resultant data elements.

FIGS. 30a to 30d illustrate the operation of various folding instructions which follow the same syntax described elsewhere. It will be appreciated that where two source registers are indicated that these may be the same register. Also, it will be appreciated that each source register could be specified as the destination register in order to reduce the amount of register space utilised.

Figure 30A:
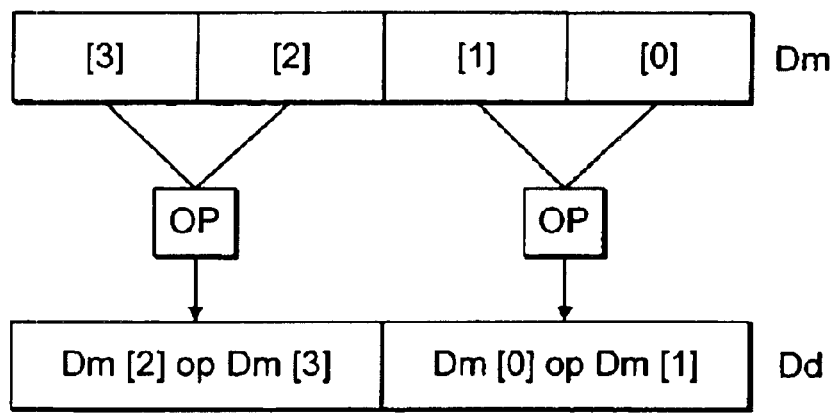
FIGS. 30a to 30d illustrate the operation of various folding instructions.

FIG. 30a illustrates the operation of a SIMD folding instruction whereby pairs of source data elements from the same register, represented by 'n' bits, have an operation performed thereon in order to generate resultant data elements represented by 2n bits. Promoting the resultant data elements to have 2n bits reduces the probability that an overflow will occur. When promoting the resultant data elements, they are typically sign-extended or padded with 0's. The following example summing folding instructions support such an operation:

| Mnemonic | Data Type | Operand Format | Description |
|---|---|---|---|
| VSUM | .S16.S8 | Dd, Dm | (add adjacent pairs of elements and promote) |
| | .S32.S16 | Qd, Qm | |
| | .S64.S32 | | |
| | .U16.U8 | | |
| | .U32.U16 | | |
| | .U64.U32 | | |

In the particular example shown in FIG. 30a (VSUM.S32.S16 Dd, Dm), a 64-bit register Dm containing four 16-bit data elements are folded and stored in a 64-bit register Dd containing two 32-bit resultant data elements.

Figure 30B:
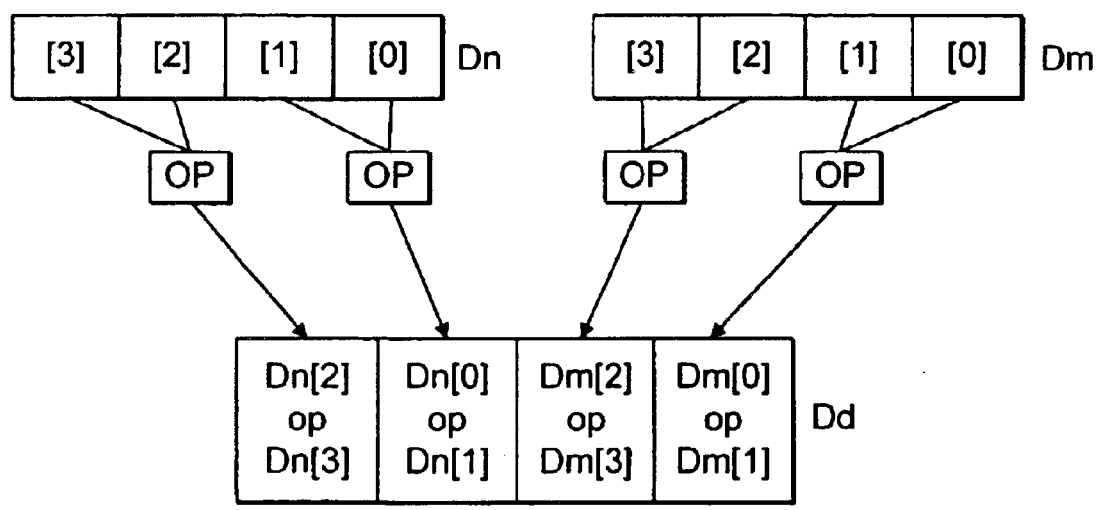

FIG. 30b illustrates the operation of a SIMD folding instruction whereby pairs of source data elements from different registers, represented by 'n' bits, have an operation performed thereon in order to generate resultant data elements also represented by 'n' bits. The following example summing, maximum and minimum instructions support such an operation:

| Mnemonic | Data Type | Operand Format | Description |
|---|---|---|---|
| VSUM | .I8 | Dd, Dn, Dm | (add adjacent pairs of elements) |
| | .I16 | | |
| | .I32 | | |
| | .F32 | | |
| VFMX | .S8 | Dd, Dn, Dm | (take maximum of adjacent pairs) |
| | .S16 | | |
| | .S32 | | |
| | .U8 | | |
| | .U16 | | |
| | .U32 | | |
| | .F32 | | |
| VFMN | .S8 | Dd, Dn, Dm | (take minimum of adjacent pairs) |
| | .S16 | | |
| | .S32 | | |
| | .U8 | | |
| | .U16 | | |
| | .U32 | | |
| | .F32 | | |

In the particular example shown in FIG. 30b (VSUM.I16 Dd, Dn, Dm), two 64-bit registers Dm, Dn, each containing four 16-bit data elements are folded and stored in a 64-bit register Dd containing four 16-bit resultant data elements.

Figure 30C:
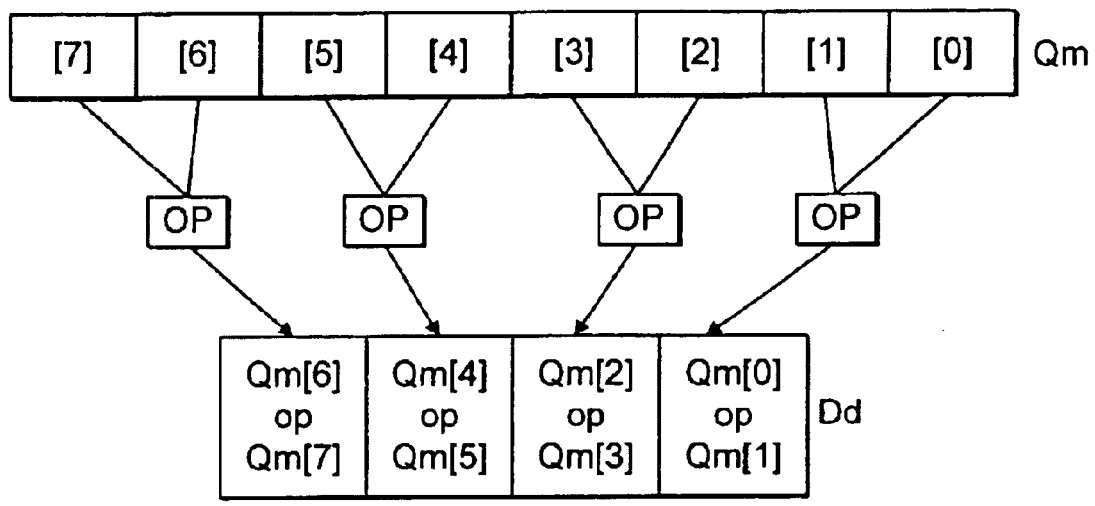

FIG. 30c illustrates the operation of a SIMD folding instruction whereby pairs of source data elements from the same register, represented by 'n' bits, have an operation performed thereon in order to generate resultant data elements also represented by 'n' bits. In the particular example shown in FIG. 30c, a 128-bit register Qm containing eight 16-bit data elements are folded and stored in a 64-bit register Dd containing four 16-bit resultant data elements.

Figure 30D:
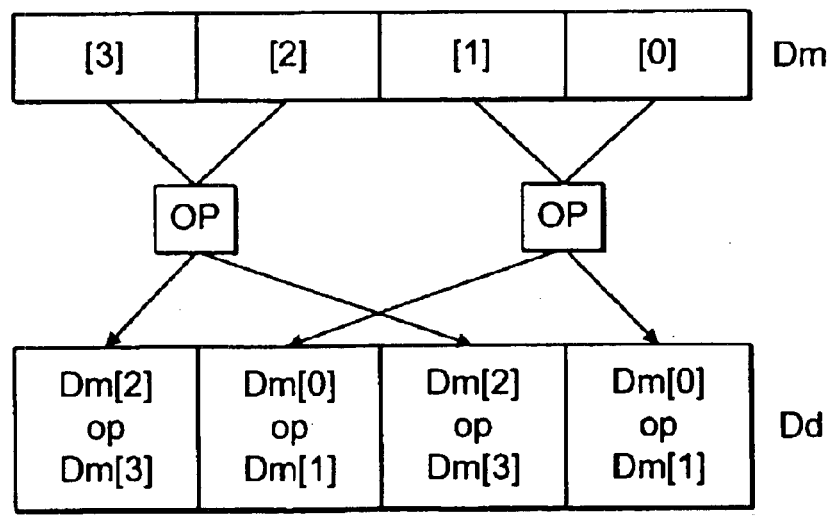

FIG. 30d illustrates the operation of a SIMD folding instruction similar to FIG. 30b, but where Dm=Dn which causes the resultant data values to be duplicated in the destination register. Pairs of source data elements from the same register, represented by 'n' bits, have an operation performed thereon in order to generate resultant data elements also represented by 'n' bits, each of which is duplicated in another entry in the register. In the particular example shown in FIG. 30d, a 64-bit register Dm containing four 16-bit data elements are folded and stored in a 64-bit register Dd containing two sets of two 16-bit resultant data elements.

Figure 31:
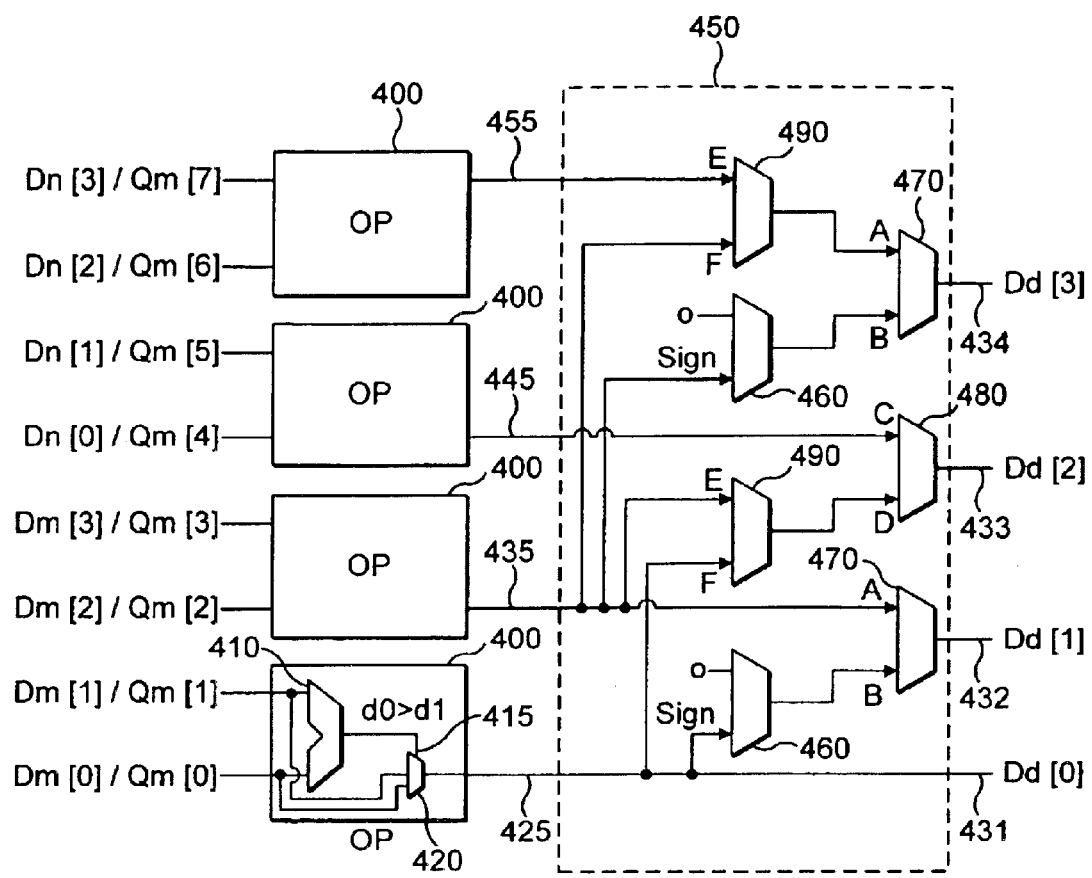
FIG. 31 illustrates schematically logic arranged to perform a folding operation provided within the SIMD processing logic of FIG. 1.

FIG. 31 illustrates schematically example SIMD folding logic which can support folding instructions and which is provided as part of the SIMD processing logic 18. For sake of clarity, the logic shown is used to support instructions which select the maximum of each adjacent pair. However, it will be appreciated that the logic can be readily adapted to provide support for other operations, as will be described in more detail below.

The logic receives source data elements (Dm[0] to Dm[3]) from the register Dm, optionally together with source data elements (Dn[0] to Dn[3]) from the register Dn. Alternatively, the logic receives source data elements (Qm [0] to Qm[7]) from the register Qm. Each pair of adjacent source data elements are provided to an associated folding operation logic unit 400. Each folding operation logic unit 400 has an arithmetic unit 410 which subtracts one source data element from the other and provides an indication of which was the greater over the path 415 to a multiplexer 420. Based upon the indication provided over the path 415, the multiplexer outputs the greater value source data element from the operation logic unit 400. Hence, it can be seen that each folding operation logic unit 400 is arranged to output the maximum of the associated adjacent pair of data elements over respective paths 425, 435, 445, 455.

Selection and distribution logic 450 receives the resultant data elements and provides these as required over paths 431 to 434 for storage in entries of a register Dd in the SIMD register data file 20 in support of the above-mentioned instructions. The operation of the selection and distribution logic 450 will now be described.

In order to support the instruction illustrated in FIG. 30a, source data elements Dm[0] to Dm[3] are provided to the lower two folding operation logic units 400. The folding operation logic units 400 output data elements over the paths 425 and 435. The paths 431 and 432 will provide Dm[0] op Dm[1] in a sign-extended or zero-extended format, whilst paths 433 and 434 will provide Dm[2] op Dm[3] in a sign-extended or zero-extended format. This is achieved by signals being generated by the SIMD decoder 16 in response to the folding instruction which cause the multiplexers 470 to select their B input, the multiplexers 460 to select either sign-extension or zero-extension, the multiplexers 490 to select their E input and the multiplexer 480 to select its D input.

In order to support the instruction illustrated in FIG. 30b, source data elements Dm[0] to Dm[3] are provided to the lower two folding operation logic units 400, whilst source data elements Dn[0] to Dn[3] are provided to the upper two folding operation logic units 400. The folding operation logic units 400 output data elements over the paths 425, 435, 445 and 455. Path 431 will provide Dm[0] op Dm[1], path 432 will provide Dm[2] op Dm[3], path 433 will provide Dn[0] op Dn[1], and path 434 will provide Dn[2] op Dn[3]. This is achieved by signals being generated by the SIMD decoder 16 in response to the folding instruction which cause the multiplexers 470 to select their A input, the multiplexer 480 to select its C input and the multiplexers 490 to select their E input.

In order to support the instruction illustrated in FIG. 30c, source data elements Qm[0] to Qm[7] are provided to the folding operation logic units 400. The folding operation logic units 400 output data elements over the paths 425, 435, 445 and 455. Path 431 will provide Qm[0] op Qm[1], path 432 will provide Qm[2] op Qm[3], path 433 will provide Qm[4] op Qm[5], and path 434 will provide Qm[6] op Qm[7]. This is achieved by signals being generated by the SIMD decoder 16 in response to the folding instruction which cause the multiplexers 470 to select their A input, the multiplexer 480 to select its C input and the multiplexers 490 to select their E input.

In order to support the instruction illustrated in FIG. 30d, source data elements Dm[0] to Dm[3] are provided to the lower two folding operation logic units 400. The folding operation logic units 400 output data elements over the paths 425 and 435. Path 431 will provide Dm[0] op Dm[1], path 432 will provide Dm[2] op Dm[3], path 433 will provide Dm[0] op Dm[1], and path 434 will provide Dm[2] op Dm[3]. This is achieved by signals being generated by the SIMD decoder 16 in response to the folding instruction which cause the multiplexers 470 to select their A input, the multiplexer 480 to select its D input and the multiplexers 490 to select their F input. Alternatively, it will be appreciated that the source data elements could have instead also been provided to the upper two folding operation logic units 400 and the same operation as that illustration to reference to FIG. 30b could have been performed which would reduce the complexity of the selection and distribution logic 450.

Accordingly, it can be seen that this logic enables a resultant data element to be generated from two adjacent source data elements in a single operation directly from the source data elements.

As mentioned above, the folding operation logic unit 400 may be arranged to perform any number of operations on the source data elements. For example, further logic could readily be provided to selectively enable the multiplexer 420 to supply the minimum of the source data elements over the path 425. Alternatively, the arithmetic unit 410 could be arranged to selectively add, subtract, compare or multiply the source data elements and to output the resultant data element. Hence, it will be appreciated that the approach of the present embodiment advantageously provides a great deal of flexibility in the range of folding operations that can be performed using this arrangement.

Also, it will be appreciated that whilst the logic described with reference to FIG. 31 supports 16-bit operations, similar logic could be provided in order to support 32 or 8-bit operations, or indeed any other sizes.

Figure 32:
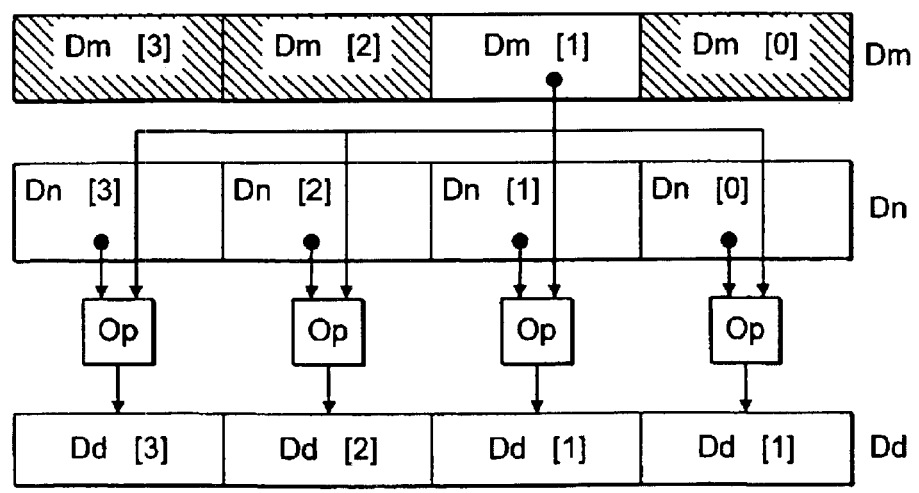
FIG. 32 illustrates the operation of a vector-by-scalar instruction.

FIG. 32 illustrates the operation of a vector-by-scalar SIMD instruction. The SIMD instructions follow the same syntax described elsewhere. It will be appreciated that, as before, where two source registers are indicated, these may be the same register. Also, each source register could be specified as the destination register in order to reduce the amount of register space utilised and to enable efficient recirculation of data elements.

A register $D_m$ stores a number of data elements $D_m[0]$ to $D_m[3]$. Each of these data elements represent a selectable scalar operand. The vector by scalar SIMD instruction specifies one of the data elements as the scalar operand and performs an operation using that scalar operand in parallel on all the data elements in another register Dn, the results of which are stored in a corresponding entry in the register Dd. It will be appreciated that the data elements stored in the registers $D_m$, $D_n$ and $D_d$ could all be of differing sizes. In particular, the resultant data elements may be promoted with respect to the source data elements. Promoting may involve zero padding or sign extending to convert from one data type to another. This may have the additional advantage of guaranteeing that an overflow can not occur.

Being able to select one scalar operand for a SIMD operation is particular efficient in situations involving matrices of data elements. Different scalar operands can be written to the SIMD register file 20 and then readily selected for different vector-by-scalar operations without the need to re-write data elements or move data elements around. The following example multiplication instructions support such an operation:

| Mnemonic | Data Type | Operand Format | Description |
|---|---|---|---|
| | | Multiply by Scalar | |
| VMUL | .I16 | Dd, Dn, Dm[x] | (Vd[i] = Vn[i] * Vm[x]) |
| | .I32 | Qd, Qn, Dm[x] | |
| | .F32 | | |
| | .S32.S16 | Qd, Dn, Dm[x] | |
| | .S64.S32 | | |
| | .U32.U16 | | |
| | .U64.U32 | | |
| | | Multiply Accumulate by Scalar | |
| VMLA | .I16 | Dd, Dn, Dm[x] | (Vd [i] = Vd[i] + (Vn[i] * Vm[x])) |
| | .I32 | Qd, Qn, Dm[x] | |
| | .F32 | | |
| | .S32.S16 | Qd, Dn, Dm[x] | |
| | .S64.S32 | | |
| | .U32.U16 | | |
| | .U64.U32 | | |
| | | Multiply Subtract by Scalar | |
| VMLS | .I16 | Dd, Dn, Dm[x] | (Vd[i] = Vd[i] − (Vn[i] * Vm[x])) |
| | .I32 | Qd, Qn, Dm[x] | |
| | .F32 | | |
| | .S32.S16 | Qd, Dn, Dm[x] | |
| | .S64.S32 | | |
| | .U32.U16 | | |
| | .U64.U32 | | |

Vd, Vn and Vm describe vectors of elements constructed from the chosen register format and chosen data type. Elements within this vector are selected using the array notation [x]. For example, Vd[0] selects the lowest element in the vector Vd.

An iterator i is used to allow a vector definition; the semantics hold for all values of i where i is less than the number of elements within the vector. The instruction definitions provide 'Data Type' and 'Operand Format' columns; a valid instruction is constructed by taking one from each column.

Figure 33:
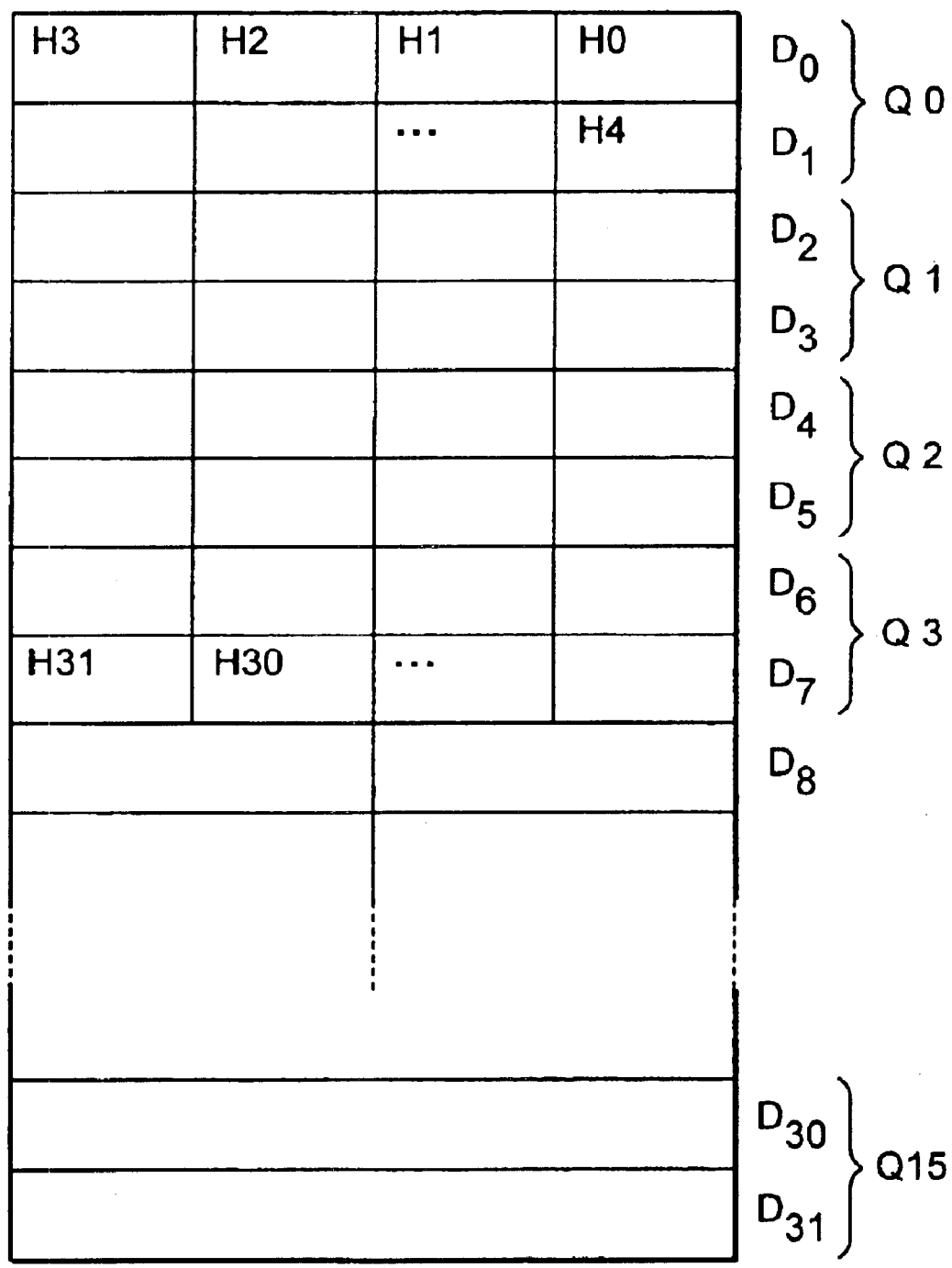
FIG. 33 illustrates an arrangement of scalar operands in the SIMD register file of FIG. 1.

FIG. 33 illustrates an arrangement of scalar operands H0 to H31 in the SIMD register file 20. As mentioned elsewhere, the preferred number of bits used in a field of the instruction to specify the location of a data element in the SIMD register file 20 is 5-bits. This enables 32 possible locations to be specified. It will be appreciated that one possible way to map the scalar operands onto the SIMD register file 20 would have been to have placed each operand in the first entry in each of the registers D0 to D$_{31}$. However, the SIMD register file 20 is instead arranged to map or alias the selectable scalar operands to the first 32 logical entries in the SIMD register file 20. Mapping the scalar operands in this way provides significant advantages. Firstly, by locating the scalar operands in contiguous entries minimises the number of D registers used to store the scalar operands which in turn maximises the number of D registers available to store other data elements. By having the scalar operands stored in contiguous entries enables all scalar operands within a vector to be accessed, which is particularly beneficial when performing matrix or filter operations. For example, a matrix by vector multiplication requires a vector by scalar operation to be performed for each scalar chosen from the vector. Furthermore, storing the selectable scalar operands in this way enables, from at least some of the registers, all the scalar operands to be selected from those registers.

Figure 34:
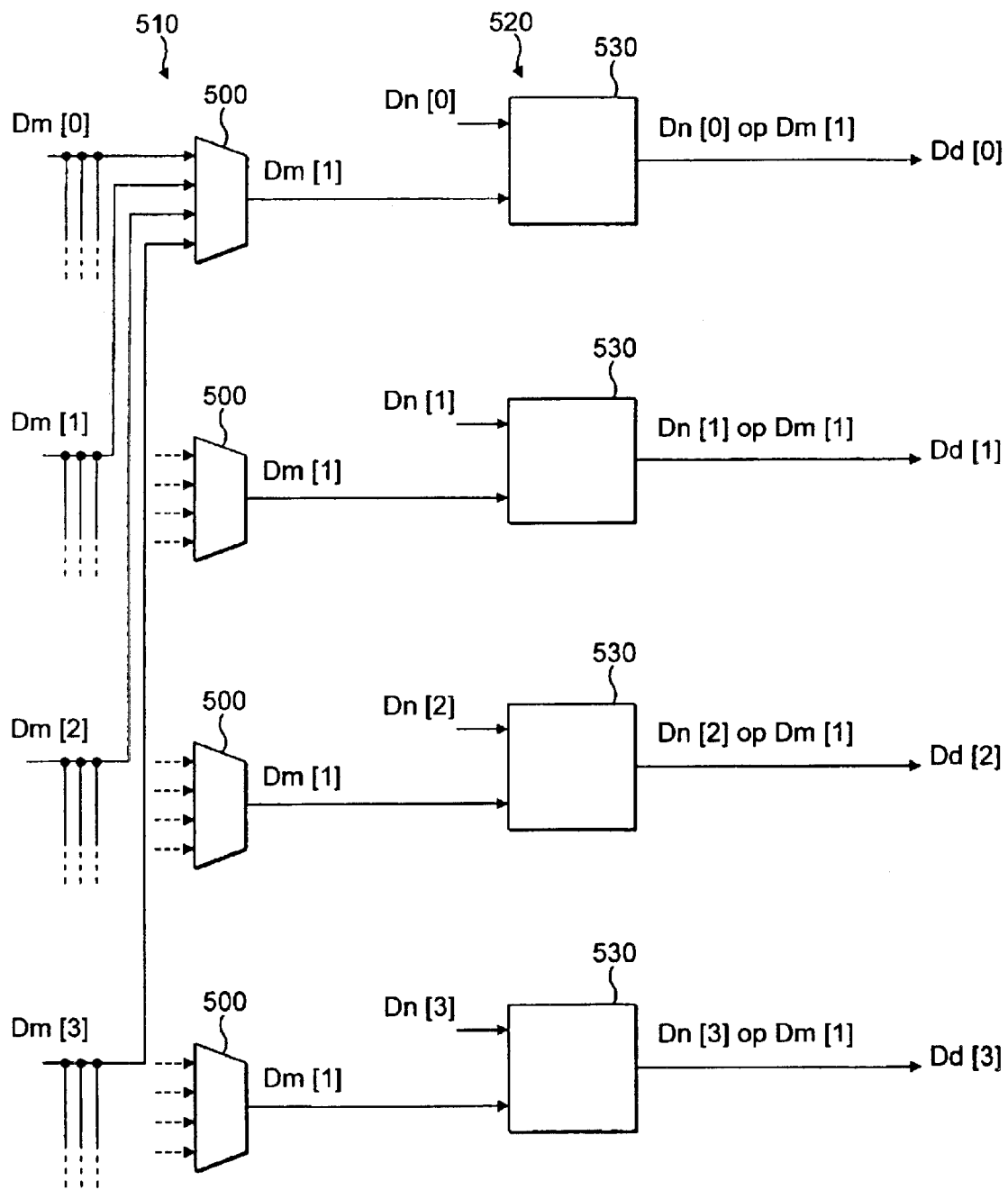
FIG. 34 illustrates schematically logic arranged to perform a vector-by-scalar operation provided within the SIMD processing logic of FIG. 1.

FIG. 34 illustrates schematically logic arranged to perform a vector-by-scalar operation of an embodiment.

The source data elements (D$_m$[0] to D$_m$[3]) provided from the register D$_m$. Each source data element is provided to scalar selection logic 510 which comprises a number of multiplexers 500. Each source data element is provided to one input of each multiplexer 500 (i.e. each multiplexer receives source data elements D$_m$[0] to D$_m$[3]. Hence, it can be seen that each multiplexer can output any of the source data elements D$_m$[0] to D$_m$[3]. In this embodiment, each multiplexer is arranged to output the same source data element. Hence, the scalar selection logic 510 can be arranged to select and output one scalar operand. This is achieved by signals being generated by the SIMD decoder 16 in response to the vector-by-scalar instruction which cause the multiplexers to output one of the source data elements D$_m$[0] to D$_m$[3] as the selected scalar operand.

Vector-by-scalar operation logic 520 receives the selected scalar operand and also receives source data elements D$_n$[0] to D$_n$[3] provided from the register D$_n$. Each source data element is provided to the vector-by-scalar operation logic 520 which comprises a number of operation units 530. Each source data element is provided to one of the operation units 530 (i.e. each operation unit receives one of the source data elements D$_m$[0] to D$_m$[3] and the selected scalar operand). The vector-by-scalar operation logic 520 performs an operation on the two data elements and outputs a resultant data element for storage in respective entries of a register in the SIMD register data file 20 in support of the above-mentioned instructions. This is achieved by signals being generated by the SIMD decoder 16 in response to the vector-by-scalar instruction which cause the operations units 530 to perform the required operation on the received data elements.

Accordingly, it can be seen that this logic enables one of data element of a source register to be selected as a scalar operand and to perform the vector-by-scalar operations using the same scalar operand on all source data elements from another register.

Figure 35:
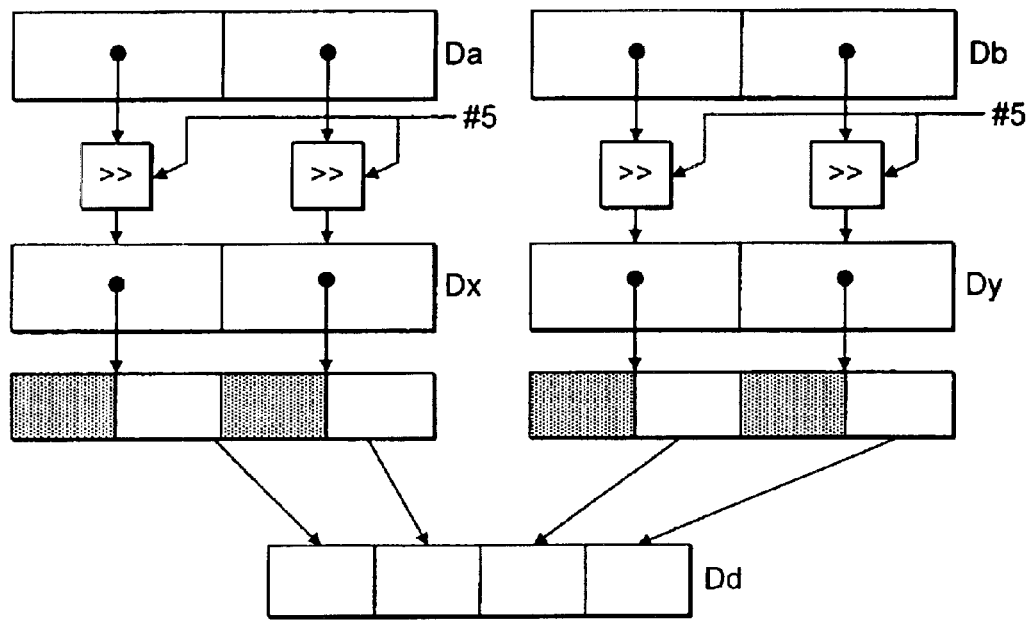
FIG. 35 shows a method of shifting right and packing high according to the prior art.

FIG. 35 shows a known way of dealing with a shift and narrow operation during SIMD processing. As can be seen three separate instructions (SHR, SHR and PACK LO) are required to perform this operation. Intermediate values are shown with dotted lines for clarity in FIG. 35 and in FIGS. 36 and 38.

Figure 36:
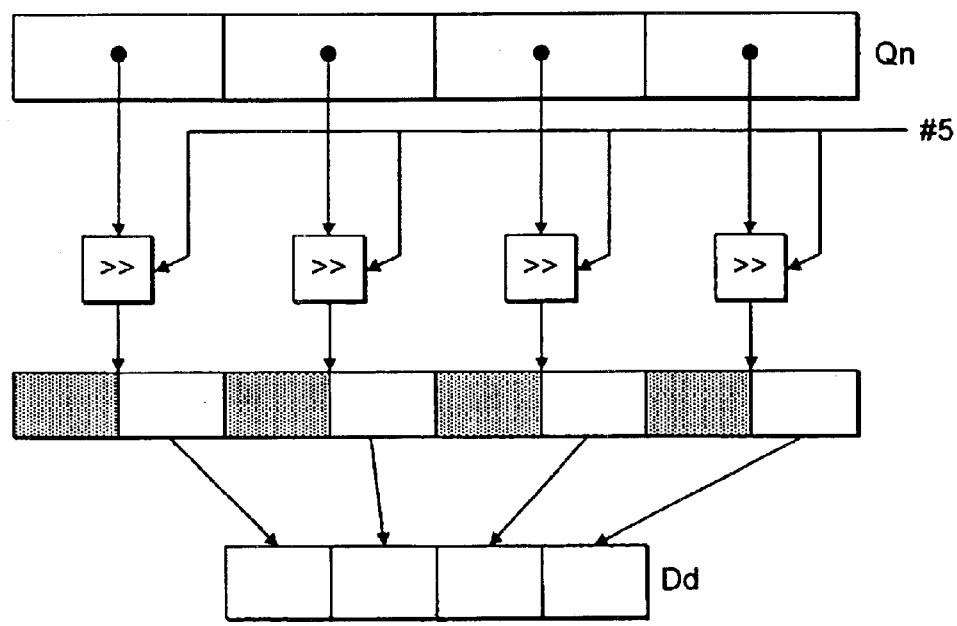
FIG. 36 schematically shows a shift right and narrow operation according to an embodiment of the present technique.

FIG. 36 shows a shift right and narrow operation according to the present technique. The architecture of the present embodiment is particularly well adapted to process shift and narrow operations and can do so in response to a single instruction. The instruction is decoded by an instruction decoder within SIMD decoder 16 (see FIG. 1). In this example the data in register Qn, located in SIMD register file 20 (see FIG. 1) is shifted right by 5 bits and then the remaining data is rounded and then the 16 right hand side bits are transferred across to the destination register Dd, also located in SIMD register file 20. The hardware is able to optionally support rounding and/or saturation of the data depending on the instruction. Generally shifting right instructions do not require saturation as when dealing with integers shifting right generally produces a smaller number. However, when shifting right and narrowing saturation may be appropriate.

Saturation is a process that can be used to restrict a data element to a certain range by choosing the closest allowable value. For example if two unsigned 8-bit integers are multiplied using 8 bit registers, the result may overflow. In this case the most accurate result that could be given is binary 11111111, and thus, the number will be saturated to give this value. A similar problem may arise when shifting and narrowing, whereby a number that is narrowed cannot fit into the narrower space. In this case in the case of an unsigned number, when any of the bits that are discarded in the shift step are not zero then the number is saturated to the maximum allowable value. In the case of a signed number the problem is more complicated. In this case the number must be saturated to the maximum allowable positive number or maximum allowable negative number when the most Significant bit is different from any of the discarded bits.

Saturation can also occur where the type of data element input is different to that output, e.g. a signed value may be shifted and narrowed, saturated and an unsigned value output. The ability to output different data types can be very useful. For example, in pixel processing luminance is an unsigned value, however, during processing this value it may be appropriate to process it as a signed value. Following processing an unsigned value should be output, however simply switching from a signed to an unsigned value could cause problems, unless the ability to saturate the value is provided. For example, if during processing due to slight inaccuracies the luminance value has dropped to a negative number, simply outputting this negative signed value as an unsigned value would be a nonsense. Thus, the ability to saturate any negative number to zero prior to outputting the unsigned value is a very useful tool.

Examples of possible formats for different shift instructions are given below in tables 6 and 7. As can be seen the instructions specifies that it is vector instruction by having a V at the front, a shift is then specified with the SH and in the case of shifting with immediates, the direction right or left is then indicated by an R or L. The instruction then comprises two types, as in table 0, the first being the size of the data elements in the destination register and the second being the size of the element in the source register. The next information comprises the name of the destination register and of the source register and then an immediate value may be given, this value indicates the number of bits that the data is to be shifted and is preceded by a #. Modifiers to the general format of the instruction may be used, a Q is used to indicate the operation uses saturating integer arithmetic and a R is used to indicate that the operation performs rounding More details of the format of the instructions are given earlier in the description, for example, in table 0.

Table 7 shows instructions for shifting by signed variables. This instruction is the same as the shifting left by immediates, but instead of providing an immediate with the instruction a register address indicating where a vector of signed variable is stored is provided with the instruction. In this case a negative number indicates a right hand shift. As the number of bits to be shifted are stored in a vector, a different signed variable can be stored for each data element so that they can each be shifted by different amounts. This process is shown in more detail in FIG. 39.

TABLE 6

Shift by Immediate

Immediate shifts use an immediate value encoded within the instruction to shift all elements of the source vector by the same amount. Narrowing versions allow casting down of values, which can include saturation, while Long versions allow casting up with any fixed point.

Shift with accumulate versions are provided to support efficient scaling and accumulation found in many DSP algorithms. Right shift instructions also provide rounding options. Rounding is performed by in effect adding a half to the number to be rounded. Thus, when shifting right by n places $2^{n-1}$ is added to the value prior to shifting it. Thus, in the following table round(n) = $2^{n-1}$ if n ≥ 1 or 0 if n ≤ 0.

Bitwise extract instructions are included to allow efficient packing of data.

| Mnemonic | Data Type | Operand Format | Description |
|---|---|---|---|
| VSHR | .S8 | Dd, Dn, #UIMM | Shift Right by Immediate |
| | .S16 | Dd, Dn, #UIMM | Vd[i] := Vn[i] >> UIMM |
| | .S32 | | |
| | .S64 | | |
| | .U8 | | |
| | .U16 | | |
| | .U32 | | |
| | .U64 | | |
| | .S8. s16 | Dd, Qn, #UIMM | Shift Right by Immediate and narrow |
| | .S16.S32 | | Vd[i] := Vn[i] >> UIMM |
| | .S32.S64 | | |
| | .U8.U16 | | |
| | .U16.U32 | | |
| | .U32.U64 | | |
| VRSHR | .S8 | Dd, Dn, #UIMM | Shift Right by Immediate with rounding |
| | .S16 | Qd, Qn, #UIMM | Vd[i] :=(Vn[i]+round(UIMM)) >> UIMM |
| | .S32 | | |
| | .S64 | | |
| | .U8 | | |
| | .U16 | | |
| | .U32 | | |
| | .U64 | | |
| | .S8.S16 | Dd, Qn, #UIMM | Shift Right by Immediate |
| | .S16.S32 | | and Narrow with Rounding |
| | .S32.S64 | | Vd[i] := (Vn[i] + round |
| | .U8.U16 | | (UIMM)) >> UIMM |
| | .U16.U32 | | |
| | .U32.U64 | | |
| VQSHR | .S8.S16 | Dd, Qn, #UIMM | Saturating Shift Right |
| | .S16.S32 | | by Immediate and Narrow |
| | .S32.S64 | | Vd[i] := sat<td>(Vn[i] >> UIMM) |
| | .U8.U16 | | |
| | .U16.U32 | | |
| | .U32.U64 | | |
| | .U8.S16 | | |
| | .U16.S32 | | |
| | .U32.S64 | | |
| VQRSHR | .S8.S16 | Dd, Qn, #UIMM | Saturating Shift Right by |
| | .S16.S32 | | Immediate and Narrow with Rounding |
| | .S32.S64 | | Vd[i] := sat<td>((Vn[i] + |
| | .U8.U16 | | round(UIMM)) >> UIMM) |
| | .U16.U32 | | |
| | .U32.U64 | | |
| | .U8.S16 | | |
| | .U16.S32 | | |
| | .U32.S64 | | |

TABLE 6-continued

Shift by Immediate
Immediate shifts use an immediate value encoded within the instruction to shift all elements of the source vector by the same amount. Narrowing versions allow casting down of values, which can include saturation, while Long versions allow casting up with any fixed point.
Shift with accumulate versions are provided to support efficient scaling and accumulation found in many DSP algorithms. Right shift instructions also provide rounding options. Rounding is performed by in effect adding a half to the number to be rounded. Thus, when shifting right by n places $2^{n-1}$ is added to the value prior to shifting it. Thus, in the following table round(n) = $2^{n-1}$ if n ≧ 1 or 0 if n ≦ 0.
Bitwise extract instructions are included to allow efficient packing of data.

| Mnemonic | Data Type | Operand Format | Description |
|---|---|---|---|
| VSRA | .S8<br>.S16<br>.S32<br>.S64<br>.U8<br>.U16<br>.U32<br>.U64 | Dd, Dn, #UIMM<br>Qd, Qn, #UIMM | Shift Right by Immediate and Accumulate<br>Vd[i] := Vd[i] + (Vn[i] >> UIMM) |
| VQSRA | .S8<br>.S16<br>.S32<br>.S64<br>.U8<br>.U16<br>.U32<br>.U64 | Dd, Dn, #UIMM<br>Qd, Qn, #UIMM | Saturating Shift Right by Immediate and Accumulate<br>Vd[i] := sat<td>(Vd[i] + (Vn[i] >> UIMM)) |
| VRSRA | .S8<br>.S16<br>.S32<br>.S64<br>.U8<br>.U16<br>.U32<br>.U64 | Dd, Dn, #UIMM<br>Qd, Qn, #UIMM | Shift Right by Immediate and Accumulate with Rounding<br>Vd[i] := Vd[i] + ((Vn[i] + round(UIMM)) >> UIMM) |
| VQRSRA | .S8<br>.S16<br>.S32<br>.S64<br>.U8<br>.U16<br>.U32<br>.U64 | Dd, Dn, #UIMM<br>Qd, Qn, #UIMM | Saturating Shift Right by Immediate and Accumulate with Rounding<br>Vd[i] := sat<td>(<br>Vd[i] + ((Vn[i] + round(UIMM)) >> UIMM)) |
| VSHL | .I8<br>.I16<br>.I32<br>.I64 | Dd, Dn, #UIMM<br>Qd, Qn, #UIMM | shift Left by Immediate<br>Vd[i] := Vn[i] << UIMM |
|  | .S16.S8<br>.S32.S16<br>.S64.S32<br>.U16.U8<br>.U32.U16<br>.U64.U32 | Qd, Dn, #UIMM | Shift Left Long by Immediate<br>Vd[i] := Vn[i] << UIMM |
| VQSHL | .S8<br>.S16<br>.S32<br>.S64<br>.U8<br>.U16<br>.U32<br>.U64<br>.U8.S8<br>.U16.S16<br>.U32.S32<br>.U64.S64 | Dd, Dn, #UIMM<br>Qd, Qn, #UIMM | Saturating Shift Left by Immediate<br>Vd[i] := sat<td>(Vn[i] << UIMM) |

TABLE 7

Shift by Signed Variable

Shifts in this section perform shifts on one vector of elements controlled by the signed shift amounts specified in a second vector. Supporting signed shift amounts allows support for shifting by exponent values, which may reasonably be negative; a negative control value will perform a shift right. Vector shifts allow each element to be shifted by a different amount, but can be used to shift all lanes by the same amount by duplicating the shift control operand to all lanes of a vector before performing the shift. The signed shift control value is an element is the same size as the smallest operand element size of the operand to be shifted. However, the shifter variable is interpreted using only the bottom 8-bits of each lane to determine the shift amount. Rounding and Saturation options are also available.

| Mnemonic | Data Type | Operand Format | Description |
|---|---|---|---|
| VSHL | .S8 | Dd, Dn, Dm | Shift Left by Signed Variable |
|  | .S16 | Qd, Qn, Qm | Vd[i] := Vn[i] << Vm[i] |
|  | .S32 |  |  |
|  | .S64 |  |  |
|  | .U8 |  |  |
|  | .U16 |  |  |
|  | .U32 |  |  |
|  | .U64 |  |  |
| VQSHL | .S8 | Dd, Dn, Dm | Saturating Shift Left |
|  | .S16 | Qd, Qn, Qm | by Signed Variable |
|  | .S32 |  | Vd[i] := sat<td>(Vn[i] << Vm[i]) |
|  | .S64 |  |  |
|  | .U8 |  |  |
|  | .U16 |  |  |
|  | .U32 |  |  |
|  | .U64 |  |  |
| VRSHL | .S8 | Dd, Dn, Dm | Rounding Shift Left by Signed Variable |
|  | .S16 | Qd, Qn, Qm | Vd[i] := (Vn[i] + round |
|  | .S32 |  | (-Vm[i])) << Vm[i] |
|  | .S64 |  |  |
|  | .U8 |  |  |
|  | .U16 |  |  |
|  | .U32 |  |  |
|  | .U64 |  |  |
| VQRSHL | .S8 | Dd, Dn, Dm | Saturating Rounding Shift |
|  | .S16 | Qd, Qn, Qm | Left by Signed Variable |
|  | .S32 |  | Vd[i] := sat<td>((Vn[i] + |
|  | .S64 |  | round(-Vm[i])) << Vm[i]) |
|  | .U8 |  |  |
|  | .U16 |  |  |
|  | .U32 |  |  |
|  | .U64 |  |  |

Thus, as can be seen the hardware supports instructions that are able to specify both the size of the source data element and resultant data element and also sometimes the number of places that the data is to be shifted. This makes it an extremely adaptable and powerful tool.

The shift right and narrow operation shown in FIG. 36 has a number of possible applications. For example, in calculations involving fixed point numbers where a certain accuracy is required, it may be appropriate to place a say 16-bit number somewhere towards the centre of a 32-bit data value to reduce the risk of data over or under flow, while calculations are performed. At the end of the calculations a 16-bit number may be required, and thus a shift and narrow operation as shown in FIG. 36 would be appropriate. The possibility envisaged by the present technique of using different sized source and destination registers is particularly effective here and allows different sized data to remain in a particular lane during SIMD processing.

Figure 37:
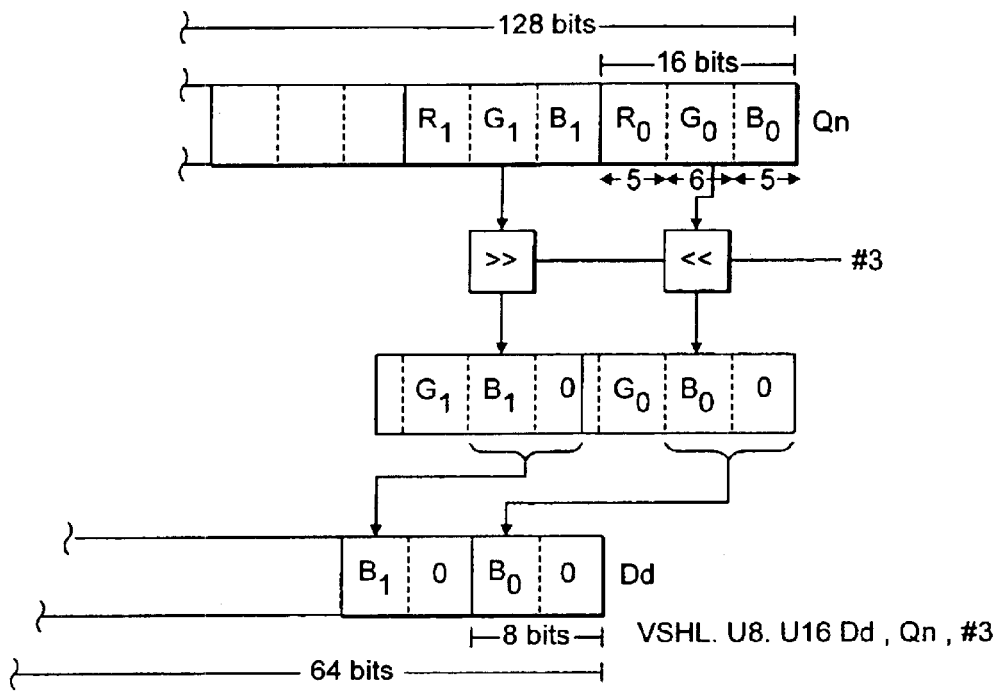
FIG. 37 schematically shows a shift left and narrow according to the present technique.

A further use of the shift and narrow operation similar to that illustrated in FIG. 36 could be in the processing of colour pixel data. SIMD processing is particularly appropriate for video data as video data comprises many pixels that all require the same operation to be performed upon them. Thus, different pixel data can be in different lanes in a register and a single instruction can perform the same operations on all of the data. Often, video data may come as red green and blue data. This needs to be separated out before meaningful operations can be performed upon it. FIG. 37 shows a typical example of red green and blue data being present in a 16-bit data element. In the example shown the blue data could be extracted by a shift left by 3 bits and narrow operation. The shift left by 3 places sends the blue data to the right of the middle of the data element, as is shown schematically by the dotted line register (representing an intermediate value), three zeros fill in the three empty positions at the right of the data value caused by the shift left of the data. The narrow operation results in the blue data and the three zeros being transferred to the resultant 8 bit data element.

Figure 38:
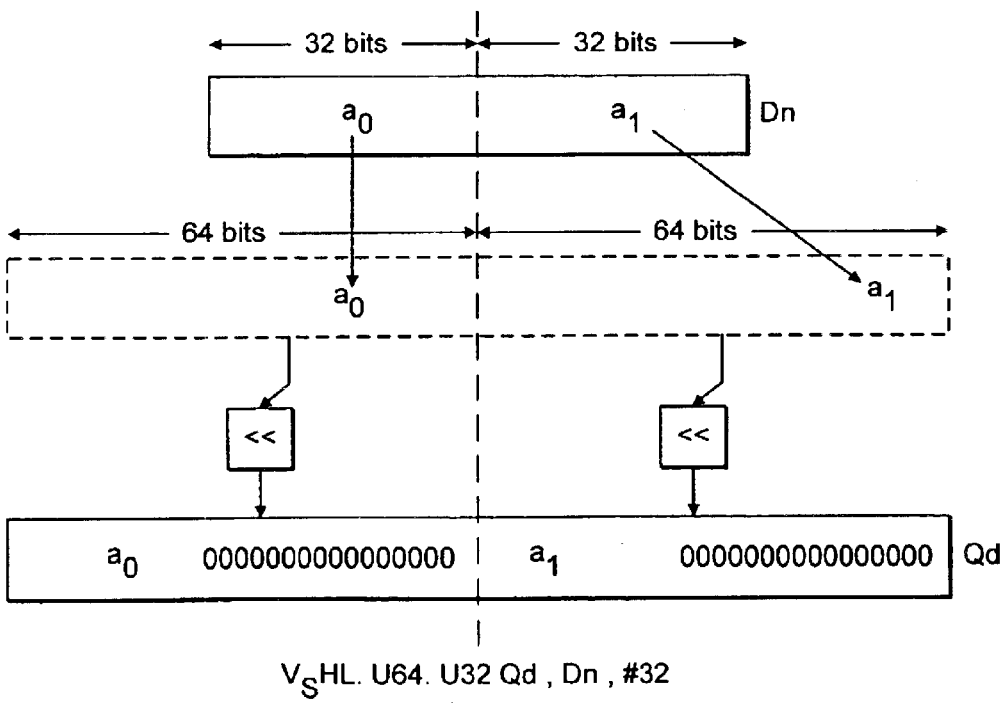
FIG. 38 schematically shows a cast up and shift left according to an embodiment of the present technique.

In addition to shifting and narrowing the present technique can also be used to cast up and shift, this process is shown in FIG. 38. In this case, the casting up is performed followed by a shift left. This operation can be used to for example transfer a 32-bit value to a 64-bit value, the 32 bit value being placed in an appropriate position within the 64 bit value. In the example shown two 32 bit values are transferred to 64 bit values by being placed at the most significant bits in the lane with zeros being added as least significant bits.

Figure 39:
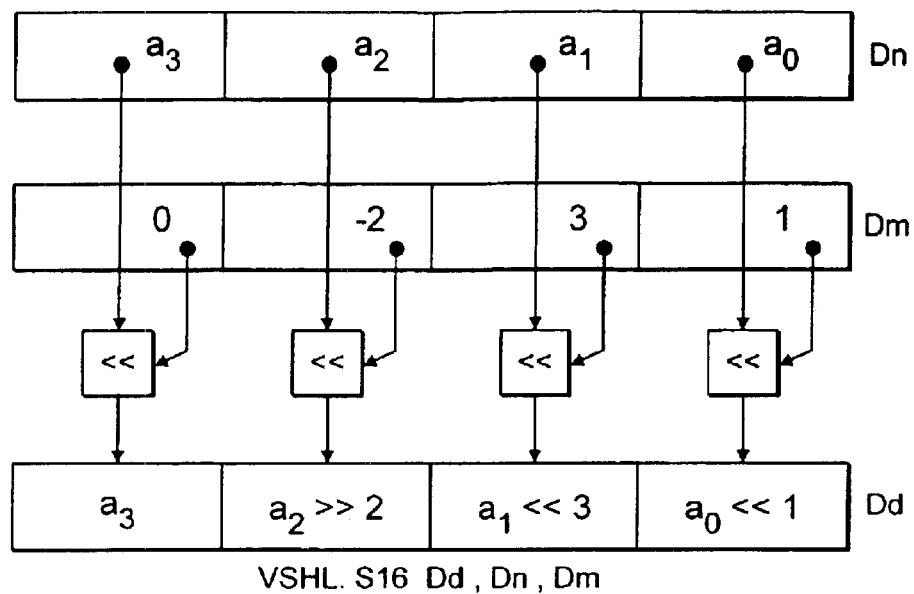
FIG. 39 schematically shows a shifting of data elements by different amounts.

FIG. 39 shows the possibility of using a vector of values indicating the number of places each data element should be shifted, the values being signed integers, negative numbers indicating a shift right. A register holding a value for each data element is used and each data element is shifted by the amount specified by the value located in its lane. The instructions for such operations are set out previously in table 7.

Figure 40:
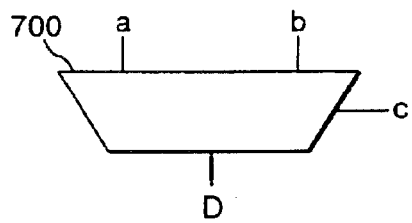
FIG. 40 schematically shows a conventional multiplexer.

FIG. 40 schematically shows a simple multiplexing operation. In this multiplexing operation, multiplexer 700 selects either value a or value b to be output at D depending on the value of the control bit c. c is used to select the output between a and b. c is often based upon the result of a decision such as is a>b. Embodiments of the architecture provide the ability to perform multiplexing operations during SIMD processing. SIMD processing is not suitable for performing branch operations and thus multiplexing can not be performed using standard if then else instructions, rather a mask is created, the mask being used to indicate which parts of two source registers a and b are to be selected.

This mask consists of control values that are used to indicate which parts of two source registers a and b are to be selected. In some embodiments a one in a certain position may indicate that a certain section of b is to be selected while a zero in that position would indicate that a corresponding section of a is to be selected. This mask is stored in a general-purpose register thereby reducing the need for special purpose registers.

Generation of the mask is dependent on the multiplexing operation to be performed and is created in response to this operation. For example in the case given above a comparison of a and b is performed. This can be done on a portion by portion basis, for example corresponding data elements in the SIMD processing are compared. Corresponding data elements of b and a are compared and a value is written to the portion of the general purpose register that is being used to store the control values depending whether b is greater than a, or b is equal to or less than a. This can be done using a compare greater than instruction VCGT on all of the data elements in parallel. This instruction is provided in the instruction set of embodiments of the system. Table 8 below shows some of the wide range of comparison instructions that are provided by embodiments of the architecture.

TABLE 8

Comparison and Selection
Comparison and tests of variables to generate masks can be performed which can be used to provide data plane selection and masking. It also provides instructions to select the maximum and minimum, including folding versions which can be used at the end of vectorised code to find the maximum or minimum within a vector.

| Mnemonic | Data Type | Operand Format | Description |
|---|---|---|---|
| VCEQ | .I8<br>.I16<br>.I32<br>.F32 | Dd, Dn, Dm<br>Qd, Qn, Qm | Compare Equal<br>Vd[i] := (Vn[i] == Vm[i]) ?<br>ones : zeros |
| VCGE | .S8<br>.S16<br>.S32<br>.U8<br>.U16<br>.U32<br>.F32 | Dd, Dn, Dm<br>Qd, Qn, Qm | Compare Greater-than or Equal<br>Vd[i] := (Vn[i] >= Vm[i])<br>? ones : zeros |
| VCGT | .S8<br>.S16<br>.S32<br>.U8<br>.U16<br>.U32<br>.F32 | Dd, Dn, Dm<br>Qd, Qn, Qm | Compare Greater-than<br>Vd[i] := (Vn[i] > Vm[i]) ?<br>ones : zeros |
| VCAGE | .F32 | Dd, Dn, Dm<br>Qd, Qn, Qm | Compare Absolute Greater-than or Equal<br>Vd[i] := (\|Vn[i]\| >= \|Vm[i]\|) ? ones : zeros |
| VCAGT | .F32 | Dd, Dn, Dm<br>Qd, Qn, Qm | Compare Absolute Greater-than<br>Vd[i] := (\|Vn[i]\| > \|Vm[i]\|)?ones:zeros |
| VCEQZ | .I8<br>.I16<br>.I32<br>.F32 | Dd, Dm<br>Qd, Qm | Compare Equal to Zero<br>Vd[i] := (Vm[i] == 0)<br>? ones : zeros |
| VCGEZ | .S8<br>.S16<br>.S32<br>.F32 | Dd, Dm<br>Qd, Qm | Compare Greater-than or Equal to Zero<br>Vd[i] := (Vm[i] >= 0)<br>? ones : zeros |
| VCGTZ | .S8<br>.S16<br>.S32<br>.F32 | Dd, Dm<br>Qd, Qm | Compare Greater-than Zero<br>Vd[i] := (Vm[i] > 0) ?<br>: ones : zeros |
| VCLEZ | .F32 | Dd, Dm<br>Qd, Qm | Compare Less-than or Equal to Zero<br>Vd[i] := (Vm[i] <= 0) ? ones : zeros<br>Note: Integer a <= 0 == !(a > 0) |
| VCLTZ | .F32 | Dd, Dm<br>Qd, Qm | Compare Less-than Zero<br>Vd[i] := (Vm[i] < 0) ?<br>: ones : zeros<br>Note: Integer a < 0 == !(a >= 0) |
| VTST | .I8<br>.I16<br>.I32 | Dd, Dn, Dm<br>Qd, Qn, Qm | Test Bits<br>vd[i] := ((Vn[i] & Vm[i]) != 0)<br>? ones : zeros |
| VMAX | .S8<br>.S16<br>.S32<br>.U8<br>.U16<br>.U32<br>.F32 | Dd, Dn, Dm<br>Qd, Qn, Qm | Maximum<br>Vd[i] := (Vn[i] >= Vm[i]) ?<br>Vn[i] : Vm[i] |
| VMIN | .S8<br>.S16<br>.S32<br>.U8<br>.U16<br>.U32<br>.F32 | Dd, Dn, Dm<br>Qd, Qn, Qm | Minimum<br>Vd[i] := (Vn[i] >= Vm[i]) ?<br>Vm[i] : Vn[i] |

Once the mask has been created a single instruction can be used to select either a or b using the general-purpose register containing this mask, the control register C. Thus, the data processor is controlled by C to perform the multiplexing operation of selecting either a or b.

Figure 41:
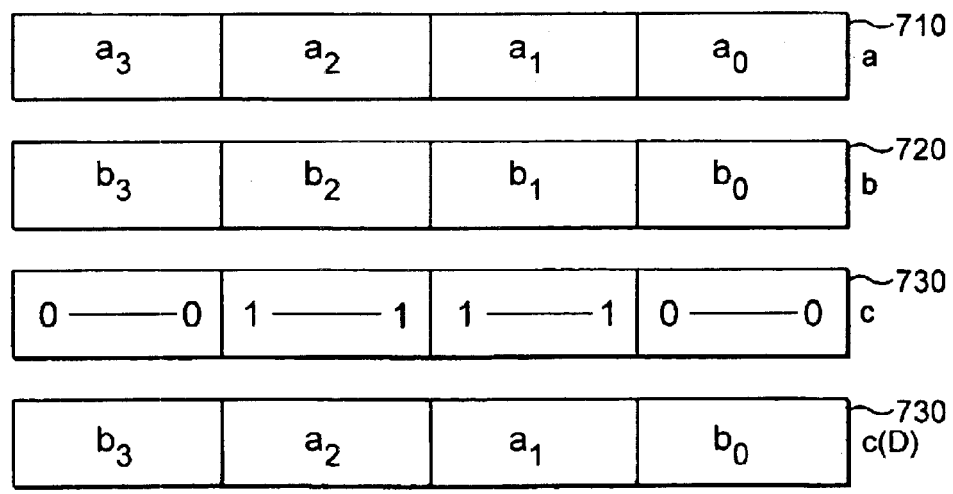
FIG. 41 schematically shows an embodiment where the selection of source values a or b is done on a bit-wise basis.

FIG. 41 schematically shows an embodiment of the system wherein the selection of source values a or b is done on a bit wise basis. In this case the control register 730 has been filled with data by comparing data elements in registers a 710 and b 720. Thus, data element a0, which is say eight bits wide is compared with data element b0 having the same size. In this case a is less than or equal to b and thus eight zeros are inserted into the corresponding portion of the control register 730. If a is greater than b 8 ones are inserted into the corresponding portion of the control register 730. A similar comparison is performed in parallel for all the data elements and corresponding control bits produced. The comparison operation that generates the control vector corresponds to the instruction VCGT.S8 c,a,b. Selection can then be performed very simply on a bit by bit basis by performing simple logical operations between the bits store in the source registers and the corresponding bits stored in the control register, each resultant bit being written to a destination register, which in this example is register 730, i.e. the results overwrite the control values. The advantage of this bitwise selection is that it is independent of data type and width and if appropriate different sized data elements can be compared.

Figure 42:
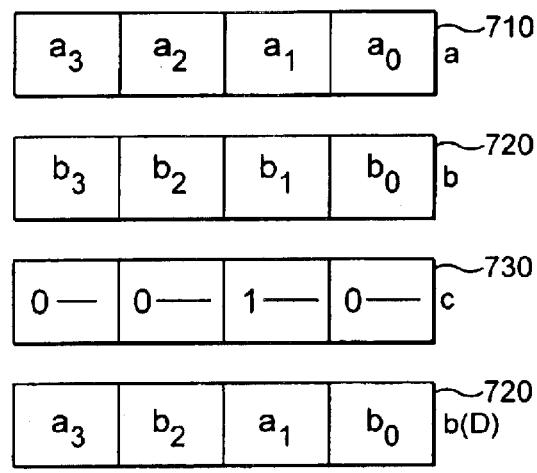
FIG. 42 schematically shows an alternative embodiment where the selection of source values a or b is done on a data element basis.

FIG. 42 shows an alternative embodiment where the control is not done on a bit-wise basis but is done on a data element basis. In the embodiment shown if a data element in the control register C 730, is greater than or equal to zero then a corresponding data element in source register b 720, it is written to the destination register (in this case register 720). If, as in this example, C is a signed integer, then only the most significant bit of C needs to be considered when deciding which of a or b to select.

In other embodiments other properties of C can be used to determine whether a data element from register a, 710 is to be selected, or one from data register b, 720. Examples of such properties include, whether C is odd or even, where again only one bit of the control value need to be considered, in this case the least significant bit, or if C is equal to zero, not equal to zero or greater than zero.

Generally ARM instructions and in fact many other RISC instructions only provide three operands with any instruction. Multiplexing operations in general require four operands to specify two source registers a and b, a control register C and a destination register D. Embodiments of the present system take advantage of the fact that generally following a multiplexing operation, at least one of the two sets of source data or the control data is no longer required. Thus, the destination register is chosen to be either one of the two source registers or the control register. This only works as the control register is a general-purpose register and not a special register. In embodiments of the system, three different instructions are provided in the instruction set, an instruction specific to writing back to one source register, another instruction for writing back to the other source register and a third instruction for writing to the control register. Each instruction requires just three operands, specifying two source registers and a control register. These three instructions are specified in table 9 below.

TABLE 9

Logical and Bitwise selection

| Mnemonic | Data Type | Operand Format | Description |
| --- | --- | --- | --- |
| VBIT | none | Dd, Dn, Dm | Bitwise Insert if True |
|  |  | Qd, Qn, Qm | Vd := (Vm) ? Vn : Vd |
| VBIF | none | Dd, Dn, Dm | Bitwise Insert if False |
|  |  | Qd, Qn, Qm | Vd := (Vm) ? Vd : Vn |
| VBSL | none | Dd, Dn, Dm | Bitwise Select |
|  |  | Qd, Qn, Qm | Vd := (Vd) ? Vn : Vm |

Figure 43A:
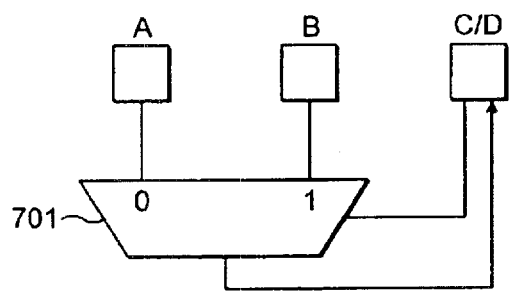
FIG. 43 schematically shows three examples of multiplexer arrangements corresponding to the three multiplexing instructions provided by the present technique.

FIG. 43 schematically shows three examples of multiplexer arrangements corresponding to the three multiplexing instructions provided by the system. FIG. 43a shows multiplexer 701 wired to perform the instruction bitwise select VBSL. In this example, contrary to the example illustrated in FIGS. 41 and 42, A is selected when C is false (0), and B is selected when C is true (1). In the embodiment illustrated the destination register is the same as the control register so that the resultant values overwrite the control values. If the reverse selection was required, i.e. A is selected when C is true and B when C is false, the same circuit could be used by simply swapping the operands A and B.

Figure 43B:
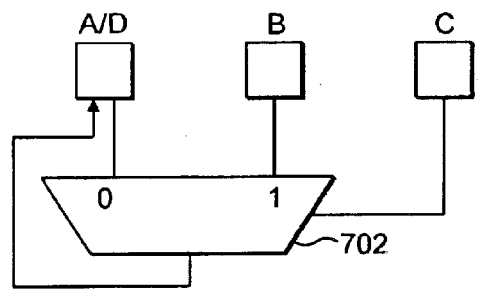

FIG. 43b shows a multiplexer 702 corresponding to the instruction BIT bitwise insert if true, and results in source register A acting as both source and destination register and being overwritten with the result data. In this example B is written into A when C is true, while if C is false the value present in register A remains unchanged. In this embodiment if the reverse selection is required, i.e. it is desired to write B to the destination register if C is false rather than true it is not possible to simply switch the registers around as the device does not have the symmetry of multiplexer 701.

Figure 43C:
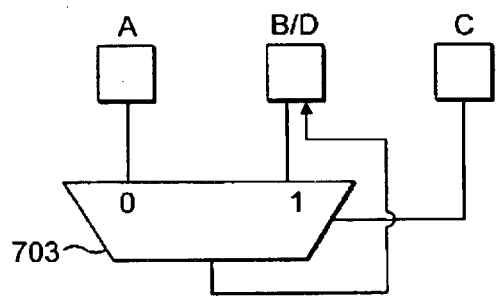

FIG. 43c shows a multiplexer 703 that is set up to correspond to the reverse selection of FIG. 43b, i.e. the instruction BIF bitwise insert if false. In this embodiment the value in register A is written into register B when C is false, while when C is true the value in register B remains unchanged. As in FIG. 43b there is no symmetry in this system.

Figure 44:
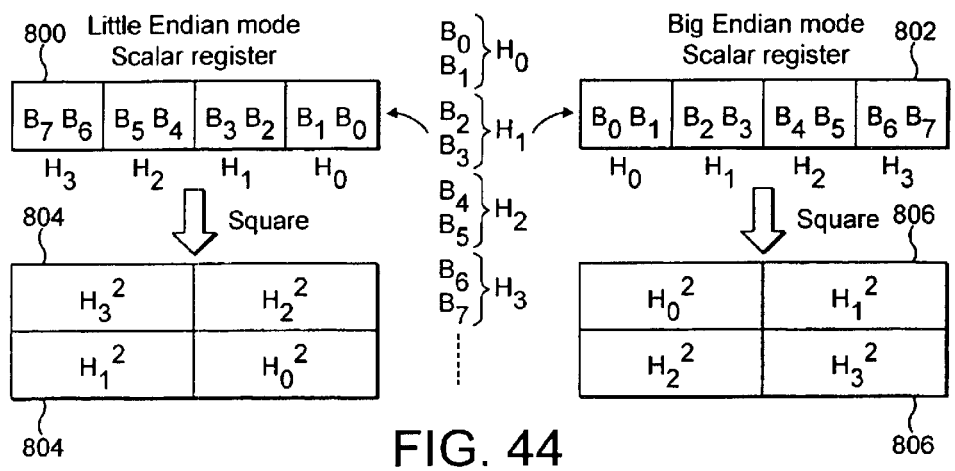
FIG. 44 schematically illustrates a SIMD register storing multiple data elements in different layouts depending upon the endianess mode.

FIG. 44 schematically illustrates a sequence of bytes of data $B_0$ to $B_7$ stored within a memory. These bytes are stored in accordance with byte invariant addressing whereby the same byte of data will be returned in response to reading of a given memory address irrespective of the current endianess mode. The memory also supports unaligned addressing whereby half words, words or larger multi-byte data elements may be read from the memory starting at an arbitrary memory byte address.

When the eight bytes of data $B_0$ to $B_7$ are read from the memory with the system in little endian mode, then the bytes $B_0$ to $B_7$ are laid out within a register 800 in the order shown in FIG. 44. The register 800 contains four data elements each comprising a half word of sixteen bits. FIG. 44 also shows the same eight bytes of data $B_0$ to $B_7$ being read out into a register 802 when the system is operating in big endian mode.

In this example, the data once read out from memory into the respective SIMD register 800, 802 is subject to a squaring operation which results in a doubling of the data element size. Accordingly, the result is written in two destination SIMD registers 804, 806. As will be seen from FIG. 44, the result values written respectively in the first or second of these register pairs 804, 806 vary depending upon the endianess mode in which the data has been read from the memory. Accordingly, a SIMD computer program which is to further manipulate the squared result values may need to be altered to take account of the different layout of the data depending upon the endianess mode. This disadvantageously results in the need to produce two different forms of the computer program to cope with different endianess in the way that the data has been stored within the memory.

Figure 45:
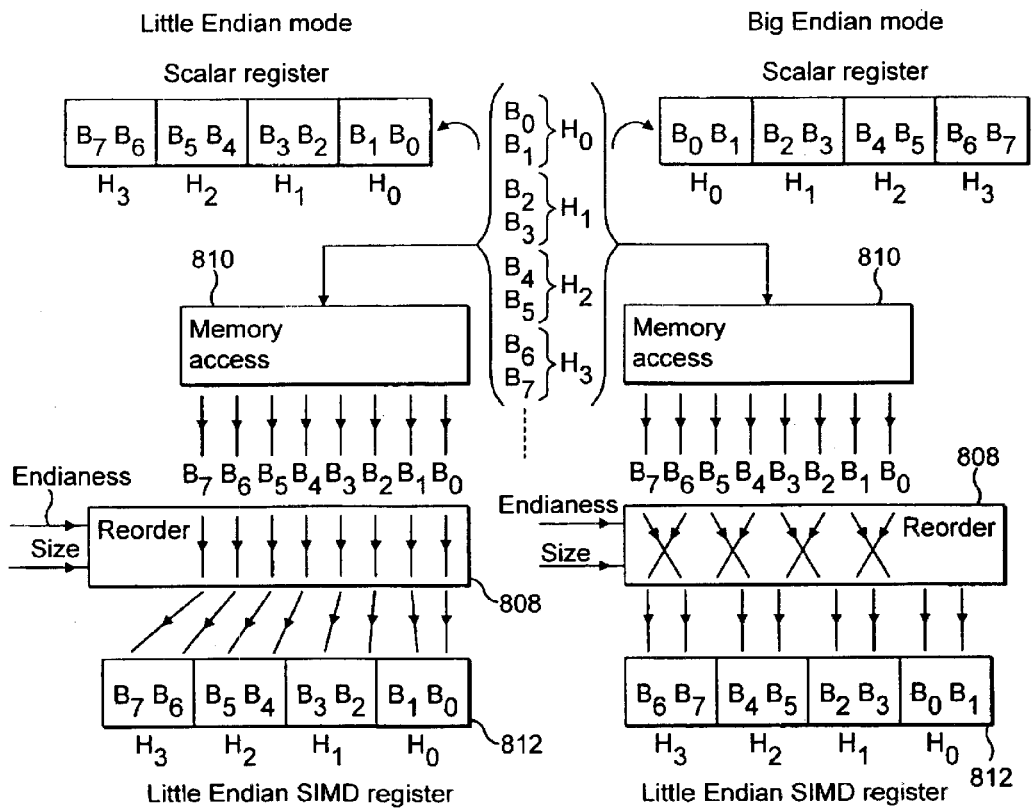
FIG. 45 schematically illustrates the operation of memory accessing logic and data element reordering logic in accordance with a first example.

FIG. 45 addresses this problem by the provision of reordering logic 808. The data processing system includes memory accessing logic 810 which serves to read the eight bytes of data $B_0$ to $B_7$ from the memory starting at a specified memory address and utilising the byte invariant addressing characteristic of the memory. The output of the memory accessing logic 810 accordingly presents bytes read from a given memory address at the same output lane irrespective of the endianess mode. Thus, in the example illustrated in which the data elements are half words, a byte recovered from a particular memory address may be the most significant portion of a half word when in one endianess mode whilst it is the least significant portion of a half word in the other endianess mode.

The data element reordering logic 808 is responsible for reordering the data elements retrieved from the memory by the memory access logic 810 such that the data elements which are loaded into the SIMD register 812 will be in a form consistent with the data having been stored in a little endian form and loaded without rearrangement irrespective of the endianess mode being used within the memory system. In the case of a little endian mode being used within the memory system, the data element reordering logic 808 will not reorder the bytes and will pass these through unaltered. However, in the case of the data being stored in a big endian form within the memory system, the data element reordering logic 808 serves to reverse the order of the bytes read from the memory within each half word so that the half word data element will appear in little endian form within the SIMD register 812. In this way, a single SIMD computer program can perform the correct data processing operations upon the data elements transferred into the SIMD register irrespective of the endianess mode in which these were stored within the memory. It will be seen from FIG. 45 that the data element reordering logic 808 is responsive to a signal indicating the endianess mode being used by the memory and a signal indicating the size of the data elements concerned. The endianess mode being used will control whether or not any reordering is required and the size will control the nature of the reordering applied if it is required. It will be seen that when the data is stored within the memory in little endian mode and the SIMD registers are little endian, then no reordering is required. Conversely, if the SIMD registers assumed a big endian form then no reordering would be required when the data was stored in big endian form within the memory but reordering would be required when the data was stored within a little endian form within the memory.

Figure 46:
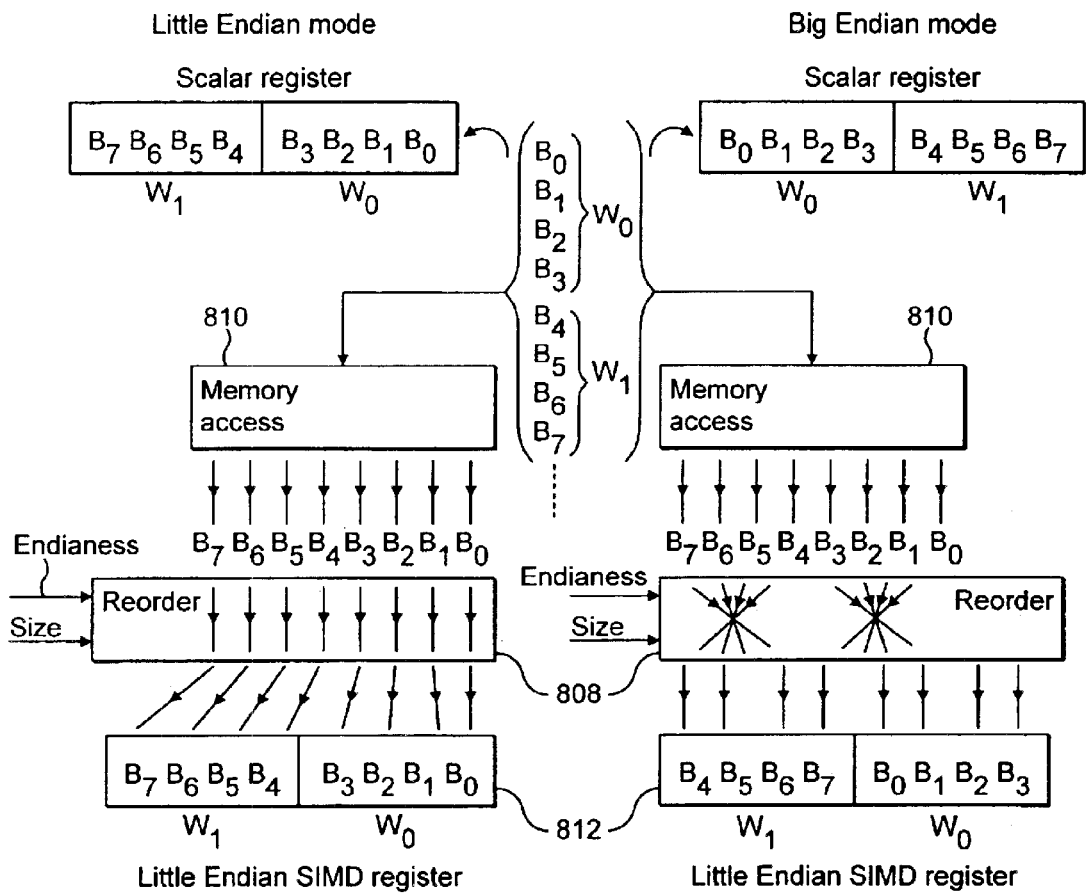
FIG. 46 schematically illustrates the operation of memory accessing logic and data element reordering logic in accordance with a second example.

FIG. 46 illustrates an example similar to that of FIG. 45 except that in this example the data elements are 32-bit data words. As will be seen, when these data words are stored within the memory in a big endian form, the reordering applied by the data element reordering logic 808 reverses the byte order of four byte data elements as retrieved by the memory accessing logic 810 so that these are stored into the SIMD register 812 in a form consistent with the data having been stored in a little endian form in the memory and loaded without rearrangement.

It will be appreciated that in the context of the processor system as a whole described herein, the memory accessing logic 810 and the data element reordering element 808 may form part of the previously described load store unit. The data element reordering logic 808 may also be used to compensate for memory system endianess when reading data into the scalar registers when a particular endianess is being assumed for the data within the scalar registers.

Figure 47:
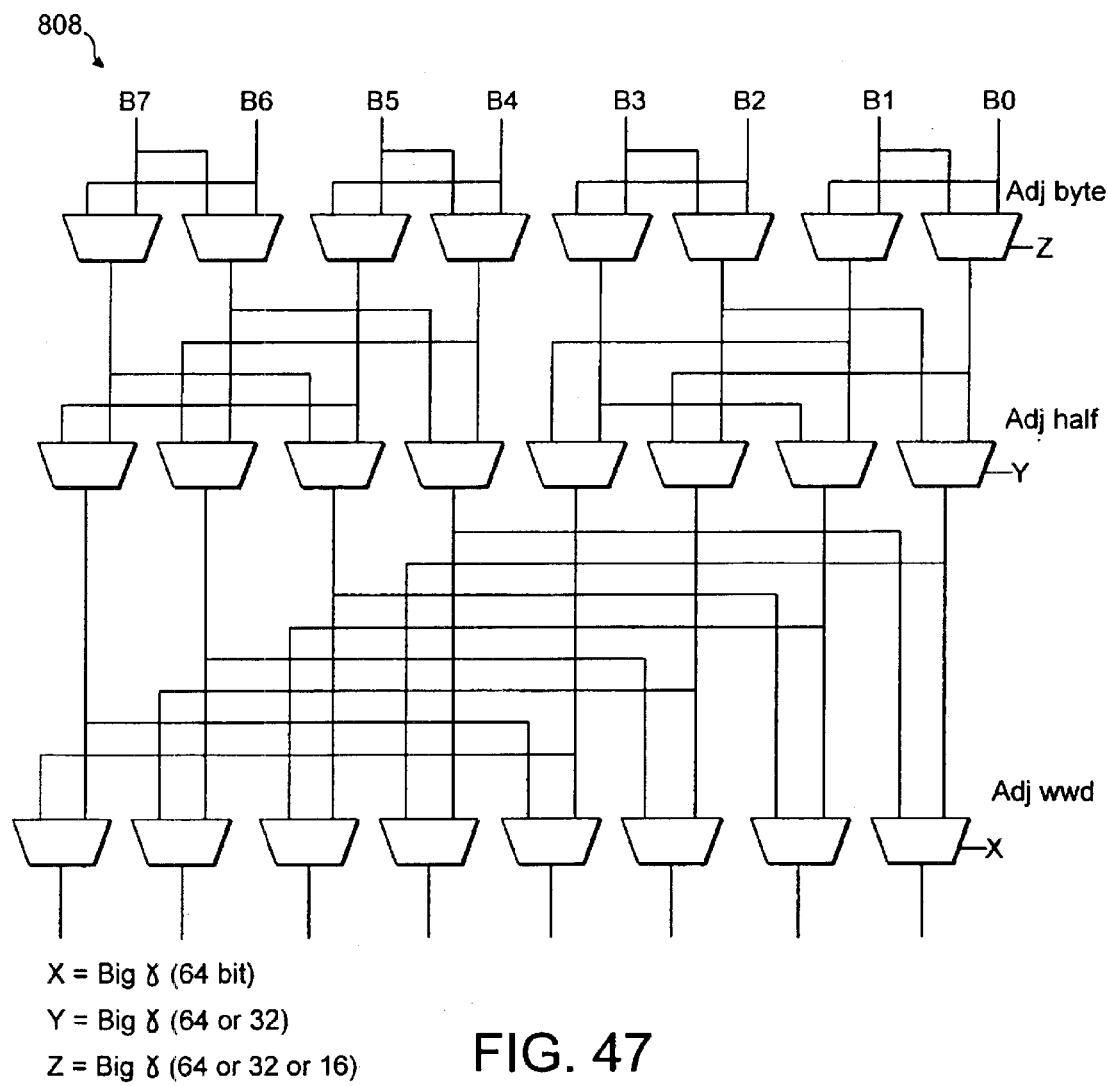
FIG. 47 schematically illustrates an example embodiment of the data element reordering logic of FIGS. 45 and 46 in more detail.

FIG. 47 illustrates the data element reordering logic 808 in more detail. It will be seen that this is formed as three levels of multiplexers controlled by respective controlled signals Z, Y and X. These three layers are respectively responsible for reversing positions of adjacent bytes, adjacent half words and adjacent words of data. The control signals X, Y and Z are decoded from an endianess signal which when asserted indicates big endian mode and a size signal indicating respectively 64, 32 or 16 bit data element size as is illustrated in FIG. 47. It will be appreciated that many other forms of data element reordering logic could be used to achieve the same functional result as is illustrated in FIGS. 45 and 46.

The memory access instruction which is used to perform the byte invariant addressing of the memory conveniently uses a memory address pointer which is held within a register of a scalar register bank of the processor. The processor supports data processing instructions which change the data element size as well as data processing instructions which operate on selected ones of data elements within a SIMD register.

Figure 48:
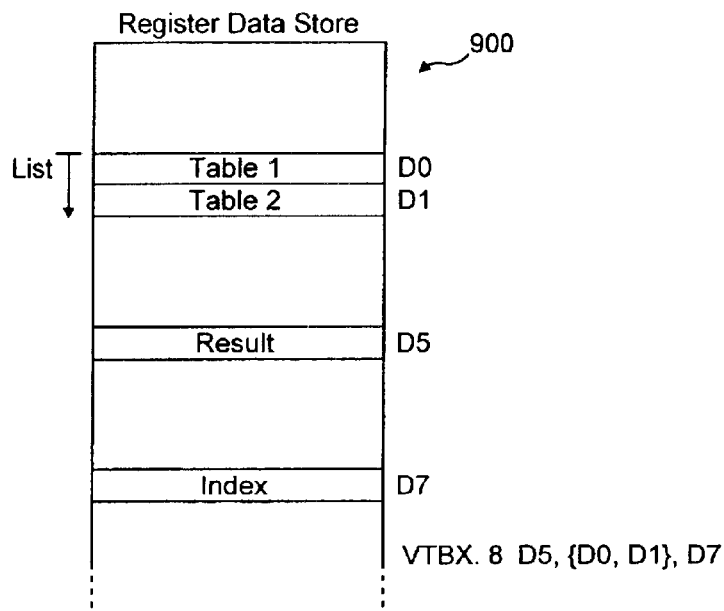
FIG. 48 schematically illustrates a register data store including two registers serving as table registers, a result register and an index register.

FIG. 48 illustrates a register data store 900 which includes a list of registers D0, D1 each serving as a table register, an index register D7 and a result register D5. It will be seen that the table registers D0, D1 are contiguously numbered registers within the register data store 900. The result register D7 and the index register D5 are arbitrarily positioned relative to the table registers and each other. The syntax of the instruction corresponding to this data manipulation is shown in the figure.

Figure 49:
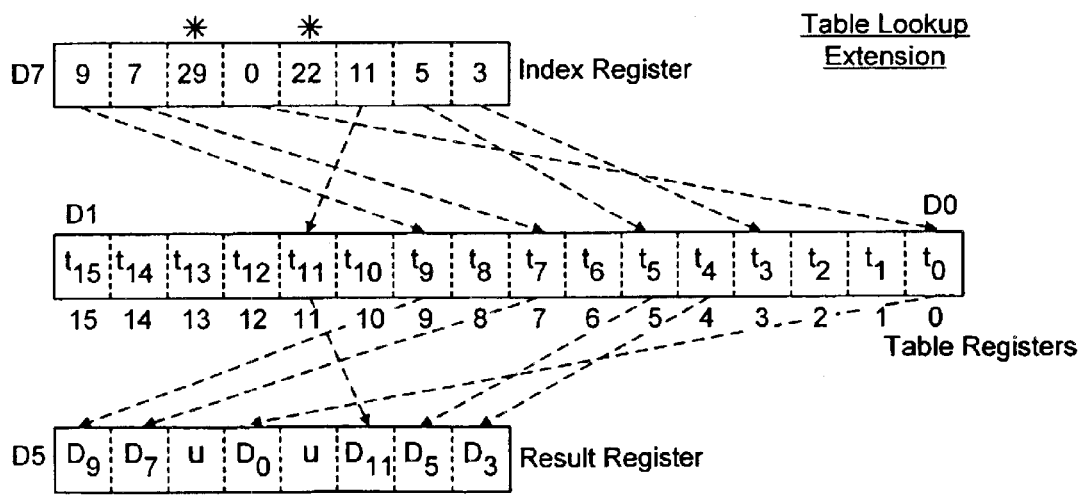
FIG. 49 schematically illustrates the action of a table lookup extension instruction.

FIG. 49 schematically illustrates the action of a table lookup extension instruction. This instruction specifies a list of registers to be used as a block of table registers, such as by specifying the first register in the list and the number of registers in the list (e.g. one to four). The instruction also specifies a register to be used as the index register D7 and a register to be used as the result register D5. The table lookup extension instruction further specifies the data elements size of the data elements stored within the table registers D0, D1 and to be selected and written into the result register D5. In the example illustrated, the table registers D0, D1 each contain eight data elements. Accordingly, the index values have an in-range span of 0 to 15. Index values outside of this predetermined range will not result in a table lookup and instead the corresponding position within the result register D5 will be left unchanged. As illustrated, the fourth and sixth index values are out-of-range in this way. The other index values point to respective data elements within the table registers D0, D1 and these data elements are then stored into the corresponding positions within the result register D5. There is a one-to-one correspondence between index value position within the index register D7 and data element position within the result register D5. The values marked "U" in the result register D5 indicate that the values stored at those locations are preserved during the action of the table lookup extension instruction. Thus, whatever bits were stored in those locations prior to execution of the instruction are still stored within those positions following the execution of the instruction.

Figure 50:
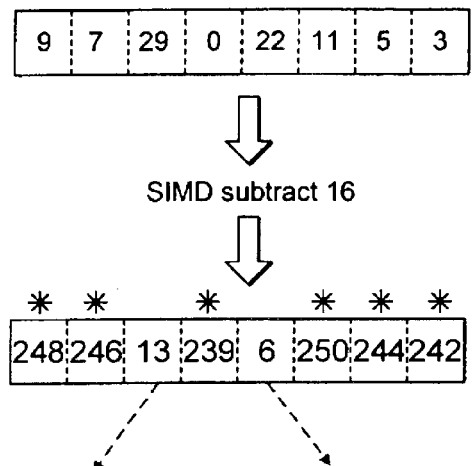
FIG. 50 schematically illustrates processing performed upon an index register before the index values within the index register are reused by a further table lookup extension instruction.

FIG. 50 illustrates the index values from FIG. 49 which are then subject to a SIMD subtraction operation whereby an offset of sixteen is applied to each of the index values. This takes the previously in-range index values to out-of-range values. The previously out-of-range values are now moved in-range. Thus, when the index register D7 containing the now modified index values is reused in another table lookup extension instruction, the fourth and sixth index values are now in-range and result in table lookups being performed in table registers D0, D1 (or other different registers which may be specified in the second table lookup extension instruction) which have also been reloaded prior to the execution of a second table lookup extension instruction. Thus, a single set of index values within an index register D7 may be subject to an offset and then reused with reloaded table registers D0, D1 to give the effect of a larger table being available.

Figure 51:
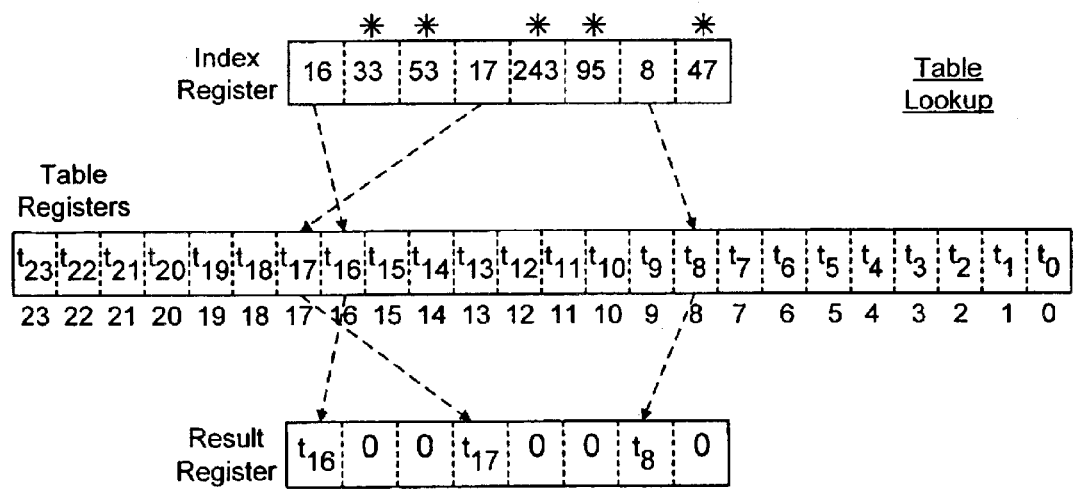
FIG. 51 schematically illustrates the operation of a table lookup instruction in which zero values are written into the result registers at locations corresponding to out-of-range index values.

FIG. 51 illustrates further a table lookup instruction which may be provided in addition to the table lookup extension instruction. The difference between these instructions is that when an out-of-range index value is encountered in a table lookup instruction, the location within the result register D5 corresponding to that index value is written to with zero values rather than being left unchanged. This type of behaviour is useful in certain programming situations. The example FIG. 51 illustrates three5 table registers rather than two table registers. The first, third, fourth, sixth and seventh index values are out-of-range. The second, fifth and eighth index values are in-range and result in table lookups of corresponding data elements within the table registers.

As mentioned earlier, load and store instructions are provided for moving data between the SIMD register file 20 (see FIG. 1) and memory. Each such load and store instruction will specify a start address identifying the location within the memory from which the access operation (whether that be a load operation or a store operation) should begin. In accordance with the load and store instructions of embodiments, the amount of data that is the subject of that load or store instruction can be varied on a per instruction basis. In particular embodiments, the amount of data is identified by identifying the data type "dt" (i.e. the size of each data element) and identifying the number of data elements to be accessed by identifying the SIMD register list and optionally the number of structures to be accessed.

When performing SIMD processing, it is often the case that the access operations performed with respect to the necessary data elements are often unaligned accesses (also referred to herein as byte aligned accesses). In other words, the start address will often be unaligned, and in such situations the LSU 22 needs to allocate to the access operation the maximum number of accesses that may be required to enable the access operation to complete.

Whilst in a possible implementation, the LSU 22 could be arranged to assume that every access is unaligned, this means that the LSU 22 is unable to improve the efficiency of the access operations in situations where the start address is in fact aligned with a certain multiple number of bytes.

Whilst the LSU 22 would be able to determine from the start address whether the start address has a predetermined alignment, the LSU 22 typically has to commit the number of accesses for the access operation at a time before the start address has actually been computed. In a particular embodiment, the LSU 22 has a pipelined architecture, and the number of accesses to be used to perform any particular access operation is determined by the LSU in the decode stage of the pipeline. However, often the start address is computed in a subsequent execute stage of the pipeline, for example by adding an offset value to a base address, and accordingly the LSU 22 is unable to await determination of the start address before determining how many accesses to allocate to the access operation.

In accordance with an embodiment, this problem is alleviated by providing an alignment specifier field within the access instruction, also referred to herein as an alignment qualifier. In one particular embodiment, the alignment qualifier can take a first value which indicates that the start address is to be treated as byte aligned, i.e. unaligned. It will be appreciated that this first value could be provided by any predetermined encoding of the alignment specifier field. In addition, the alignment qualifier can take any one of a plurality of second values indicating different predetermined alignments that the start address is to be treated as conforming to, and in one particular embodiment, the plurality of available second values are as indicated in the following table:

TABLE 10

| Alignment Qualifier | Start Address Format | Promise and Availability |
|---|---|---|
| @16 | ..xxxxxxx0 | The start address is to be considered to be a multiple of 2 bytes. Available to instructions that transfer exactly 2 bytes. |
| @32 | ..xxxxxx00 | The start address is to be considered to be a multiple of 4 bytes. Available to instructions that transfer exactly 4 bytes. |
| @64 | ..xxxxx000 | The start address is to be considered to be a multiple of 8 bytes. Available to instructions that transfer a multiple of 8 bytes. |
| @128 | ..xxxx0000 | The start address is to be considered to be a multiple of 16 bytes. Available to instructions that transfer a multiple of 16 bytes. |
| @256 | ..xxx00000 | The start address is to be considered to be a multiple of 32 bytes. Available to instructions that transfer a multiple of 32 bytes. |

Figure 52:
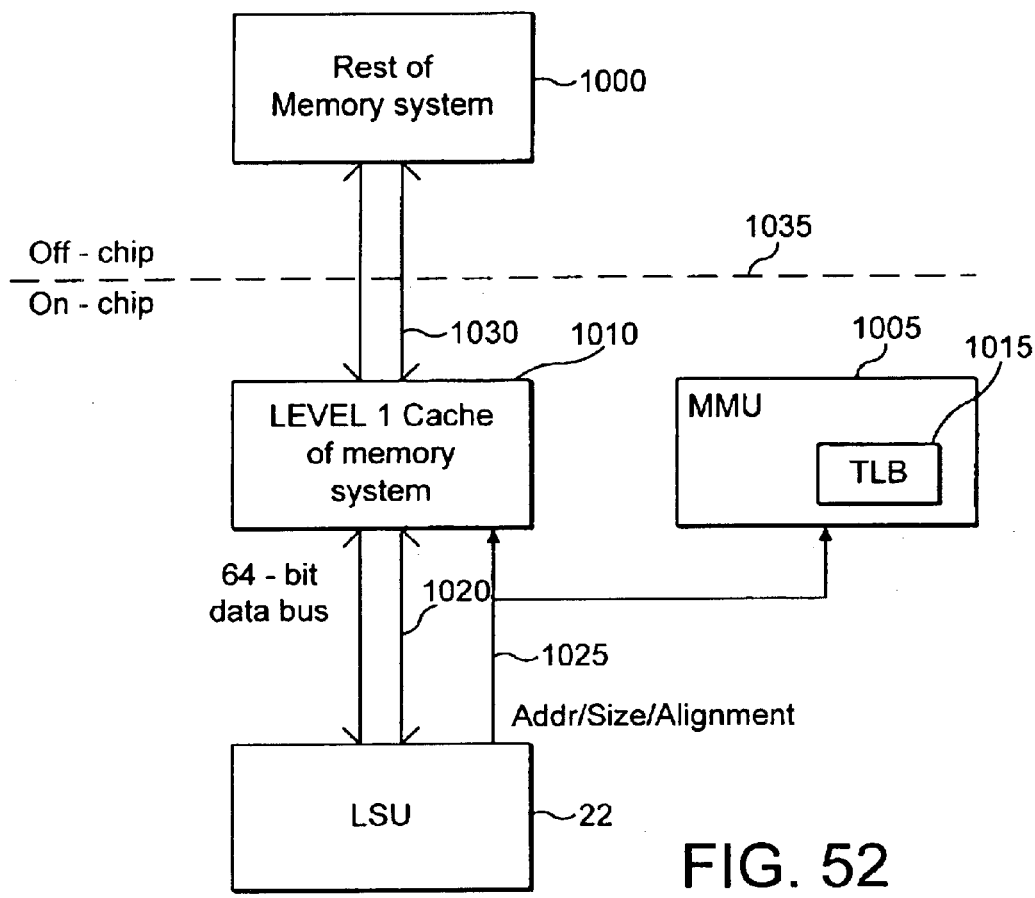
FIG. 52 illustrates how the LSU of FIG. 1 is coupled with a memory system and a Memory Management Unit in accordance with one embodiment.

The manner in which this alignment specifier information is used in one embodiment will now be described with reference to FIG. 52. As shown in FIG. 52, the LSU 22 will typically be connected to a memory system via a data bus of a predetermined width. Often the memory system will consist of a number of different levels of memory, and the first level of memory is often a cache, this being the level of memory with which the LSU communicates via the data bus. Accordingly, as shown in FIG. 52, the LSU 22 is arranged to communicate with a level 1 cache 1010 of the memory via a data bus 1020, in this particular example the data bus being considered to have a width of 64 bits. In the event of a cache hit the access takes place with respect of the contents of the level 1 cache, whereas in the event of a cache miss, the level 1 cache 1010 will then communicate with other parts of the memory system 1000 via one or more further buses 1030.

The various parts of the memory system may be distributed, and in the example illustrated in FIG. 52, it is assumed that the level 1 cache 1010 is provided on-chip, i.e. is incorporated within the integrated circuit 2 of FIG. 1, whilst the rest of the memory system 1000 is provided off-chip. The delimitation between on-chip and off-chip is indicated by the dotted line 1035 in FIG. 52. However, it will be appreciated by those skilled in the art that other configurations may be used, and so for example all of the memory system may be provided off-chip, or some other delimitation between the on-chip parts of the memory system and the off-chip parts of the memory system may be provided.

The LSU 22 is also arranged to communicate with a memory management unit (MMU) 1005, which typically incorporates a Translation Lookaside Buffer (TLB) 1015. As will be appreciated by those skilled in the art, an MMU is used to perform certain access control functions, for example conversion of virtual to physical addresses, determination of access permissions (i.e. whether the access can take place), etc. To do this, the MMU stores within the TLB 1015 descriptors obtained from page tables in memory. Each descriptor defines for a corresponding page of memory the necessary access control information relevant to that page of memory.

The LSU 22 is arranged to communicate certain details of the access to both the level 1 cache 1010 and the MMU 1005 via a control path 1025. In particular, the LSU 22 is arranged to output to the level 1 cache and the MMU a start address and an indication of the size of the block of data to be accessed. Furthermore, in accordance with one embodiment, the LSU 22 also outputs alignment information derived from the alignment specifier. The manner in which the alignment specifier information is used by the LSU 22 and/or by the level 1 cache 1010 and the MMU 1005 will now be described further with reference to FIGS. 53A to 54B.

Figure 53A:
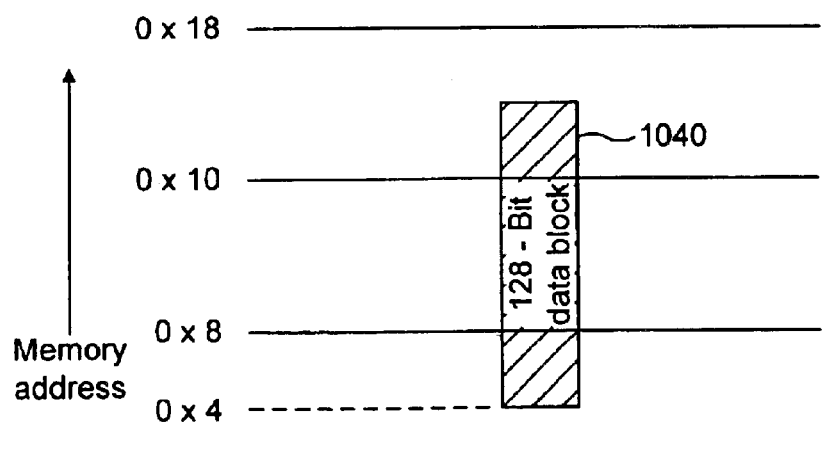
FIGS. 53A to 53D are diagrams schematically illustrating various examples of data blocks to be accessed in accordance with an embodiment.

FIG. 53A illustrates a memory address space, with each solid horizontal line indicating a 64-bit alignment in memory. If the access operation specifies the 128-bit long data block 1040, which for the sake of argument we will assume has a start address of 0×4, then the LSU 22 needs to determine the number of separate accesses over the 64-bit data bus 1020 to allocate to the access operation. Further, as discussed earlier, it will typically need to make this determination before it knows what the start address is. In the embodiment envisaged with respect to FIG. 52, the LSU 22 is arranged to use the alignment specifier information when determining the number of accesses to allocate.

In the example of FIG. 53A, the start address is 32-bit aligned, and the alignment specifier may have identified this alignment. In that instance, as can be seen from FIG. 53A, the LSU 22 has to assume the worst case scenario, and hence assume that three separate accesses will be required in order to perform the necessary access operation with regard to the data block 1040. This is the same number of accesses that would have to be allocated for an unaligned access.

Figure 53B:
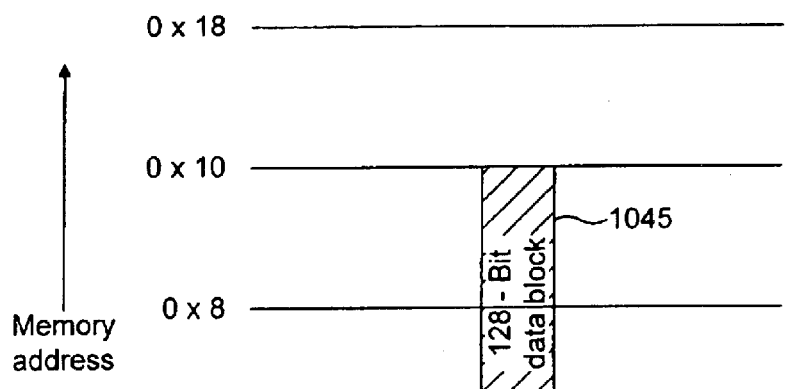

However, if we now consider the similar example illustrated in FIG. 53B, it can be seen that again a 128-bit data block 1045 is to be accessed, but in this instance the start address is 64-bit aligned. If the alignment specifier information identifies this 64-bit alignment, or indeed identifies the data as being 128-bit aligned, then in this case the LSU 22 only needs to allocate two separate accesses to the access operation, thereby providing a significant improvement in efficiency. If, however, the data bus were 128-bits wide, then if the alignment specifier indicated 128-bit alignment rather than 64-bit alignment, the LSU 22 would only need to allocate a single access.

Figure 53C:
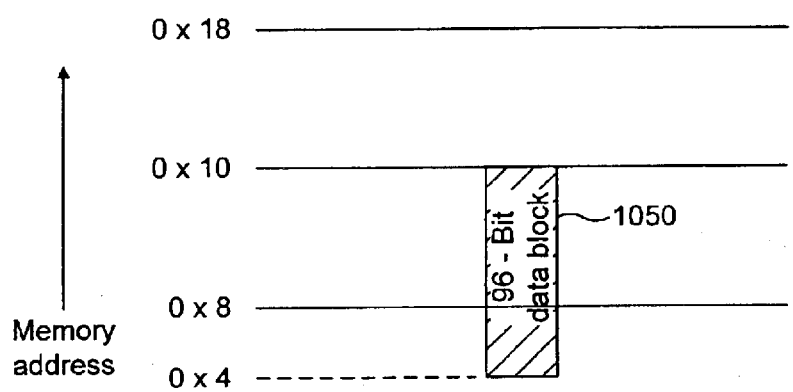
Figure 53D:
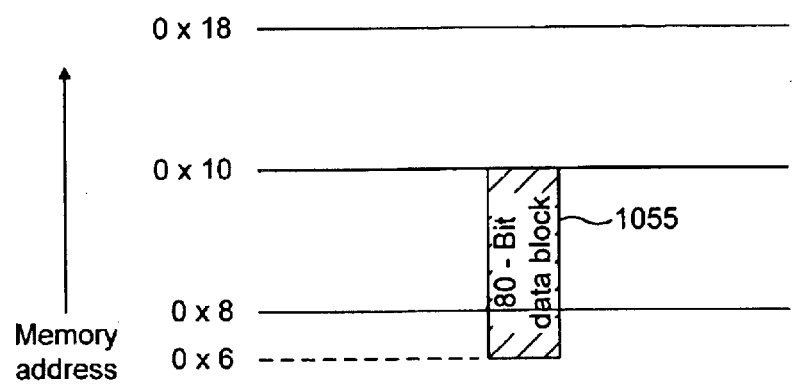

Considering now the example in FIG. 53C, here it can be seen that a 96-bit size data block 1050 needs to be accessed, and in this instance it is assumed that the alignment specifier identifies that the start address is 32-bit aligned. Again, in this example, even though the LSU 22 will not actually have calculated the start address at the time the number of accesses needs to be committed, the LSU 22 can still assume that only two accesses need to be allocated to the access operation. FIG. 53D illustrates a fourth example in which an 80-bit data block 1055 is to be accessed, and in which the alignment specifier identifies that the start address is 16-bit aligned. Again, the LSU 22 only needs to allocate two accesses to the access operation. If instead the alignment specifier had indicated that the access was to be treated as an unaligned access, then it is clear that the LSU would have to have allocated three accesses to the access operation, as indeed would have been the case for the access illustrated in FIG. 53C. Accordingly, it can be seen that the alignment specifier information can be used by the LSU 22 to significantly improve the performance of accesses in situations where the alignment specifier indicates a certain predetermined alignment of the start address.

It should be noted that the alignment specifier cannot be taken as a guarantee that the start address (also referred to herein as the effective address) will have that alignment, but does provide the LSU 22 with an assumption on which to proceed. If the start address subsequently turns out not to obey the alignment specified by the alignment specifier, then in one embodiment the associated load or store operation is arranged to generate an alignment fault. The alignment fault can then be handled using any one of a number of known techniques.

Figure 54A:
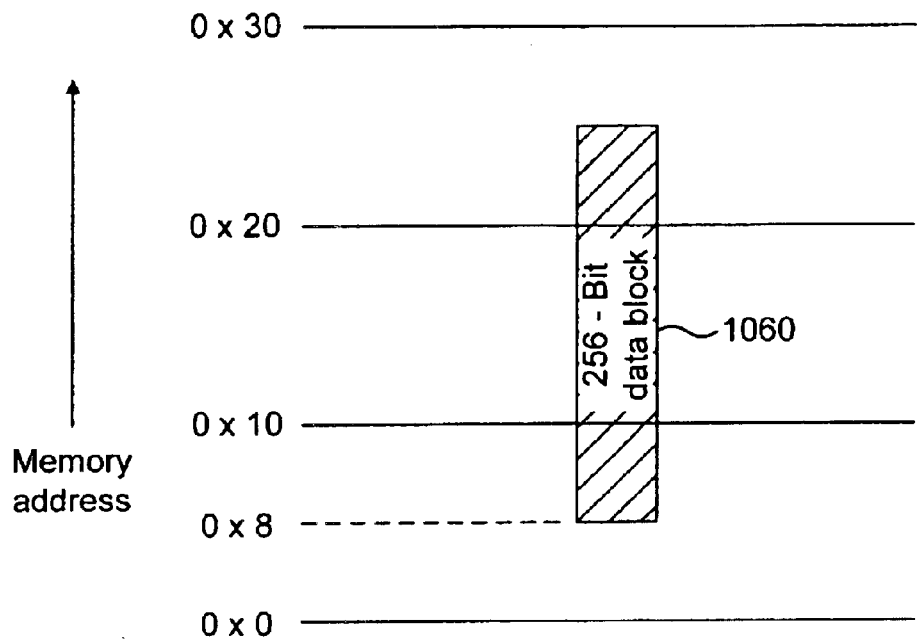
FIGS. 54A and 54B are diagrams schematically illustrating further examples of data blocks to be accessed in accordance with an embodiment.
Figure 54B:
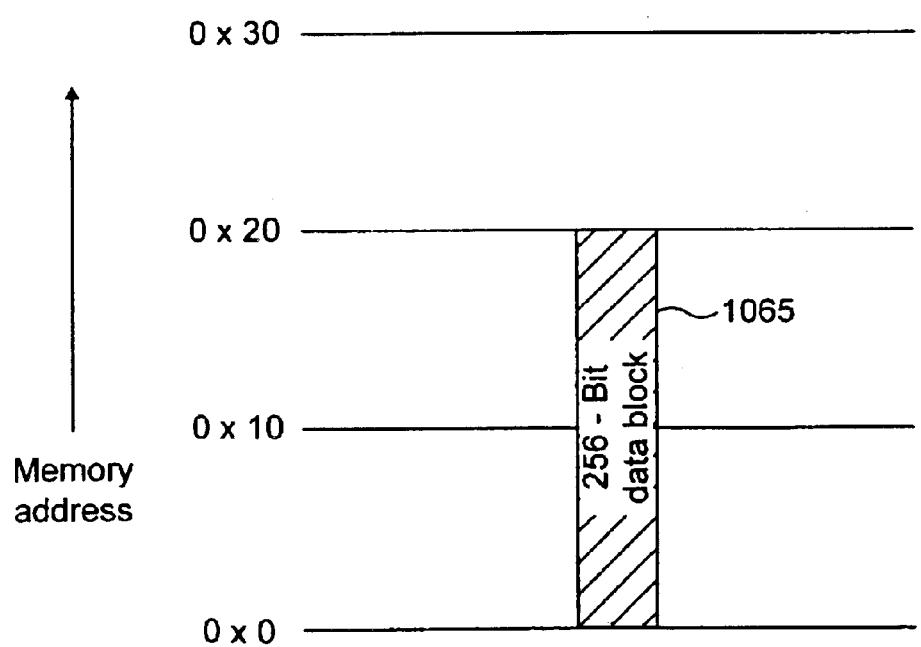

As mentioned earlier, the alignment information is not only used by the LSU 22, but is also propagated via path 1025 to both the level 1 cache 1010 and the MMU 1005. The manner in which this information may be used by the level 1 cache or the MMU will now be described with reference to FIGS. 54A and 54B. As illustrated in FIGS. 54A and 54B, an access to a 256-bit data block 1060, 1065 is considered, in these examples the solid horizontal lines in the diagrams indicating a 128-bit alignment in memory. In FIG. 54A, it is assumed that the data block is 64-bit aligned, whilst in FIG. 54B it is assumed that the data block is 128-bit aligned. In both instances, since the data bus 1020 is only 64-bits wide, it will be clear that the LSU 22 has to allocate four accesses to the access operation. From the LSU's perspective, it does not matter whether the alignment specifier specifies that the start address is 64-bit aligned or 128-bit aligned.

However, the cache lines within the level 1 cache 1010 may each be capable of storing in excess of 256 bits of data, and further may be 128-bit aligned. In the example of FIG. 54A, since the data block is not 128-bit aligned, the cache will need to assume that two cache lines will need to be accessed. However, in the example of FIG. 54B, the level 1 cache 1010 can determine from the alignment specifier that only a single cache line within the level 1 cache needs to be accessed, and this can be used to increase the efficiency of the access operation within the level 1 cache 1010.

Similarly, the page tables that need to be accessed by the MMU in order to retrieve the appropriate descriptors into the TLB 1015 will often store in excess of 256 bits of data, and may often be 128-bit aligned. Accordingly, the MMU 1005 can use the alignment information provided over path 1025 in order to determine the number of page tables to be accessed. Whilst in the example of FIG. 54A, the MMU 1005 may need to assume that more than one page table will need to be accessed, in the example of FIG. 54B, the MMU can determine from the alignment specifier that only a single page table needs to be accessed, and this information can be used to improve the efficiency of the access control functions performed by the MMU 1005.

Accordingly, it can be seen that the use of the alignment specifier within the load or store instructions as described above can be used to enable the hardware to optimise certain aspects of the access operation, which is especially useful if the number of access cycles and/or cache accesses has to be committed to before the start address can be determined. This scheme is useful for load or store instructions specifying various lengths of data to be accessed, and on processors with differing data bus sizes between the LSU and the memory system.

Figure 55A:
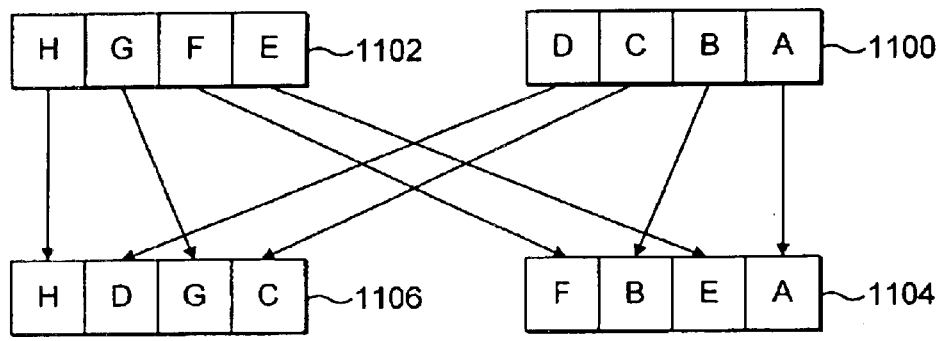
FIGS. 55A to 55C schematically illustrate an interleave operation, a de-interleave operation and a transpose operation, respectively.
Figure 55B:
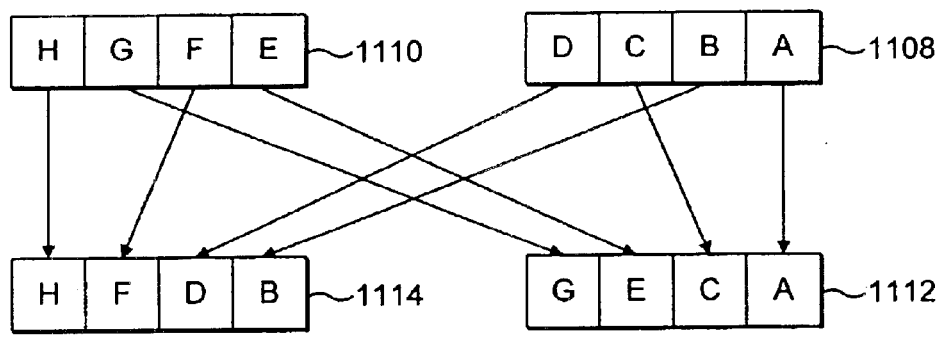
Figure 55C:
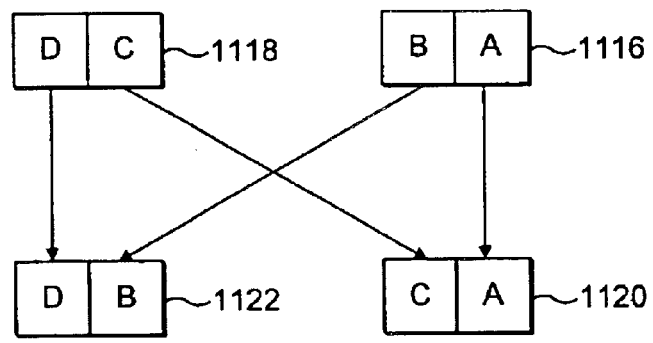

There are a number of data processing operations which do not lend themselves to being performed in a standard SIMD format, where multiple data elements are placed side-by-side within a register, and then the operation is performed in parallel on those data elements. Examples of some such operations are illustrated in FIGS. 55A to 55C. FIG. 55A illustrates an interleave operation, where it is desired to interleave four data elements A, B, C, D within a first register 1100 with four data elements E, F, G, H within a second register 1102. In FIG. 55A, the resultant interleave data elements are shown within destination registers 1104, 1106. These destination registers may be different registers to the source registers 1100, 1102, or alternatively may be the same set of two registers as the source registers. As can be seen from FIG. 55A, in accordance with this interleave operation, the first data elements from each source register are placed side-by-side within the destination registers, followed by the second data elements from both source registers, followed by the third data elements from both source registers, followed by the fourth data elements from both source registers.

FIG. 55B illustrates the reverse de-interleave operation, where it is required to de-interleave the eight data elements placed in the two source registers 1108 and 1110. In accordance with this operation, the first, third, fifth and seventh data elements are placed in one destination register 1112, whilst the second, fourth, sixth and eighth data elements are placed in a second destination register 1114. As with the FIG. 55A example, it will be appreciated that the destination registers may be different to the source registers, or alternatively may be the same registers. If in the examples of FIGS. 55A and 55B it is assumed that the registers are 64-bit registers, then in this particular example the data elements being interleaved or de-interleaved are 16-bit wide data elements. However, it will be appreciated that there is no requirement for the data elements being interleaved or de-interleaved to be 16-bits wide, nor for the source and destination registers to be 64-bit registers.

FIG. 55C illustrates the function performed by a transpose operation. In accordance with this example, two data elements A, B from a first source register 1116, and two data elements C, D from a second source register 1118, are to be transposed, and the result of the transposition is that the second data element from the first source register 1116 is swapped with the first data element from the second source register 1118, such that within the first destination register 1120, the data elements A, C are provided, whilst in a second destination register 1122 the data elements B, D are provided. Again, the destination registers may be different to the source registers, but it is often the case that the destination registers are in fact the same registers as the source registers. In one example, each of the registers 1116, 1118, 1120, 1122 may be considered to be 64-bit registers, in which event the data elements are 32-bit wide data elements. However, there is no requirement for the data elements to be 32-bit wide, nor for the registers to be 64-bit registers.

Further, whilst in all of the above examples it has been assumed that the entire contents of the registers are shown, it is envisaged that any of these three discussed operations could be performed independently on the data elements within different portions of the relevant source registers, and hence the figures in that case illustrate only a portion of the source/destination registers.

As mentioned earlier, the standard SIMD approach involves placing multiple data elements side-by-side within a register, and then performing an operation in parallel on those data elements. In other words, the parallelisation of the operation is performed at the data element granularity. Whilst this leads to very efficient execution of operations where the required data elements can be arranged in such a manner, for example by spreading the required source data elements across multiple registers, there are a significant number of operations where it is not practical to arrange the required source data elements in such a way, and hence in which the potential speed benefits of a SIMD approach have not previously been able to be exploited. The above interleave, de-interleave and transpose operations are examples of such operations which have not previously been able to take advantage of the speed benefits of a SIMD approach, but it will be appreciated that there are also many other examples, for example certain types of arithmetic operations. One particular example of such an arithmetic operation is an arithmetic operation which needs to be applied to a complex number consisting of real and imaginary parts.

In accordance with one embodiment, this problem is alleviated by providing the ability for certain data processing instructions to identify not only a data element size, but also to further identify as a separate entity a lane size, the lane size being a multiple of the data element size. The parallelisation of the data processing operation then occurs at the granularity of the lane size rather than the data element size, such that more than one data element involved in a particular instantiation of the data processing operation can co-exist within the same source register. Hence, the processing logic used to perform the data processing operation can define based on the lane size a number of lanes of parallel processing, and the data processing operation can then be performed in parallel in each of the lanes, the data processing operation being applied to selected data elements within each such lane of parallel processing.

Figure 56A:
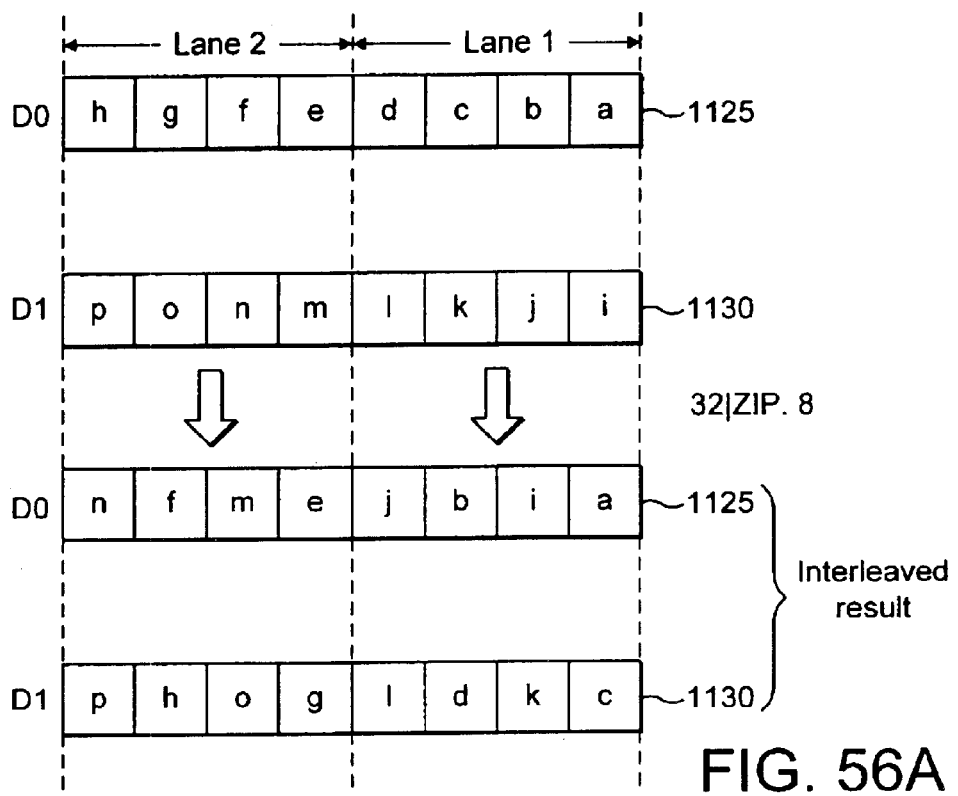
FIGS. 56A and 56B schematically illustrate how interleave and transpose operations are performed in accordance with one embodiment.

By such an approach, it is possible to perform in a SIMD manner interleave operations such as those described earlier with reference to FIG. 55A. In particular, FIG. 56A illustrates the processing performed when executing a "ZIP" instruction in accordance with one embodiment. In this particular example, the ZIP instruction is a 32|ZIP.8 instruction. This instruction hence identifies that the data elements are 8-bits wide, and the lanes are 32-bits wide. For the example of FIG. 56A, it is assumed that the ZIP instruction has specified the source registers to be the 64-bit registers D0 1125 and D1 1130. Each of these registers hence contains eight 8-bit data elements. Within each lane the interleave operation is applied independently, and in parallel, resulting in the rearrangement of data elements as shown in the lower half of FIG. 56A. In one embodiment, it is assumed that for the ZIP instruction, the destination registers are the same as the source registers, and accordingly these rearranged data elements are once again stored within the registers D0 1125 and D1 1130. As can be seen from FIG. 56A, within lane 1, the first four data elements of each source register have been interleaved, and within lane 2, the second four data elements of each source register have been interleaved.

It will be readily appreciated that different forms of interleaving could be performed by changing either the lane size, or the data element size. For example, if the lane size was identified as being 64-bits, i.e. resulting in there being only a single lane, then it can be seen that the destination register D0 would contain the interleaved result of the first four data elements of each register, whilst the destination register D1 would contain the interleaved result of the second four data elements of each register. It will be appreciated that a corresponding UNZIP instruction can be provided in order to perform the corresponding de-interleave operation, the UNZIP instruction again being able to specify both a lane size and a data element size.

Figure 56B:
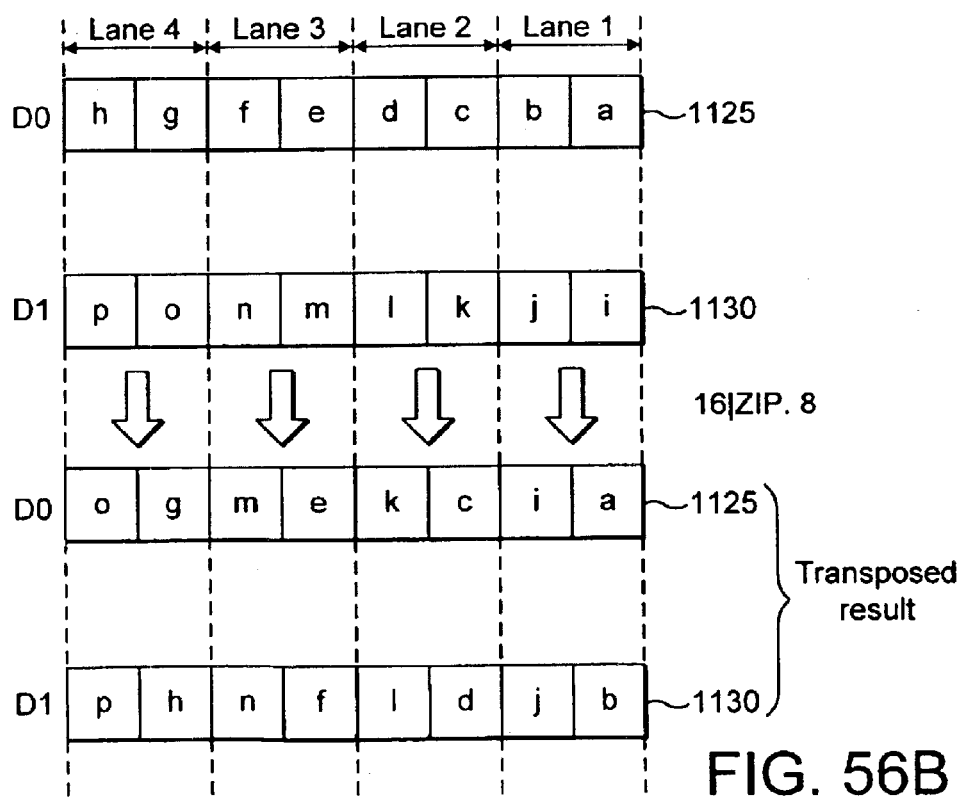

Typically, a transpose operation is considered to be a quite different operation to an interleave operation or a de-interleave operation, and hence it would typically be envisaged that a separate instruction would need to be provided to perform transpose operations. However, if has been realized that when providing an interleave or a de-interleave instruction with the ability to separately define a lane size and a data element size, then the same instruction can in fact be used to perform a transpose operation when two source registers are specified, and the lane size is set to be twice the data element size. This is illustrated in FIG. 56B where the interleave instruction ZIP has been set to identify a data element size of 8 bits, and a lane size of 16 bits (i.e., twice the data element size). Assuming the same 64-bit source registers D0 1125 and D1 1130 are chosen as in FIG. 56A example, this defines four lane of parallel processing as shown in FIG. 56B. As can be seen from the lower half of FIG. 56B, the interleaving process actually results within each lane in the generation of a transposed result, in that the first data element of the second source register within each lane is swapped with second data element of the first source register within each lane.

Hence, in accordance with the above described embodiment, the same ZIP instruction can be used to perform either an interleave, or a transpose operation, dependent on how the lane size and data element size are defined. It should further be noted that a transposition can also be performed in exactly the same manner using the UNZIP instruction, and accordingly a 16|UNZIP.8 instruction will perform exactly the same transpose operation as a 16|ZIP.8 instruction.

Figure 57A:
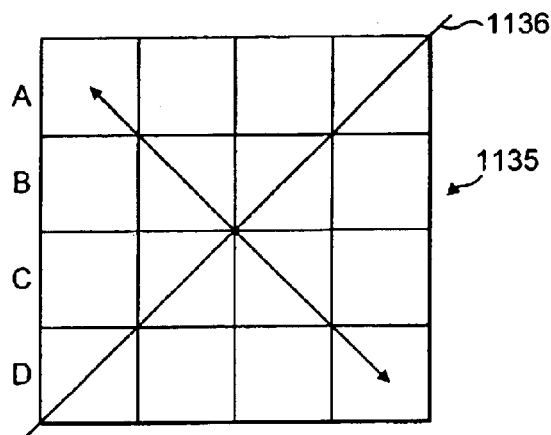
FIGS. 57A to 57C illustrate how a sequence of instructions in accordance with one embodiment may be used to transpose an array of image pixels.
Figure 57B:
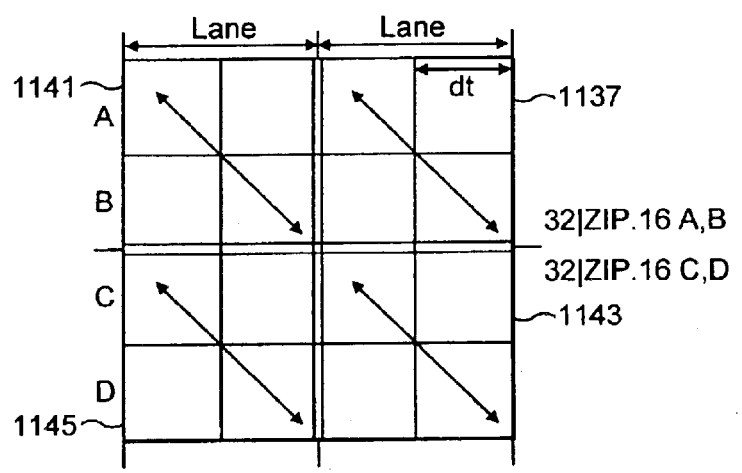
Figure 57C:
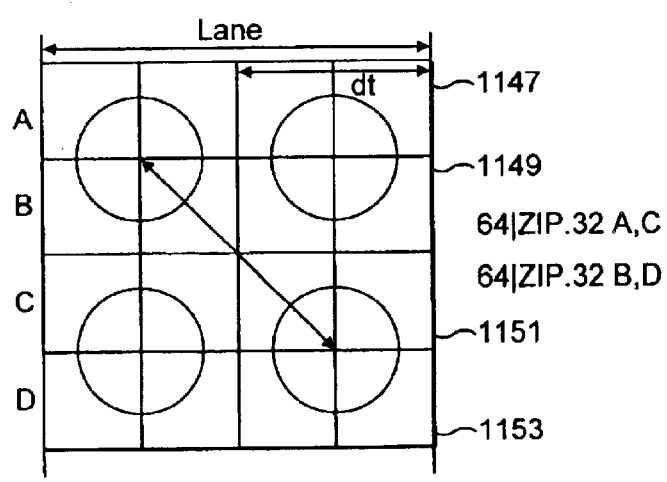

FIG. 57A and 57C illustrate one particular example of an implementation of such ZIP instruction, in which a four-by-four array of pixels 1135 within an image are to be transposed about the line 1136 (see FIG. 57A). Each pixel will typically consist of red, green and blue components expressed in RGB format. If for the sake of argument we assume that the data required to define each pixel is 16-bits in length, then it can be seen that the data for each horizontal line of four pixels in the array 1135 can be placed in a separate source register A, B, C, D.

FIG. 57B illustrates the various transpositions that occur if the following two instructions are executed:
32|ZIP.16 A,B
   32|ZIP.16 C,D Each ZIP instruction hence defines the lane width to be 32-bits, and the data element width to be 16-bits, and thus within each lane the first data element in the second register is swapped with the second data element in the first register, as shown by the four diagonal arrowed lines illustrated in FIG. 57B. Hence, separate transpositions occur within each of the four two-by-two blocks 1137, 1141, 1143 and 1145.

Figure 58:
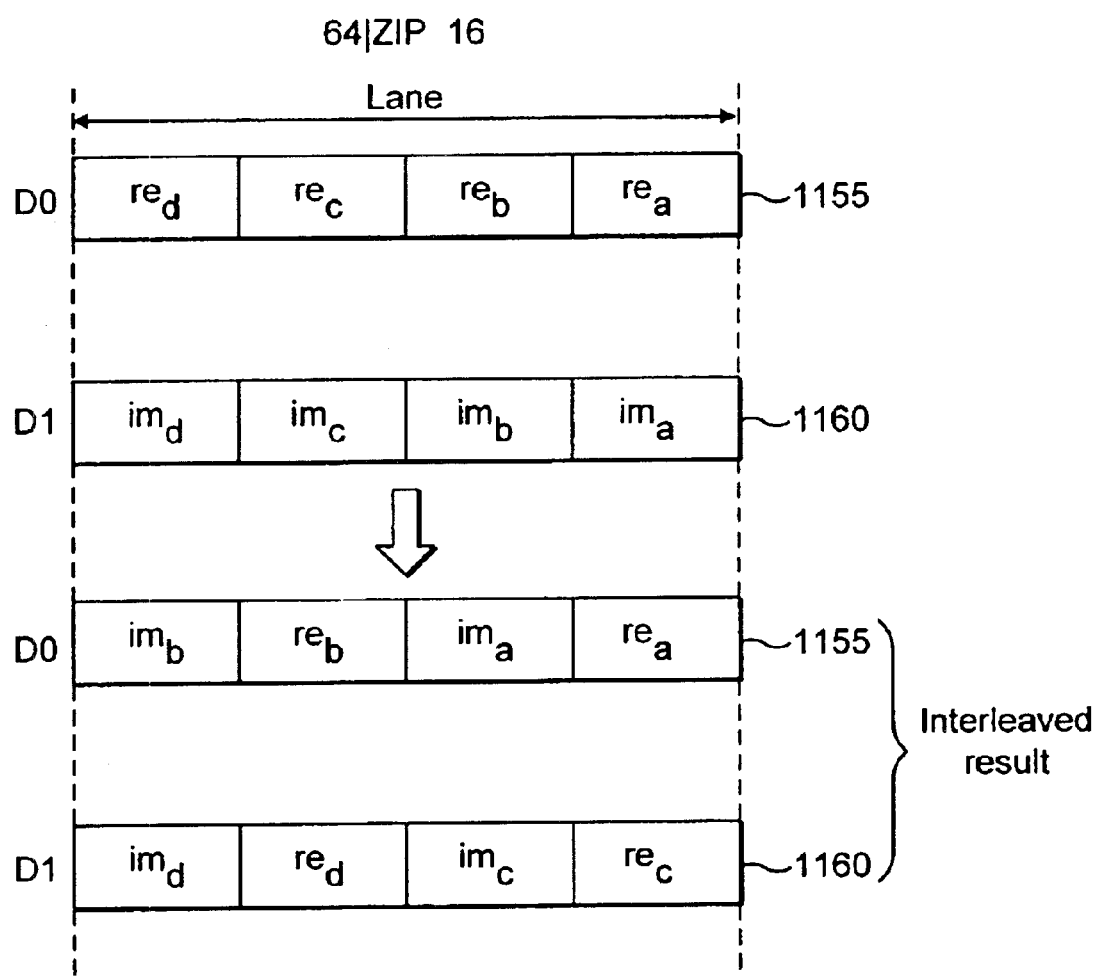
FIG. 58 illustrates how an instruction of one embodiment may be used to interleave real and imaginary parts of complex numbers.

FIG. 57C then illustrates the transposition that occurs as a result of execution of the following two instructions:
64|ZIP.32 A, C
64|ZIP.32 B, D In accordance with these instructions, the lane width is set to be 64-bits, i.e. the entire width of the source registers, and the data element width is chosen to be 32-bits. Execution of the first ZIP instruction thus results in the second 32-bit wide data element in register A 1147 being swapped with the first 32-bit wide data element within the register C 1151. Similarly, the second ZIP instruction results in the second 32-bit wide data element in the register B 1149 being swapped with the first 32-bit data element within the register D 1153. As illustrated by the diagonal arrowed line in FIG. 57C, this hence results in the two-by-two block of pixels in the top left being swapped by the two-by-two block of pixels in the bottom right. As will be appreciated by those skilled in the art, this sequence of four ZIP instructions has hence transposed the entire four-by-four array 1135 of pixels about the diagonal line 1136. FIG. 58 illustrates one particular example of the use of the interleave instruction. In this example, complex numbers consisting of real and imaginary parts are considered. It may be the case that a certain computation needs to be performed on the real parts of a series of complex numbers, whilst a separate computation needs to be performed on the imaginary part of those complex numbers. As a result, the real parts may have been arranged in a particular register D0 1155 whilst the imaginary parts may have been placed in a separate register D1 1160. At some point, it may be desired to reunite the real and imaginary parts of each complex number so that they are adjacent to each other within the registers. As is illustrated in FIG. 58, this can be achieved through the use of a 64|ZIP.16 instruction which sets the lane width to be the full width of the source registers, and sets the data element width to be 16-bits, i.e. the width of each of the real and imaginary parts. As shown by the lower half of FIG. 58, the result of the execution of the ZIP instruction is that each of the real and imaginary parts of each complex number a, b, c, d are reunited within the register space, the destination register D0 1155 containing the real and imaginary parts of the complex numbers a and b and the destination register D1 1160 containing the real and imaginary parts of the complex numbers c and d.

Figure 59A:
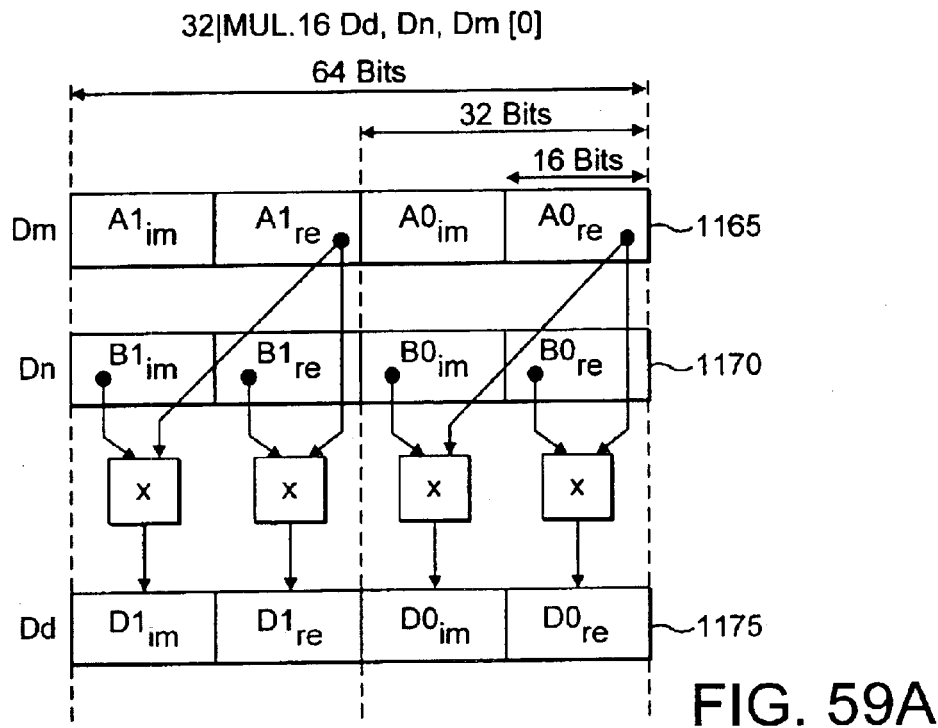
FIGS. 59A and 59B illustrate how a sequence of two instructions in accordance with one embodiment can be used to perform in parallel a multiplication of two complex numbers.
Figure 59B:
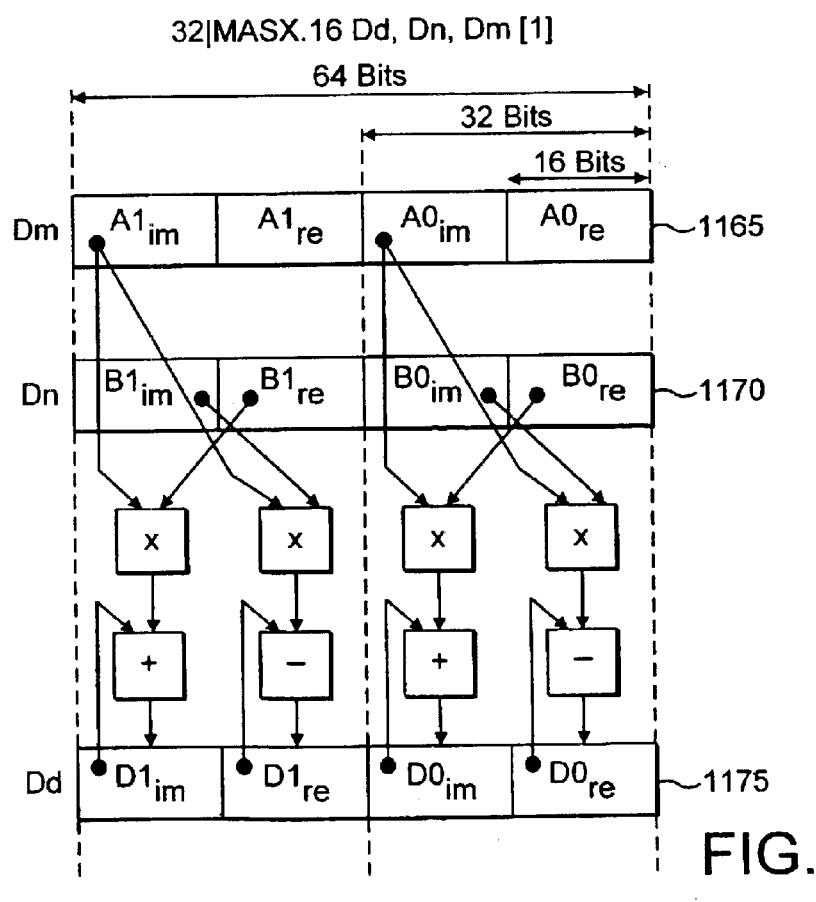

It is not just data rearranging instructions like interleave and de-interleave instructions that can take advantage of the ability to specify the lane size independently of the data element size. For example, FIGS. 59A and 59B illustrate a sequence of two instructions that can be used to perform a multiplication of two complex numbers. In particular, it is desired to multiply a complex number A by a complex number B, in order to generate a resultant complex number D, as illustrated by the following equation:

$$D_{re}=A_{re}*B_{re}-A_{im}*B_{im}$$

$$D_{im}=A_{re}*B_{im}+A_{im}*B_{re}$$

FIG. 59A shows the operation performed in response to a first multiply instruction of the following form: '32|MUL.16 Dd, Dn, Dm[0]

The source registers are 64-bit registers, and the multiply instruction specifies a lane width of 32 bits and a data element size of 16 bits. The multiply instruction is arranged within each lane to multiply the first data element in that lane within the source register Dm 1165 with each of the data elements in that lane in the second source register Dn 1170 (as shown in FIG. 59A), with the resultant values being stored in corresponding locations within the destination register Dd 1175. Within each lane, the first data element in the destination register is considered to represent the real part of the partial result of the complex number, and the second data element is considered to represent the imaginary part of the partial result of the complex number.

Following execution of the instruction illustrated in FIG. 59A, the following instruction is then executed:
32|MASX.16 Dd, Dn, Dm[1]

As illustrated by FIG. 59B, this instruction is a "multiply add subtract with exchange" instruction. In accordance with this instruction, the second data element within each lane of the source register Dm is multiplied with each data element within the corresponding lane of the second source register Dn, in the manner illustrated in FIG. 59B. Then, the result of that multiplication is either added to, or subtracted from, the values of corresponding data elements already stored within the destination register Dd 1175, with the result then being placed back within the destination register Dd 1175. It will be appreciated from a comparison of the operations of FIGS. 59A and 59B with the earlier identified equations for generating the real and imaginary parts of the resultant complex number D that by employing these two instructions in sequence, the computation can be performed in parallel for two sets of complex numbers, thereby enabling the speed benefit of a SIMD approach to be realized.

From the above examples, it will be appreciated that by providing an instruction with the ability to specify a lane size in addition to a data element size, the number of operations that can potentially benefit from a SIMD implementation is increased, and hence this provides a much improved flexibility with regard to the implementation of operations in a SIMD manner.

Figure 60:
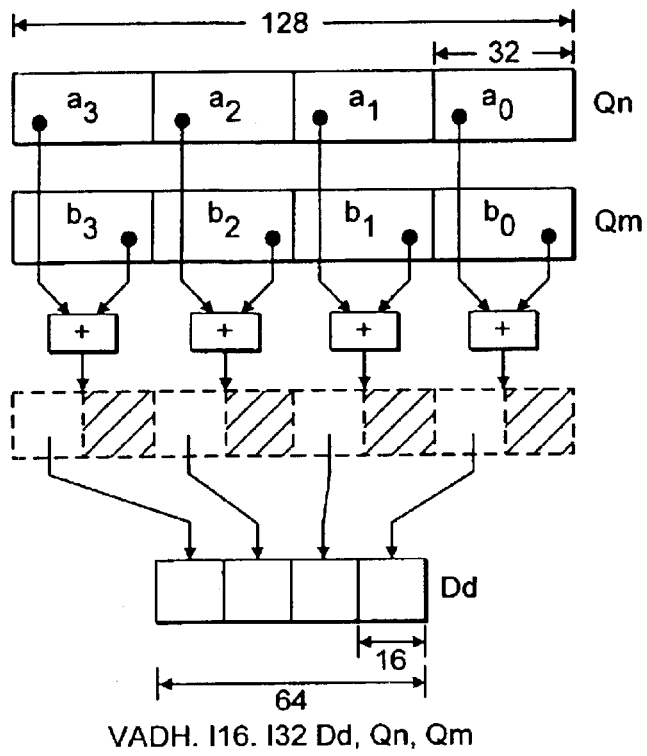
FIG. 60 schematically shows an add returning high half operation and its associated instruction.

The present technique provides the ability to perform SIMD processing on vectors where the source and destination data element widths are different. One particularly useful operation in this environment is an add or subtract then return high half SIMD operation. FIG. 60 shows an example of an add return high half operation according to the present technique. An instruction decoder within the SIMD decoder 16 (see FIG. 1) decodes instruction VADH.I16.I32 Dd,Qn,Qm and performs the addition return high half illustrated in FIG. 60 and set out below.

In FIG. 60 two source registers located in the SIMD register file 20 (see FIG. 1), Qn and Qm contain vectors of 32-bit data elements a and b. These are added together to form a vector of 16-bit data elements Dd also located in register file 20 formed from the high half of the data sums:

Qn=[a3 a2 a1 a0]

Qm=[b3 b2 b1 b]

Output

Dd=[(a3+b3)>>16, (a2+b2)>>16, (a1+b1)>>16 , (a0+b0)>>16].

Figure 61:
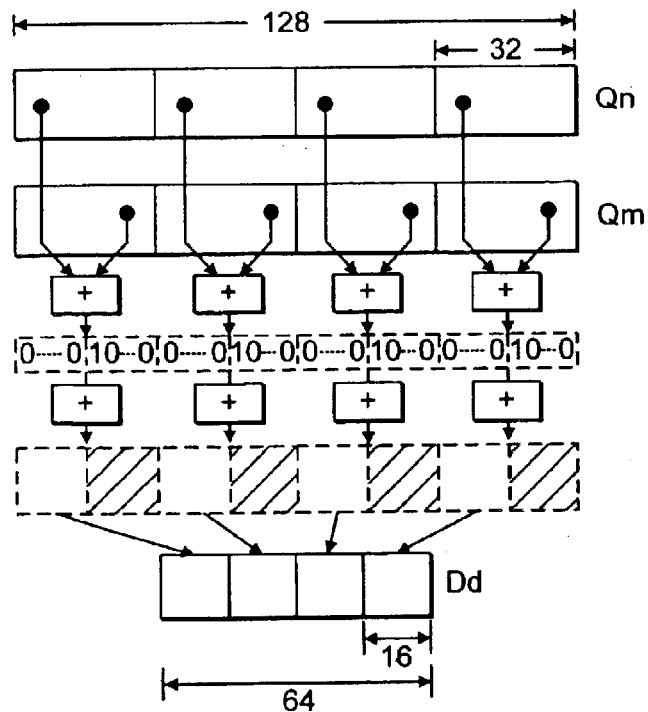
FIG. 61 schematically shows an add returning high half operation with rounding and its associated instruction.

FIG. 61 schematically shows a similar operation to that shown in FIG. 60 but in this case, the instruction decoded is VRADH.I16.I32 Dd,Qn,Qm and the operation performed is an add return high with rounding. This is performed in a very similar way to the operation illustrated in FIG. 60 but the high half is rounded. This is done, in this example, by adding a data value having a one in the most significant bit position of the lower half of the data value and zeros elsewhere after the addition and prior to taking the high half.

In this Figure as in FIG. 61 intermediate values are shown with dotted lines for clarity.

Further instructions (not illustrated) that may be supported are an addition or subtraction return high with saturation. In this case the addition or subtraction will be saturated where appropriate prior to the high half being taken.

Table 11 shows examples of some of the instructions that are supported by the present technique. Size <a> returns the size of the data type in bits and round <td> returns rounding constant 1<<(size<dt>−1).

TABLE 11

| Mnemonic | Data Type | Operand Format | Description |
| --- | --- | --- | --- |
| VADH | .I8.I16<br>.I16.I32<br>.I32.I64 | Dd, Qn, Qm | Add returning High Half<br>Vd[ i ] := (Vn[ i ]+Vm[ i ])>>size<td> |
| VRADH | .I8.I16<br>.I16.I32<br>.I32.I64 | Dd, Qn, Qm | Add returning High Half with Rounding<br>Vd[ i ] := (Vn[ i ]+Vm[ i ]+ round<td>) >>size<td> |
| VSBH | .I8.I16<br>.I16.I32<br>.I32.I64 | Dd, Qn, Qm | Subtract returning High Half<br>Vd [ i ] := (Vn [ i ] − Vm[ i ])>>size<td> |
| VRSBH | .I8.I16<br>.I16.I32<br>.I32.I64 | Dd, Qn, Qm | Subtract returning High Half with Rounding<br>Vd [ i ] := (Vn [ i ] − Vm[ i ]+round<td>) >>size<td> |

The present technique can be performed on different types of data provided that taking the high half of the data is a sensible thing to do. It is particularly appropriate to processing performed on fixed point numbers.

The above technique has many applications and can be used, for example, to accelerate SIMD FFT implementations. SIMD is particularly useful for performing FFT (fast fourier transform) operations, where the same operations need to be performed on multiple data. Thus, using SIMD processing allows the multiple data to be processed in parallel. The calculations performed for FFTs often involve multiplying complex numbers together. This involves the multiplication of data values and then the addition or subtraction of the products. In SIMD processing these calculations are performed in parallel to increase processing speed.

A simple example of the sort of sums that need to be performed is given below.

$$(a+ic)*(b+id)=e+if$$

Figure 62:
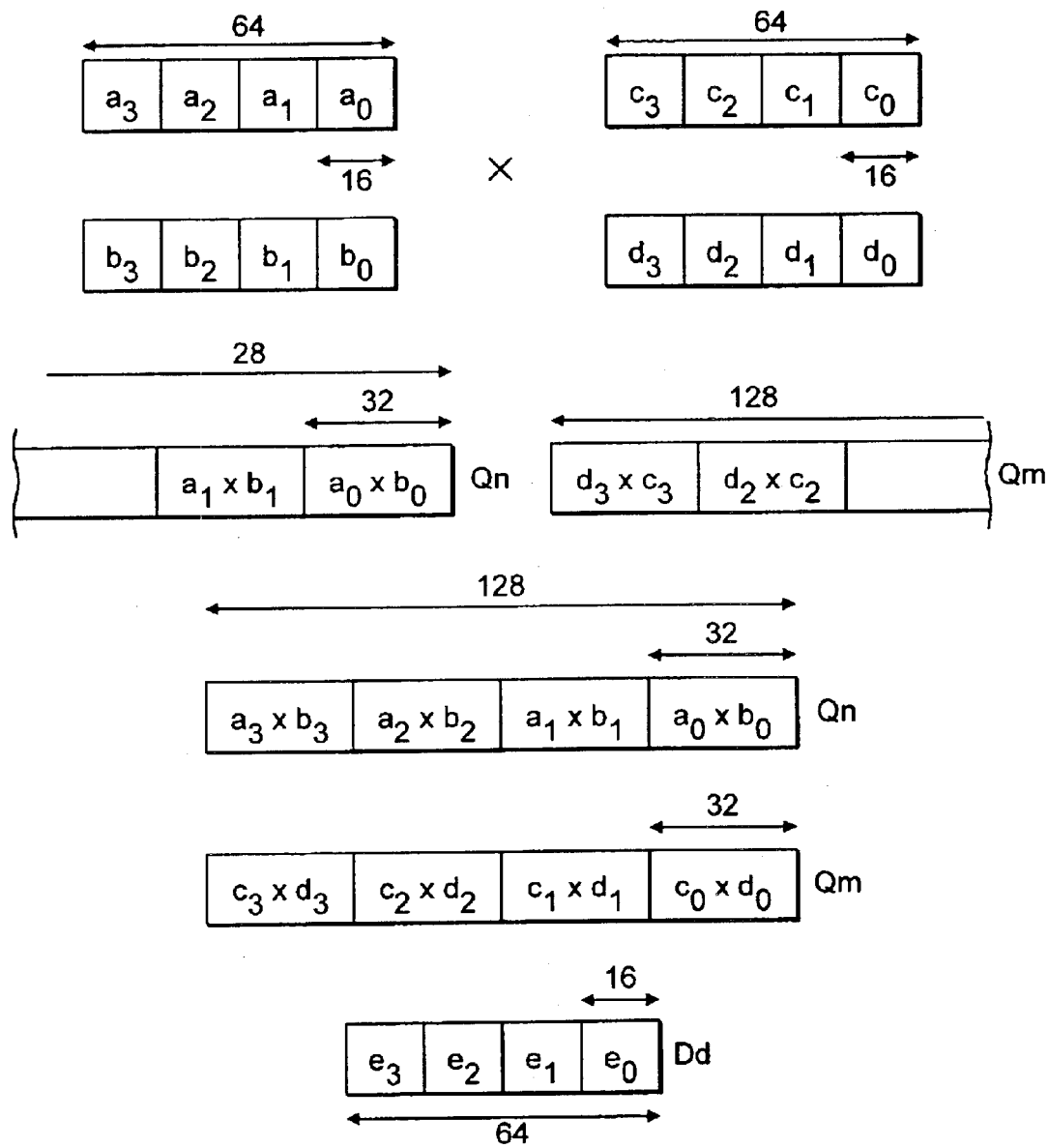
FIG. 62 schematically shows a subtract returning high half operation and its associated instruction.

Thus, the real portion e is equal to: a*b−c*d and
The imaginary portion f is equal to: a*d+c*b FIG. 62 shows a calculation to determine the real portion e. As can be seen the vectors for a containing 16 bit data element are multiplied with the vectors for b containing the same size data elements and those for c with d. These products produce two vectors with 32 bit data elements. To produce e one of the vectors needs to be subtracted from the other but the final result is only needed to the same accuracy as the original values. Thus, a resulting vector with 16 bit data elements is required. This operation can be performed in response to the single instruction VSBH.16.32 Dd, Qn, Qm as is shown in the Figure. This instruction, subtract return high half, is therefore particularly useful in this context. Furthermore, it has the advantage of allowing the arithmetic operation to be performed on the wider data width and the narrowing only occurring after the arithmetic operation (subtraction). This generally gives a more accurate result than narrowing prior to performing the subtraction.

ARM have provided their instruction set with an instruction encoding which allows an immediate to be specified with some instructions. Clearly, the immediate size should be limited if it is encoded with the instruction.

An immediate value of a size suitable for encoding with an instruction has limited use in SIMD processing where data elements are processed in parallel. In order to address this problem, a set of instructions with generated constant is provided that have a limited size immediate associated therewith, but have the ability to expand this immediate. Thus, for example, a byte sized immediate can be expanded to produce a 64-bit constant or immediate. In this way the immediate can be used in logical operations with a 64-bit source register comprising multiple source data elements in SIMD processing.

FIG. 63 shows an immediate abcdefgh, that is encoded within an instruction along with a control value, which is shown in the left hand column of the table. The binary immediate can be expanded to fill a 64-bit register, the actual expansion performed depending on the instruction and the control portion associated with it. In the example shown, the 8-bit immediate abcdefgh, is repeated at different places within a 64 bit data value, the positions at which the immediate is placed depending on the control value. Furthermore, zeros and/or ones can be used to fill the empty spaces where the value is not placed. The choice of either ones and/or zeros is also determined by the control value. Thus, in this example a wide range of possible constants for use in SIMD processing can be produced from an instruction having an 8-bit immediate and 4-bit control value associated with it.

In one embodiment (last line of the table), instead of repeating the immediate at certain places, each bit of the immediate is expanded to produce the new 64 bit immediate or constant.

As can be seen in some cases, the constant is the same in each lane, while in others different constants appear in some of the lanes. In some embodiments (not shown), the possibility of inverting these constants is also provided and this also increases the number of constants that can be generated.

An example of the format of an instruction that can be used for constant generation as shown in FIG. 63 is given below. In this instructions <value> is the data portion or immediate and <mode> is the control portion which provides an indication as to how the <value> portion is to be expanded within the generated constant (shown as different lines in the table of FIG. 63).
VMOV Dd, #<value>, <mode>
where
<value> is a byte
<mode> is one of the enumerated expansion functions These adapted instructions generally have an associated data value that has a data portion <value> which comprises the immediate and a control portion <mode>. As is shown in FIG. 63 the control portion indicates how the immediate is to be expanded. This may be done in a variety of ways, but in some embodiments, the control portion indicates which expansion of the constant is to be performed using constant generation logic.

Figure 64:
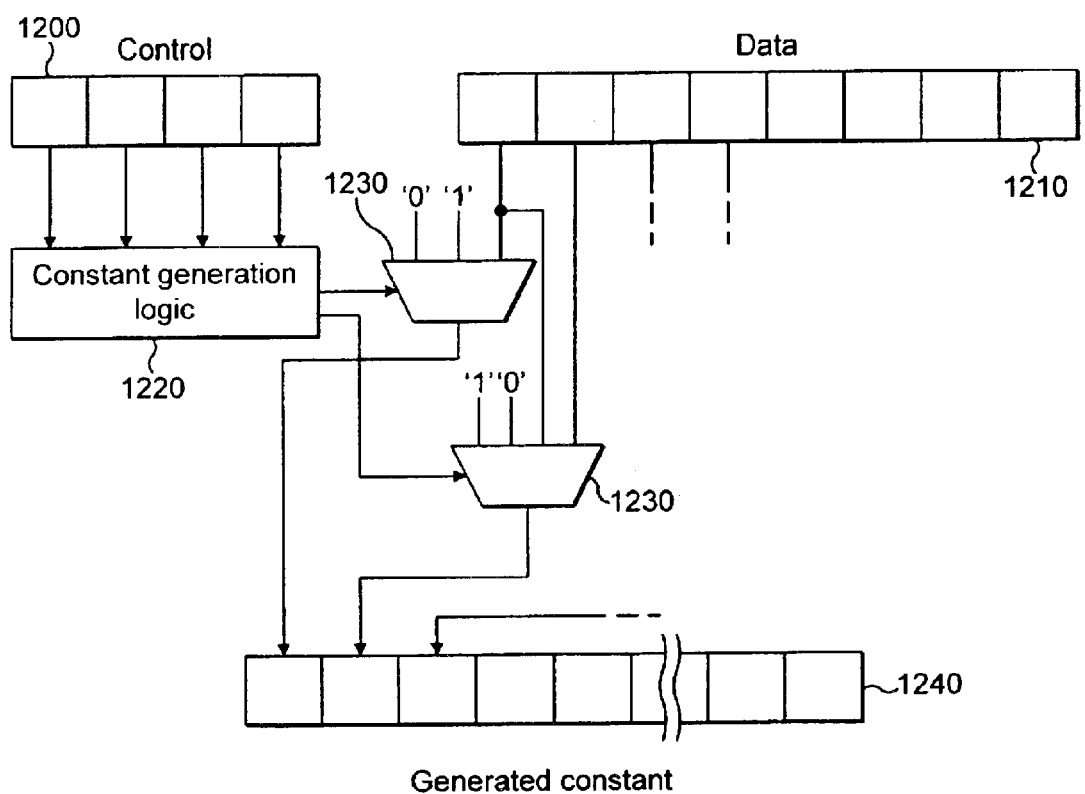
FIG. 64 shows constant generation logic.

FIG. 64 schematically shows an example of constant generation logic operable to generate a constant from a data portion 1210 and a control portion 1200 associated with an instruction according to the present technique. In the example shown, the control portion 1200 controls the control generation logic 1220, which comprises gates 1230 to output either a portion of the data value 1210, or a one or a zero to each bit within the constant 1240 to be generated.

Figure 65:
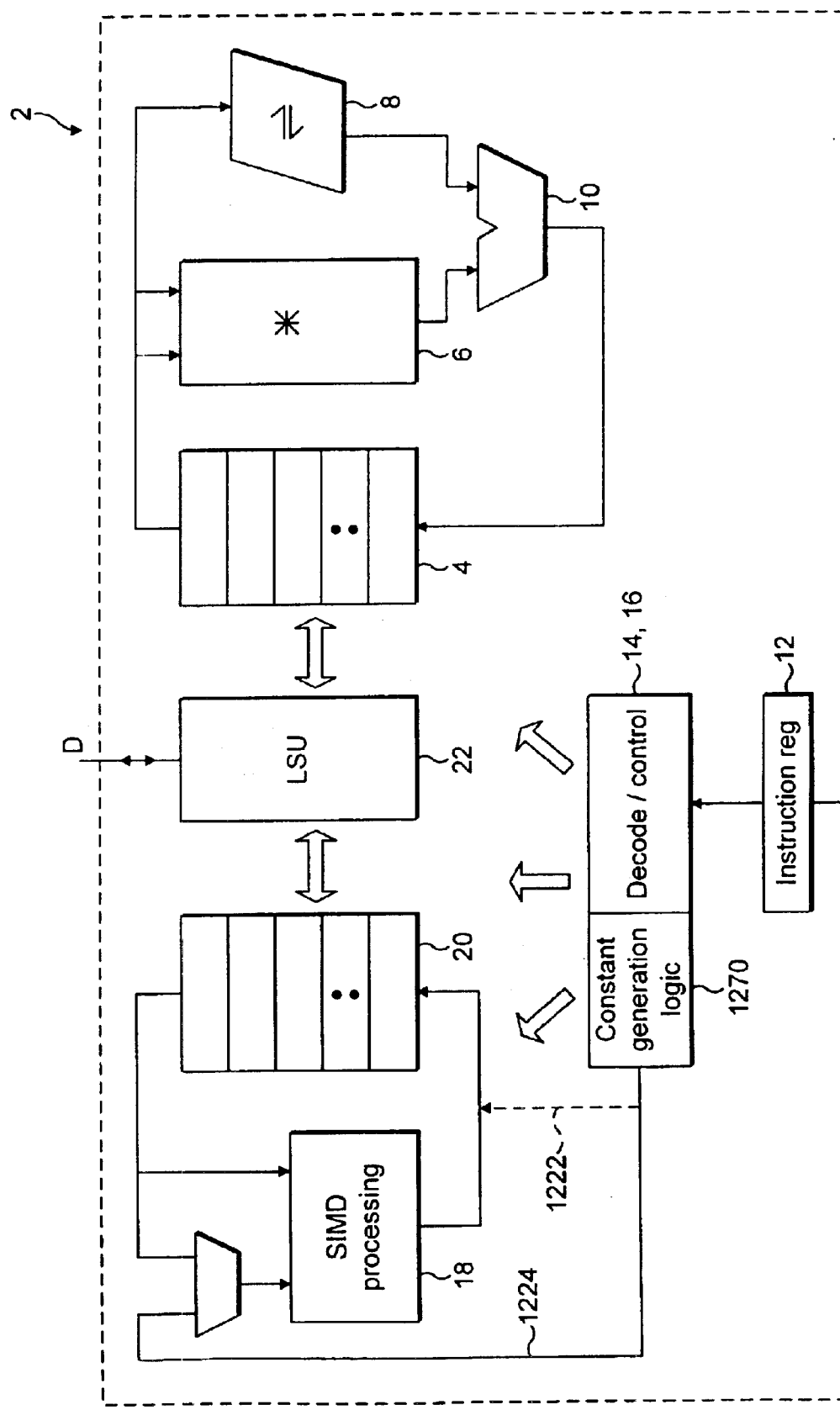
FIG. 65 shows a data processor having constant generation logic.

FIG. 65 shows a data processor (integrated circuit) similar to that shown in FIG. 1, with like reference numerals representing like features. FIG. 65 differs from FIG. 1 in that it explicitly shows constant generation logic 1220. Constant generation logic 1220 can be considered to be adjacent to, or forming part, of the decode/control portion 14, 16. As can be seen instructions are sent from the instruction pipeline 12 to the decode/control logic 14, 16. This produces control signals which control the operation of the SIMD processing logic 18, the load store unit 22, and the scalar processing portion 4, 6, 8, 10 of the processor. If an instruction with constant generation is received at the decode/control portion 14, 16, the constant generation logic is used to generate a constant for use in SIMD processing. This can either be sent directly to the SIMD register data store 20 (dotted line 1222), or if the instruction with constant generation comprises a SIMD data processing part, the generated constant is sent to the SIMD processing logic (line 1224) where further manipulations are performed on the generated constant to produce a new data value.

Figure 66A:
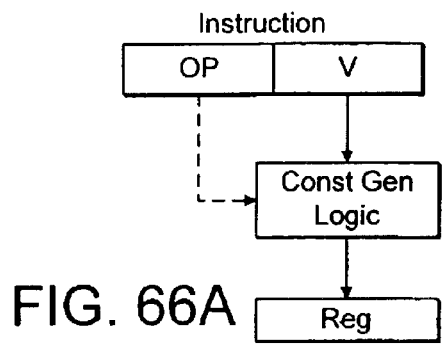
FIGS. 66A and 66B schematically show a data processor response to two types of instruction with generated constant.
Figure 66B:
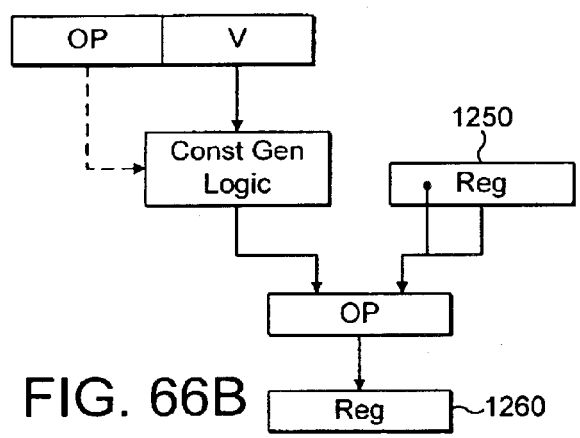

FIGS. 66A and B schematically illustrates the two different paths shown in FIG. 65. FIG. 66A shows the case where the instruction generates a constant which is sent directly to the register store, i.e. dotted line 1222. FIG. 66B, shows the case where the instruction with generated constant comprises a data processing part. In this case data processing operations (OP) are performed on the generated constant and a further source operand 1250 to produce a final data value 1260 in response to the instruction, this corresponds to line 1224 of FIG. 65.

In addition to the constants shown in FIG. 63 and their inversions, additional data processing operations such as an OR, AND, test, add or subtract can be performed on the generated constants to generate a much wider range of data values. This corresponds to FIG. 13B and path 1224 in FIG. 65. Table 12 gives an example of bitwise AND and bitwise OR that can be used to generate some additional data values.

| Mnemonic | Data Type | Operand Format | Description |
|---|---|---|---|
| VAND | none | Dd, #<value>,<mode> | Bitwise AND with generated constant<br>Vd := Vd & <generated constant> |
| VORR | none | Dd, #<value>,<mode> | Bitwise OR with generated constant<br>Vd := Vd\|<generated constant> |

Figure 67:
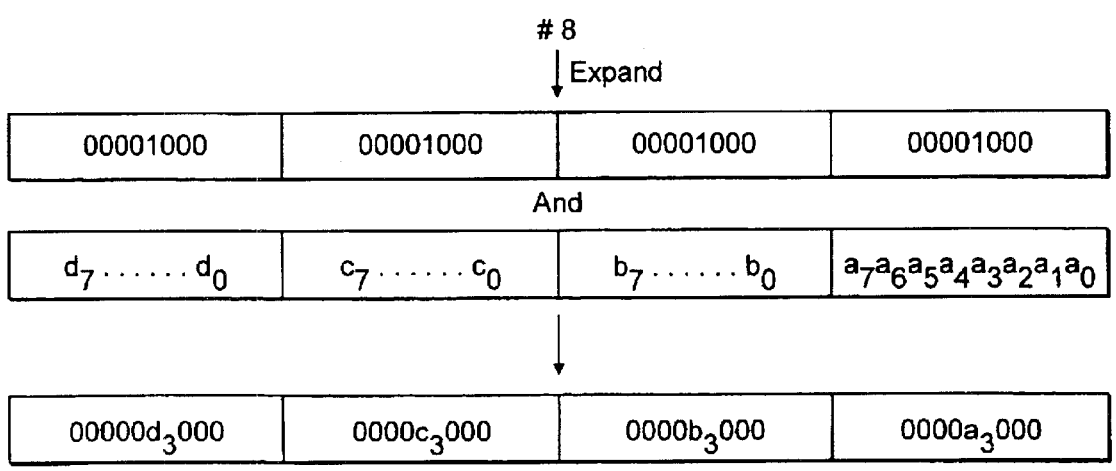
FIG. 67 shows the generation of a bit mask according to the present technique.

The ability to perform further data processing operations on the generated constants can have a variety of uses. For example, FIG. 67 shows how embodiments of the present technique can be used to generate a bit mask to extract a certain bit or bits from a number of data elements in a vector. In the example shown the fourth bit of each data element from a source vector is extracted. Initially the immediate 8 is expanded by repeating it and then this is followed by a logical AND instruction which ANDs the generated constant with a source vector to extract the desired bit from each data element. These operations are performed in response to the instruction VAND Dd,#0b00001000, 0b1100

Wherein the <mode> value 1100 refers to a generated constant comprising an expanded data portion (see FIG. 63).

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Apparatus for processing data, said apparatus comprising:
   a register data store operable to store data to be processed and accessed via registers corresponding to respective portions of said register data store;
   processing logic operable to perform data processing operations upon data stored with said register data store; and
   an instruction decoder responsive to a program instruction to generate control signals operable to control said processing logic to perform a data processing operation specified by said program instruction; wherein
   said instruction decoder is responsive to a table lookup extension instruction specifying one or more index registers storing a plurality of index values and one or more table registers storing a plurality of data elements to store into respective locations within one or more result registers a plurality of data elements selected from said one or more table registers in dependence upon respective index values from said one or more index registers, said instruction decoder being responsive to an index value outside of a predetermined range of index values to preserve a current value stored in a corresponding location within said one or more result registers.

2. Apparatus as claimed in claim 1, wherein said data elements have one of a plurality of different data element sizes specified by said table lookup extension instruction.

3. Apparatus as claimed in claim 1, wherein said processing logic is operable to perform data processing operations in parallel upon a plurality of data elements accessed as a register of said register data store.

4. Apparatus as claimed in claim 1, wherein said predetermined range of index values includes a respective value corresponding to each location within said one or more table registers.

5. Apparatus as claimed in claim 1, wherein said table lookup extension instruction specifies a list of a plurality of table registers upon which a lookup operation is performed.

6. Apparatus as claimed in claim 1, wherein said table lookup extension instruction specifies one index register.

7. Apparatus as claimed in claim 1, wherein said table lookup extension instruction specifies one result register.

8. Apparatus as claimed in claim 1, wherein said instruction decoder is responsive to a table lookup instruction specifying one or more index registers storing a plurality of index values and one or more table registers storing a plurality of data elements to store into respective locations within one or more result registers a plurality of data elements selected from said one or more table registers in dependence upon respective index values from said one or more index registers, said instruction decoder being responsive to an index value outside of a predetermined range of index values to store a zero value in a corresponding location within said one or more result registers.

9. Apparatus as claimed in claim 1, wherein there is a one-to-one mapping between said index values storing in said one or more index registers and said data elements store in said one or more result registers.

10. A method of processing data, said method comprising the steps of:
    storing within a register data store data to be processed and accessed via registers corresponding to respective portions of said register data store;
    performing data processing operations upon data stored with said register data store; and
    in response to a program instruction generating control signals operable to control processing of data processing operation specified by said program instruction; wherein
    in response to a table lookup extension instruction specifying one or more index registers storing a plurality of index values and one or more table registers storing a plurality of data elements storing into respective locations within one or more result registers a plurality of data elements selected from said one or more table registers in dependence upon respective index values from said one or more index registers, and in response to an index value outside of a predetermined range of index values preserving a current value stored in a corresponding location within said one or more result registers.

11. A method as claimed in claim 10, wherein said data elements have one of a plurality of different data element sizes specified by said table lookup extension instruction.

12. A method as claimed in claim 10, wherein said processing performs data processing operations in parallel upon a plurality of data elements accessed as a register of said register data store.

13. A method as claimed in claim 10, wherein said predetermined range of index values includes a respective value corresponding to each location within said one or more table registers.

14. A method as claimed in claim 10, wherein said table lookup extension instruction specifies a list of a plurality of table registers upon which a lookup operation is performed.

15. A method as claimed in claim 10, wherein said table lookup extension instruction specifies one index register.

16. A method as claimed in claim 10, wherein said table lookup extension instruction specifies one result register.

17. A method as claimed in claim 10, wherein in response to a table lookup instruction specifying one or more index registers storing a plurality of index values and one or more table registers storing a plurality of data elements storing into respective locations within one or more result registers a plurality of data elements selected from said one or more table registers in dependence upon respective index values from said one or more index registers, and in response to an index value outside of a predetermined range of index values storing a zero value in a corresponding location within said one or more result registers.

18. A method as claimed in claim 10, wherein there is a one-to-one mapping between said index values storing in said one or more index registers and said data elements store in said one or more result registers.

19. A computer program product comprising a computer program operable to control an apparatus for processing data in accordance with a method as claimed in claim 10.

* * * * *